US011874710B2

(12) United States Patent
Cooper et al.

(10) Patent No.: US 11,874,710 B2
(45) Date of Patent: Jan. 16, 2024

(54) METHODS AND APPARATUS TO OPERATE CLOSED-LID PORTABLE COMPUTERS

(71) Applicant: Intel Corporation, Santa Clara, CA (US)

(72) Inventors: Barnes Cooper, Hillsboro, OR (US); Aleksander Magi, Portland, OR (US); Arvind Kumar, Beaverton, OR (US); Giuseppe Raffa, Portland, OR (US); Wendy March, Portland, OR (US); Marko Bartscherer, Chula Vista, CA (US); Irina Lazutkina, Hillsboro, OR (US); Duck Young Kong, Beaverton, OR (US); Meng Shi, Hillsboro, OR (US); Vivek Paranjape, Hillsboro, OR (US); Vinod Gomathi Nayagam, San Jose, CA (US); Glen J. Anderson, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 18/160,419

(22) Filed: Jan. 27, 2023

(65) Prior Publication Data
US 2023/0236642 A1 Jul. 27, 2023

Related U.S. Application Data

(63) Continuation of application No. 17/856,587, filed on Jul. 1, 2022, now Pat. No. 11,740,666, which is a
(Continued)

(51) Int. Cl.
*G06F 1/16* (2006.01)
*G06F 3/16* (2006.01)
(Continued)

(52) U.S. Cl.
CPC ............ *G06F 1/1686* (2013.01); *G06F 1/165* (2013.01); *G06F 1/1618* (2013.01);
(Continued)

(58) Field of Classification Search
CPC ...... G06F 3/167; G06F 1/1692; G06F 1/1681; G06F 1/165; G06F 1/1618; G06F 1/1686; G06V 40/172
See application file for complete search history.

(56) References Cited

U.S. PATENT DOCUMENTS

D324,036 S 2/1992 Wakasa
5,173,940 A 12/1992 Lantz et al.
(Continued)

FOREIGN PATENT DOCUMENTS

CN 102197349 9/2011
CN 102231255 11/2011
(Continued)

OTHER PUBLICATIONS

European Patent Office, "Extended European Search Report," issued in connection with European Patent Application No. 23154752.2, dated May 4, 2023, 14 pages.
(Continued)

*Primary Examiner* — Abbas I Abdulselam
(74) *Attorney, Agent, or Firm* — Hanley, Flight & Zimmerman, LLC

(57) ABSTRACT

Methods and apparatus to operate closed-lid portable computers are disclosed. An example portable computer includes a first display on a lid of the portable computer, the first display to be deactivated when the lid is in a closed position; a second display distinct from the first display, the second display to be visible when the lid is in the closed position; instructions; and processor circuitry to execute the instructions to cause activation of the first display in response to a
(Continued)

user interaction with the second display while the lid is in the closed position.

28 Claims, 18 Drawing Sheets

Related U.S. Application Data continuation of application No. 16/421,217, filed on May 23, 2019, now Pat. No. 11,379,016.

(51) Int. Cl.
  *G06F 21/32* (2013.01)
  *G06F 9/54* (2006.01)
  *G06V 40/16* (2022.01)

(52) U.S. Cl.
  CPC .......... *G06F 1/1681* (2013.01); *G06F 1/1692* (2013.01); *G06F 3/167* (2013.01); *G06F 9/542* (2013.01); *G06F 21/32* (2013.01); *G06V 40/172* (2022.01); *G06F 2221/2149* (2013.01)

(56) References Cited

U.S. PATENT DOCUMENTS

| | | |
|---|---|---|
| D359,275 S | 6/1995 | Yamazaki |
| D376,791 S | 12/1996 | Schreiner |
| D388,774 S | 1/1998 | Guintoli |
| D389,129 S | 1/1998 | Guintoli |
| D433,024 S | 10/2000 | Oross |
| D434,773 S | 12/2000 | Suzuki |
| D444,462 S | 7/2001 | Tsuji |
| D449,307 S | 10/2001 | Amano |
| D453,508 S | 2/2002 | Shibata |
| D454,126 S | 3/2002 | Bliven et al. |
| D462,967 S | 9/2002 | Suzuki |
| D478,089 S | 8/2003 | Yokota |
| D480,089 S | 9/2003 | Skinner et al. |
| 6,657,647 B1 | 12/2003 | Bright |
| 6,760,649 B2 | 7/2004 | Cohen |
| D494,161 S | 8/2004 | Sawaquchi |
| D504,129 S | 4/2005 | Loew et al. |
| D517,542 S | 3/2006 | Lee et al. |
| D518,042 S | 3/2006 | Kanayama |
| D534,531 S | 1/2007 | Ogasawara |
| 7,386,799 B1 | 6/2008 | Clanton et al. |
| D577,013 S | 9/2008 | Harris |
| D591,737 S | 5/2009 | Morooka |
| 7,559,034 B1 | 7/2009 | Paperny et al. |
| D607,449 S | 1/2010 | Morisawa |
| D608,380 S | 1/2010 | Nagase et al. |
| D611,043 S | 3/2010 | Andre et al. |
| D611,045 S | 3/2010 | Andre et al. |
| D612,830 S | 3/2010 | Kim et al. |
| D614,180 S | 4/2010 | Gou |
| D616,433 S | 5/2010 | Morishita et al. |
| 7,725,547 B2 | 5/2010 | Albertson et al. |
| D616,882 S | 6/2010 | Denhez |
| D631,039 S | 1/2011 | Sakai et al. |
| 7,971,156 B2 | 6/2011 | Albertson et al. |
| D645,857 S | 9/2011 | Cho et al. |
| 8,139,032 B2 | 3/2012 | Su et al. |
| D659,134 S | 5/2012 | Ahn et al. |
| D672,765 S | 12/2012 | Masui |
| D673,558 S | 1/2013 | Cruz et al. |
| D674,382 S | 1/2013 | Andre et al. |
| D684,570 S | 6/2013 | Akana et al. |
| D687,831 S | 8/2013 | Kim |
| 8,566,696 B1 | 10/2013 | Hamon et al. |
| D692,875 S | 11/2013 | Lawrence |
| 8,581,974 B2 | 11/2013 | Lin et al. |
| D698,348 S | 1/2014 | Ilchan et al. |
| D704,185 S | 5/2014 | Bowers et al. |
| 8,717,318 B2 | 5/2014 | Anderson et al. |
| D706,767 S | 6/2014 | Kawai et al. |
| D706,768 S | 6/2014 | Kawai |
| D706,769 S | 6/2014 | Kawai et al. |
| D706,772 S | 6/2014 | Koyama et al. |
| D708,178 S | 7/2014 | Honda et al. |
| D708,179 S | 7/2014 | Andre et al. |
| D709,491 S | 7/2014 | Kurimoto et al. |
| 8,812,831 B2 | 8/2014 | Cheng et al. |
| D712,971 S | 9/2014 | Huang |
| D715,793 S | 10/2014 | Tsao et al. |
| D716,795 S | 11/2014 | Huang et al. |
| D718,818 S | 12/2014 | Sumii et al. |
| D720,712 S | 1/2015 | Park et al. |
| 8,954,884 B1 | 2/2015 | Barger |
| D724,576 S | 3/2015 | Wolff et al. |
| 8,994,847 B2 | 3/2015 | Chen et al. |
| D727,314 S | 4/2015 | Fukuoka |
| D729,227 S | 5/2015 | Fukuoka |
| D729,228 S | 5/2015 | Kawai |
| D729,229 S | 5/2015 | Kurimoto et al. |
| D729,791 S | 5/2015 | Adamson et al. |
| D729,792 S | 5/2015 | Kurimoto et al. |
| D731,475 S | 6/2015 | Mehandjiysky et al. |
| D739,398 S | 9/2015 | Adamson et al. |
| D739,399 S | 9/2015 | Adamson et al. |
| D739,400 S | 9/2015 | Adamson et al. |
| D740,278 S | 10/2015 | Bowers et al. |
| D741,318 S | 10/2015 | Oakley |
| D746,809 S | 1/2016 | Takada et al. |
| 9,268,434 B2 | 2/2016 | Sultenfuss |
| D751,062 S | 3/2016 | Chang |
| 9,311,909 B2 | 4/2016 | Giaimo, III et al. |
| 9,436,241 B2 | 9/2016 | Tang et al. |
| D769,251 S | 10/2016 | Chen |
| D771,684 S | 11/2016 | Kim |
| D780,173 S | 2/2017 | Matsuoka |
| 9,575,559 B2 | 2/2017 | Andrysco |
| D780,760 S | 3/2017 | Ironmonger et al. |
| D788,767 S | 6/2017 | Magi |
| D794,027 S | 8/2017 | Ironmonger et al. |
| 9,721,383 B1 | 8/2017 | Horowitz et al. |
| 9,740,290 B2 | 8/2017 | Rosenberg et al. |
| 9,766,700 B2 | 9/2017 | Lyons et al. |
| 9,785,234 B2 | 10/2017 | Horesh |
| D801,945 S | 11/2017 | Cho et al. |
| D803,946 S | 11/2017 | Matsuda |
| 9,846,471 B1 | 12/2017 | Arora |
| D810,069 S | 2/2018 | Hishiki |
| D810,071 S | 2/2018 | Hishiki |
| D813,235 S | 3/2018 | Rosenberg et al. |
| D814,469 S | 4/2018 | Rundberg |
| D816,083 S | 4/2018 | Wu |
| 9,936,195 B2 | 4/2018 | Horesh |
| 9,996,638 B1 | 6/2018 | Holz et al. |
| D823,850 S | 7/2018 | Lim et al. |
| 10,027,662 B1 | 7/2018 | Mutagi et al. |
| D825,435 S | 8/2018 | Yu |
| 10,101,817 B2 | 10/2018 | Hsin et al. |
| 10,234,928 B2 | 3/2019 | Chen |
| 10,254,178 B2 | 4/2019 | Carbone et al. |
| 10,262,599 B2 | 4/2019 | Lang et al. |
| 10,304,209 B2 | 5/2019 | Alonso |
| 10,415,286 B1 | 9/2019 | Porcella et al. |
| D867,460 S | 11/2019 | Yan et al. |
| D873,835 S | 1/2020 | Chan |
| 10,551,888 B1 | 2/2020 | North et al. |
| D878,475 S | 3/2020 | Jetter |
| D879,777 S | 3/2020 | Cho |
| 10,620,457 B2 | 4/2020 | Ain-Kedem |
| 10,620,786 B2 | 4/2020 | Veeramani et al. |
| D886,112 S | 6/2020 | Yeh et al. |
| 10,725,510 B2 | 7/2020 | Ho et al. |
| 10,740,912 B2 | 8/2020 | Ren et al. |
| 10,768,724 B1 | 9/2020 | Han |
| 10,819,920 B1 | 10/2020 | Hamlin et al. |
| 10,884,479 B2 | 1/2021 | Chen |
| D914,010 S | 3/2021 | Yeh et al. |
| D914,021 S | 3/2021 | Magi et al. |

(56) References Cited

U.S. PATENT DOCUMENTS

| | | | |
|---|---|---|---|
| D916,076 S | 4/2021 | Seoc et al. |
| D916,078 S | 4/2021 | Akana et al. |
| 11,153,472 B2 | 10/2021 | Konicek |
| D934,856 S | 11/2021 | Yeh et al. |
| 11,194,398 B2 | 12/2021 | Bernhart |
| 11,360,528 B2 | 6/2022 | Mishra et al. |
| 11,379,016 B2 | 7/2022 | Cooper et al. |
| 11,543,873 B2 | 1/2023 | Sengupta et al. |
| D982,575 S | 4/2023 | Bae et al. |
| 11,733,761 B2 | 8/2023 | Sinha et al. |
| 11,782,488 B2 | 10/2023 | Cooper et al. |
| 2002/0089190 A1 | 7/2002 | Wang et al. |
| 2002/0091738 A1 | 7/2002 | Rohrabaugh et al. |
| 2003/0043174 A1 | 3/2003 | Hinckley et al. |
| 2003/0174149 A1 | 9/2003 | Fujisaki et al. |
| 2004/0158739 A1 | 8/2004 | Wakai et al. |
| 2004/0175020 A1 | 9/2004 | Bradski et al. |
| 2004/0252101 A1 | 12/2004 | Wilk |
| 2005/0071698 A1 | 3/2005 | Kangas |
| 2006/0146030 A1 | 7/2006 | Kim |
| 2006/0192775 A1 | 8/2006 | Nicholson et al. |
| 2007/0027580 A1 | 2/2007 | Ligtenberg et al. |
| 2007/0228138 A1 | 10/2007 | Huang et al. |
| 2008/0046425 A1 | 2/2008 | Perski |
| 2008/0112571 A1 | 5/2008 | Bradicich et al. |
| 2008/0158144 A1 | 7/2008 | Schobben et al. |
| 2008/0301300 A1 | 12/2008 | Toub |
| 2009/0092293 A1 | 4/2009 | Lin |
| 2009/0165125 A1 | 6/2009 | Brown et al. |
| 2010/0039376 A1 | 2/2010 | Wang |
| 2010/0079508 A1 | 4/2010 | Hodge et al. |
| 2010/0281432 A1 | 11/2010 | Geisner et al. |
| 2011/0035606 A1 | 2/2011 | Lovicott et al. |
| 2011/0055752 A1 | 3/2011 | Rubinstein et al. |
| 2011/0154266 A1 | 6/2011 | Friend et al. |
| 2011/0175932 A1 | 7/2011 | Yu et al. |
| 2011/0298702 A1 | 8/2011 | Sakata et al. |
| 2011/0248918 A1 | 10/2011 | Yoo et al. |
| 2011/0252339 A1 | 10/2011 | Lemonik et al. |
| 2011/0273546 A1 | 11/2011 | Lin et al. |
| 2011/0296163 A1 | 12/2011 | Abernethy et al. |
| 2011/0298967 A1 | 12/2011 | Clavin et al. |
| 2012/0032894 A1 | 2/2012 | Parivar et al. |
| 2012/0054670 A1 | 3/2012 | Rainisto |
| 2012/0062470 A1 | 3/2012 | Chang |
| 2012/0123680 A1 | 5/2012 | Wipplinger et al. |
| 2012/0171656 A1 | 7/2012 | Shen |
| 2012/0172085 A1 | 7/2012 | Vuppu et al. |
| 2012/0249429 A1 | 10/2012 | Anderson et al. |
| 2012/0300061 A1 | 11/2012 | Osman et al. |
| 2012/0319997 A1 | 12/2012 | Majumder |
| 2013/0007096 A1 | 1/2013 | Pahlavan et al. |
| 2013/0007590 A1 | 1/2013 | Rivera et al. |
| 2013/0021265 A1* | 1/2013 | Selim ............... G06F 3/04883 345/173 |
| 2013/0021750 A1 | 1/2013 | Senatori |
| 2013/0120460 A1 | 5/2013 | Adams et al. |
| 2013/0158999 A1 | 6/2013 | Maruta et al. |
| 2013/0173946 A1 | 7/2013 | Rotem et al. |
| 2013/0174016 A1 | 7/2013 | Glazer et al. |
| 2013/0185633 A1 | 7/2013 | Bunker et al. |
| 2013/0207895 A1 | 8/2013 | Lee et al. |
| 2013/0212462 A1 | 8/2013 | Athas et al. |
| 2013/0222329 A1 | 8/2013 | Larsby et al. |
| 2013/0283213 A1 | 10/2013 | Guendelman et al. |
| 2013/0289792 A1 | 10/2013 | Cheng et al. |
| 2013/0321265 A1 | 12/2013 | Bychkov et al. |
| 2013/0321271 A1 | 12/2013 | Bychkov et al. |
| 2013/0332760 A1 | 12/2013 | Reece et al. |
| 2014/0006830 A1 | 1/2014 | Kamhi et al. |
| 2014/0028548 A1 | 1/2014 | Bychkov et al. |
| 2014/0050360 A1 | 2/2014 | Lin et al. |
| 2014/0085451 A1 | 3/2014 | Kamimura et al. |
| 2014/0089865 A1 | 3/2014 | Gay et al. |
| 2014/0129937 A1 | 5/2014 | Jarvinen et al. |
| 2014/0132508 A1 | 5/2014 | Hodge et al. |
| 2014/0132514 A1* | 5/2014 | Kuzara ............... G06F 1/1647 345/169 |
| 2014/0139456 A1 | 5/2014 | Wigdor et al. |
| 2014/0149935 A1 | 5/2014 | Johnson et al. |
| 2014/0189579 A1 | 7/2014 | Rimon et al. |
| 2014/0191995 A1 | 7/2014 | Karpin et al. |
| 2014/0201690 A1 | 7/2014 | Holz et al. |
| 2014/0208260 A1 | 7/2014 | Kawahara et al. |
| 2014/0258942 A1 | 9/2014 | Kutliroff et al. |
| 2014/0267021 A1 | 9/2014 | Lee et al. |
| 2014/0281918 A1 | 9/2014 | Wei et al. |
| 2014/0313120 A1 | 10/2014 | Kamhi |
| 2014/0361977 A1 | 12/2014 | Stafford et al. |
| 2014/0372511 A1 | 12/2014 | Kapadia et al. |
| 2014/0380075 A1 | 12/2014 | Pulapaka et al. |
| 2015/0009238 A1 | 1/2015 | Kudalkar |
| 2015/0015688 A1 | 1/2015 | Yang |
| 2015/0042572 A1 | 2/2015 | Lombardi et al. |
| 2015/0058649 A1 | 2/2015 | Song et al. |
| 2015/0100884 A1 | 4/2015 | Ryu et al. |
| 2015/0121193 A1 | 4/2015 | Beveridge et al. |
| 2015/0121287 A1 | 4/2015 | Fermon |
| 2015/0177843 A1 | 6/2015 | Kwon |
| 2015/0185909 A1 | 7/2015 | Gecnuk |
| 2015/0193395 A1 | 7/2015 | Nicolaou et al. |
| 2015/0220149 A1 | 8/2015 | Plagemann et al. |
| 2015/0220150 A1 | 8/2015 | Plagemann et al. |
| 2015/0248167 A1 | 9/2015 | Turbell et al. |
| 2015/0264572 A1 | 9/2015 | Turgeman |
| 2015/0360567 A1 | 12/2015 | Sannomiya et al. |
| 2015/0363070 A1 | 12/2015 | Katz |
| 2016/0034019 A1 | 2/2016 | Seo et al. |
| 2016/0062584 A1 | 3/2016 | Cohen et al. |
| 2016/0087981 A1 | 3/2016 | Dorresteijn |
| 2016/0109961 A1 | 4/2016 | Parshionikar |
| 2016/0116960 A1 | 4/2016 | Kwak et al. |
| 2016/0091938 A1 | 5/2016 | Edwards et al. |
| 2016/0132099 A1 | 5/2016 | Grabau et al. |
| 2016/0170617 A1 | 6/2016 | Shi et al. |
| 2016/0179767 A1 | 6/2016 | Mavinakuli et al. |
| 2016/0180762 A1 | 6/2016 | Bathiche et al. |
| 2016/0187994 A1 | 6/2016 | La et al. |
| 2016/0202750 A1 | 7/2016 | Pulapaka et al. |
| 2016/0212317 A1 | 7/2016 | Alameh et al. |
| 2016/0232701 A1 | 8/2016 | Drozdyuk |
| 2016/0259467 A1 | 9/2016 | Nayyar et al. |
| 2016/0297362 A1 | 10/2016 | Tijerina et al. |
| 2016/0370860 A1 | 12/2016 | Bychkov et al. |
| 2017/0010654 A1 | 1/2017 | Chen |
| 2017/0018234 A1 | 1/2017 | Na et al. |
| 2017/0034146 A1 | 2/2017 | Sugya |
| 2017/0039170 A1 | 2/2017 | Tunali et al. |
| 2017/0075479 A1* | 3/2017 | Tsukamoto ............ G06F 1/3262 |
| 2017/0085790 A1 | 3/2017 | Bohn |
| 2017/0090585 A1 | 3/2017 | Bernhart |
| 2017/0147879 A1 | 5/2017 | Alameh et al. |
| 2017/0201254 A1 | 7/2017 | Hanssen et al. |
| 2017/0219240 A1 | 8/2017 | Cassini et al. |
| 2017/0269725 A1 | 9/2017 | Kang |
| 2017/0321856 A1 | 9/2017 | Keates |
| 2018/0039410 A1 | 2/2018 | Kim et al. |
| 2018/0039990 A1 | 2/2018 | Lindemann |
| 2018/0136719 A1 | 5/2018 | Chen |
| 2018/0157815 A1 | 6/2018 | Salama et al. |
| 2018/0164942 A1 | 6/2018 | Huffman et al. |
| 2018/0166076 A1 | 6/2018 | Higuchi et al. |
| 2018/0188774 A1 | 7/2018 | Ent et al. |
| 2018/0188803 A1 | 7/2018 | Sharma et al. |
| 2018/0189547 A1 | 7/2018 | Daniels et al. |
| 2018/0224871 A1 | 8/2018 | Sahu et al. |
| 2018/0321731 A1 | 11/2018 | Alfano et al. |
| 2018/0373292 A1 | 12/2018 | Perelli |
| 2019/0004764 A1 | 1/2019 | Son et al. |
| 2019/0034609 A1 | 1/2019 | Yang et al. |
| 2019/0079572 A1 | 3/2019 | Yamamoto |
| 2019/0129473 A1 | 5/2019 | Hu et al. |
| 2019/0147875 A1 | 5/2019 | Stemmer et al. |
| 2019/0155364 A1 | 5/2019 | Chen |

(56) References Cited

U.S. PATENT DOCUMENTS

| | | | |
|---|---|---|---|
| 2019/0155368 A1 | 5/2019 | Branover |
| 2019/0174419 A1 | 6/2019 | Schillings et al. |
| 2019/0236390 A1 | 8/2019 | Guo et al. |
| 2019/0239384 A1 | 8/2019 | North et al. |
| 2019/0250691 A1 | 8/2019 | Lee et al. |
| 2019/0258785 A1 | 8/2019 | Alameh et al. |
| 2019/0265831 A1 | 8/2019 | Sinnot et al. |
| 2019/0278339 A1 | 9/2019 | Cooper et al. |
| 2019/0361501 A1 | 11/2019 | Park et al. |
| 2019/0371326 A1 | 12/2019 | Bocklet et al. |
| 2019/0371342 A1 | 12/2019 | Tukka et al. |
| 2020/0012331 A1 | 1/2020 | De Cesare et al. |
| 2020/0026342 A1 | 1/2020 | Sengupta et al. |
| 2020/0033920 A1 | 1/2020 | Nielsen et al. |
| 2020/0134151 A1 | 1/2020 | Magi et al. |
| 2020/0092817 A1 | 3/2020 | Bai |
| 2020/0125158 A1 | 4/2020 | Giusti et al. |
| 2020/0125179 A1 | 4/2020 | Okuley |
| 2020/0133358 A1 | 4/2020 | Mishra et al. |
| 2020/0133374 A1 | 4/2020 | Sinha et al. |
| 2020/0142471 A1 | 5/2020 | Azam et al. |
| 2020/0175944 A1 | 6/2020 | Sun et al. |
| 2020/0213501 A1 | 7/2020 | Sohn |
| 2020/0259638 A1 | 8/2020 | Carmignani et al. |
| 2020/0348745 A1 | 11/2020 | Hamlin et al. |
| 2021/0025976 A1 | 1/2021 | Chandel et al. |
| 2021/0096237 A1 | 4/2021 | Patole et al. |
| 2021/0109585 A1 | 4/2021 | Fleming et al. |
| 2021/0240254 A1 | 8/2021 | Hamlin et al. |
| 2021/0318743 A1 | 10/2021 | Partiwala et al. |
| 2022/0147142 A1 | 5/2022 | Bui et al. |
| 2022/0334620 A1 | 10/2022 | Cooper et al. |
| 2022/0350385 A1 | 11/2022 | Mishra et al. |

FOREIGN PATENT DOCUMENTS

| | | |
|---|---|---|
| CN | 107077184 | 8/2017 |
| CN | 112558056 | 3/2021 |
| EP | 2518586 | 10/2012 |
| EP | 3285133 | 1/2019 |
| JP | H10-240389 | 9/1998 |
| JP | 2001255854 | 9/2001 |
| JP | 2002071833 | 3/2002 |
| JP | 2005221907 | 8/2005 |
| KR | 20150022673 | 3/2015 |
| KR | 20180029370 | 3/2018 |
| KR | 20190027930 | 3/2019 |
| WO | 2010071631 | 6/2010 |
| WO | 2014131188 | 9/2014 |
| WO | 2014186294 | 11/2014 |
| WO | 2014205227 | 12/2014 |
| WO | 2015026203 | 2/2016 |
| WO | 2020191643 | 1/2020 |
| WO | 2021258395 | 12/2021 |
| WO | 2022139895 | 6/2022 |

OTHER PUBLICATIONS

United States Patent and Trademark Office, "Final Office Action," issued in connection with U.S. Appl. No. 17/129,465, dated Jul. 7, 2023, 15 pages.

Samsung, "Samsung Galaxy Fold Now Available," Samsung Global Newsroom, dated Sep. 5, 2019, retrieved from https://news.samsung.com/global/samsung-galaxy-fold-now-available) on Jun. 8, 2023, 7 pages.

GSMArena team, "Samsung Galaxy Fold long-term review," GSMArena, dated Nov. 9, 2019, retrieved from https://www.gsmarena.com/samsung_galaxy_fold_long_term-review-1996p7.php on Jun. 8, 2023, 8 pages.

GSMArena team, "Samsung Galaxy Fold review," GSMArena, dated Apr. 26, 2019, retrieved from https://www.gsmarena.com/samsung_galaxy_fold-review-1926p4.php on Jun. 8, 2023, 8 pages.

United States Patent and Trademark Office, "Non-Final Office Action," issued in connection with U.S. Appl. No. 17/732,173, dated May 30, 2023, 28 pages.

United States Patent and Trademark Office, "Notice of Allowance and Fee(s) Due," issued in connection with U.S. Appl. No. 16/725,467, dated Jun. 29, 2023, 6 pages.

International Searching Authority, "International Preliminary Report on Patentability," issued in connection with PCT Application No. PCT/US2021/049649, dated Jun. 13, 2023, 10 pages.

"Dell's New Latitude 7400 2-in-1 Can Detect Your Presence and Automatically Wake the System," MSPowerUser, Jan. 4, 2019, available at https://mspoweruser.com/dells-new-latitude-7400-2-in-1-can-detect-your-presence-and-automatically-wake-the-system/ (20 pages).

Brian Reads, "Microsoft Windows Vista SideShow—In-Depth (pics)", Notebook Review, available at www.notebookreview.com/news/microsoft-windows-vista-sideshow-in-depth-pics/ (retrieved May 6, 2019), Jan. 11, 2006, 7 pages.

Chethan, "Proximity Sensing with CapSense," Cypress AN92239, 2016, 62 pages.

Cravotta, Nicholas, "Optimizing Proximity Sensing for Consumer Electronics Applications," Digi-Key Electronics, Apr. 26, 2012, 9 pages.

Cutress, "Asus ZenBook Pro 15(UX580): A 5.5-inch Screen in the Touchpad", retrieved from https://www.anandtech.com/show/12880/asus-zenbook-pro-15-ux580-a-55inch-screen-in-the-touchpad, Jun. 5, 2018, 5 pages.

European Patent Office, "Communication pursuant to Article 71(3) EPC," issued in connection with European Patent Application No. 20164273.3, dated Dec. 23, 2022, 78 pages.

European Patent Office, "Communication pursuant to Article 94(3) EPC," issued in connection with European Patent Application No. 20164273.3, dated Sep. 28, 2021 9 pages.

European Patent Office, "Communication pursuant to Article 94(3) EPC," issued in connection with European Patent Application No. 20194494.9, dated Jan. 24, 2023, 6 pages.

European Patent Office, "Extended European Search Report" issued in connection with European Patent Application No. 20194494.9, dated Feb. 17, 2021, 62 pages.

European Patent Office, "Extended European Search Report," issued in connection with European Patent Application No. 19921860.3, dated Oct. 10, 2022, 8 pages.

European Patent Office, "Extended European Search Report," issued in connection with European Patent Application No. 20164273.3, dated Oct. 9, 2020, 14 pages.

European Patent Office, "Extended European Search Report," issued in connection with European Patent Application No. 20197335.1, dated Jul. 16, 2021, 11 pages.

European Patent Office, "Extended European Search Report," issued in connection with European Patent Application No. 20197337.7, dated Mar. 9, 2021, 11 pages.

European Patent Office, "Extended Search Report," issued in connection with European Patent Application No. 20181123.9, dated Dec. 4, 2020, 11 pages.

European Patent Office, "Rule 62a(1) Communication," issued in connection with European Patent Application No. 20197335.1, dated Mar. 17, 2021, 2 pages.

Gajitz, "Open Sesame! Gesture-Controlled Motorized Laptop Lid", available at https://gajitz.com/open-sesame-gesture-controlled-motorized-laptop-lid/ (retrieved May 6, 2019), Sep. 2012, 3 pages.

Indiegogo, "Cosmo Communicator", available at https://www.indiegogo.com/projects/cosmo-communicator#/ (retrieved May 6, 2019), 2018, 18 pages.

Intellectual Property India, "Examination Report," issued in connection with Indian Patent Application No. 202147037534, dated Feb. 2, 2023, 6 pages.

International Searching Authority, "International Preliminary Report on Patentability," issued in connection with application No. PCT/CN2019/079790, dated on Sep. 28, 2021, 5 pages.

International Searching Authority, "International Preliminary Report on Patentability," issued in connection with PCT/US2016/048953, dated Mar. 27, 2018, 10 pages.

(56) References Cited

OTHER PUBLICATIONS

International Searching Authority, "International Search Report", issued in connection with PCT. Application No. PCT/US2021/049649, dated Jan. 14, 2022, 5 pages.
International Searching Authority, "International Search Report," issued in connection with PCT Application No. PCT/CN2022/084726, dated Jan. 4, 2023, 4 pages.
International Searching Authority, "International Search Report," issued in connection with PCT Application No. PCT/US2016/048953, dated Nov. 23, 2016.
International Searching Authority, "Invitation to Pay Additional Fees," issued in connection with PCT/US2021/049649, dated Nov. 26, 2021, 7 pages.
International Searching Authority, "Search Report and Written Opinion ," issued in connection with PCT Application No. PCT/CN2020/098326, dated Mar. 29, 2021, 9 pages.
International Searching Authority, "Search Report," issued in connection with application No. PCT/CN2019/079790, dated Jan. 3, 2020, 4 pages.
International Searching Authority, "Written Opinion of the International Searching Authority ," issued in connection with PCT Application No. PCT/US2016/048953, dated Nov. 23, 2016.
International Searching Authority, "Written Opinion", issued in connection with PCT. Application No. PCT/US2021/049649, dated Jan. 14, 2022, 9 pages.
International Searching Authority, "Written Opinion," issued in connection with application No. PCT/CN2019/079790, dated Jan. 3, 2020, 4 pages.
International Searching Authority, "Written Opinion," issued in connection with PCT Application No. PCT/CN2022/084726, dated Jan. 4, 2023, 4 pages.
Jack Purcher, "Google Patents a Motorized Pixelbook Lid that Opens and Closes with a Simple Touch & Auto-Aligns the Display to the user's Face", Patently Mobile, available at https://www.patentlymobile.com/2017/11/google-patents-a-motorized-pixelbook-lid-that-opens-and-closes-with-a-simple-touch-auto-aligns-the-display-to-the-users-fa.html (retrieved May 6, 2019), Nov. 25, 2017, 6 pages.
Japanese Patent Office, "Notice of Reasons for Rejection," issued in connection with Japanese Patent Application No. 2021-538701, dated Feb. 21, 2023, 7 pages (English translation included).
Kul Bushan, "CES 2019_ Dell's new laptop can sense your presence and wake itself" Hindustan Times, available at https://www.hindustantimes.com/tech/ces-2019-dell-latitude-7400-2-in-1-laptop-launched-price-specifications-features/story-CiRoU1GoHHsHq3K3qtPZWJ.html (retrieved May 6, 2019), Jan. 5, 2019, 8 pages.
Monica Chin, "Alexa on Windows 10 Hands-On: Useful, with 1 Big Catch", Laptop Magazine, available at https://www.laptopmag.com/articles/alexa-windows-10-hands-on (retrieved May 6, 2019), Nov. 14, 2018, 6 pages.
Notebook Review, "CES 2007: Vista SideShow in HP, Fujitsu, LG and Asus Notebooks," Notebook Review, available at www.notebookreview.com/news/ces-2007-vista-sideshow-in-hp-fujitsu-lg-and-asus-notebooks/ (retrieved May 6, 2019), Jan. 8, 2007, 8 pages.
Nvidia "PDK User's Guide: Preface Personal Media Device," Manual, published Sep. 4, 2007, 39 pages.
Nvidia, "Nvidia and ASUS Deliver World's First Notebook with Windows Sideshow Secondary Display," Press Release, available at https://www.nvidia.com/object/IO_38772.html (retrieved May 6, 2019), Jan. 8, 2007, 5 pages.
Nvidia, "Nvidia® Preface™ Platform Enables Windows Vista on the Go," Press Release, available at https://www.nvidia.com/object/IO_38775.html (retrieved May 6, 2019), Jan. 8, 2007, 5 pages.
Bogdan Popa, "Intel Considering Microsoft Surface Killer with Curved Display," Feb. 6, 2017, retrieved on Aug. 24, 2020, retrieved from https://news.softpedia.com/news/intel-considering-microsoft-surface-killer-with-curved-display-512636.shtml, 5 pages.

The Netherlands Patent Office, "Office Action," issued in connection with Netherlands Application No. 2029823, dated Mar. 15, 2023, 14 pages (Written Opinion Provided in English).
United States Patent and Trademark Office, "Non-Final Office Action," issued in connection with U.S. Appl. No. 16/421,217, dated Oct. 27, 2021, 42 pages
United States Patent and Trademark Office, "Advisory Action" issued in connection with U.S. Appl. No. 14/866,894, dated Aug. 17, 2020, 3 pages.
United States Patent and Trademark Office, "Advisory Action" issued in connection with U.S. Appl. No. 14/866,894, dated Nov. 5, 2019, 6 pages.
United States Patent and Trademark Office, "Advisory Action," issued in connection with U.S. Appl. No. 16/725,467, dated Jan. 4, 2023, 3 pages.
United States Patent and Trademark Office, "Advisory Action," issued in connection with U.S. Appl. No. 16/728,899, dated Oct. 5, 2022, 2 pages.
United States Patent and Trademark Office, "Corrected Notice of Allowability" issued in connection with U.S. Appl. No. 16/586,225, dated Mar. 16, 2022, 3 pages.
United States Patent and Trademark Office, "Corrected Notice of Allowability," issued in connection with U.S. Appl. No. 16/586,225, dated Dec. 16, 2021, 3 pages.
United States Patent and Trademark Office, "Corrected Notice of Allowability," issued in connection with U.S. Appl. No. 16/586,225, dated Dec. 7, 2022, 3 pages.
United States Patent and Trademark Office, "Corrected Notice of Allowability," issued in connection with U.S. Appl. No. 16/586,225, dated May 18, 2022, 3 pages.
United States Patent and Trademark Office, "Corrected Notice of Allowability," issued in connection with U.S. Appl. No. 16/586,225, dated Sep. 19, 2022, 2 pages.
United States Patent and Trademark Office, "Final Office Action" issued in connection with U.S. Appl. No. 14/866,894, dated Jul. 29, 2019, 27 pages.
United States Patent and Trademark Office, "Final Office Action" issued in connection with U.S. Appl. No. 14/866,894, dated Jun. 23, 2020, 33 pages.
United States Patent and Trademark Office, "Final Office Action," issued in connection with U.S. Appl. No. 14/866,894, dated May 11, 2021, 17 pages.
United States Patent and Trademark Office, "Final Office Action," issued in connection with U.S. Appl. No. 16/725,467, dated Aug. 18, 2022, 29 pages.
United States Patent and Trademark Office, "Final Office Action," issued in connection with U.S. Appl. No. 16/728,774, dated Sep. 22, 2021, 20 pages.
United States Patent and Trademark Office, "Final Office Action," issued in connection with U.S. Appl. No. 16/728,899, dated Jun. 24, 2022, 10 pages.
United States Patent and Trademark Office, "Final Office Action," issued in connection with U.S. Appl. No. 17/434,603, dated Feb. 8, 2023, 17 pages.
United States Patent and Trademark Office, "Non Final Office Action" issued in connection with U.S. Appl. No. 14/866,894, dated Feb. 21, 2020, 30 pages.
United States Patent and Trademark Office, "Non Final Office Action" issued in connection with U.S. Appl. No. 14/866,894, dated Oct. 8, 2020, 40 pages.
United States Patent and Trademark Office, "Non-Final Office Action" issued in connection with U.S. Appl. No. 14/866,894, dated Dec. 14, 2018, 24 pages.
United States Patent and Trademark Office, "Non-Final Office Action" issued in connection with U.S. Appl. No. 16/728,899, dated Dec. 8, 2021, 9 pages.
United States Patent and Trademark Office, "Non-Final Office Action" issued in connection with U.S. Appl. No. 16/728,899, dated Oct. 20, 2022, 9 pages.
United States Patent and Trademark Office, "Non-Final Office Action," issued in connection with U.S. Appl. No. 16/586,225, dated Jun. 15, 2021, 28 pages.

(56) References Cited

OTHER PUBLICATIONS

United States Patent and Trademark Office, "Non-Final Office Action," issued in connection with U.S. Appl. No. 16/725,467, dated Apr. 7, 2022, 19 pages.

United States Patent and Trademark Office, "Non-Final Office Action," issued in connection with U.S. Appl. No. 16/728,774, dated May 3, 2021, 12 pages.

United States Patent and Trademark Office, "Non-Final Office Action," issued in connection with U.S. Appl. No. 17/129,465, dated Jan. 5, 2023, 12 pages.

United States Patent and Trademark Office, "Non-Final Office Action," issued in connection with U.S. Appl. No. 17/434,603, dated Jul. 5, 2022, 15 pages.

United States Patent and Trademark Office, "Notice of Allowability," issued in connection with U.S. Appl. No. 29/673,785 dated Feb. 19, 2021, 2 pages.

United States Patent and Trademark Office, "Notice of Allowance and Fee(s) Due" issued in connection with U.S. Appl. No. 16/421,217, dated Mar. 24, 2022, 3 pages.

United States Patent and Trademark Office, "Notice of Allowance and Fee(s) Due" issued in connection with U.S. Appl. No. 16/421,217, dated Mar. 9, 2022, 14 pages.

United States Patent and Trademark Office, "Notice of Allowance and Fee(s) Due," issued in connection with U.S. Appl. No. 14/866,894, dated Jul. 30, 2021, 8 pages.

United States Patent and Trademark Office, "Notice of Allowance and Fee(s) Due," issued in connection with U.S. Appl. No. 16/586,225, dated Apr. 29, 2022, 6 pages.

United States Patent and Trademark Office, "Notice of Allowance and Fee(s) Due," issued in connection with U.S. Appl. No. 16/586,225, dated Aug. 31, 2022, 5 pages.

United States Patent and Trademark Office, "Notice of Allowance and Fee(s) Due," issued in connection with U.S. Appl. No. 16/725,467, dated Feb. 23, 2023, 9 pages.

United States Patent and Trademark Office, "Notice of Allowance and Fee(s) Due," issued in connection with U.S. Appl. No. 16/728,774, dated Feb. 2, 2022, 9 pages.

United States Patent and Trademark Office, "Notice of Allowance and Fee(s) Due," issued in connection with U.S. Appl. No. 17/856,587, dated Dec. 9, 2022, 9 pages.

United States Patent and Trademark Office, "Notice of Allowance and Fee(s) Due," issued in connection with U.S. Appl. No. 16/728,899, dated Apr. 3, 2023, 10 pages.

United States Patent and Trademark Office, "Notice of Allowance," issued in connection with U.S. Appl. No. 16/586,225, dated Dec. 8, 2021, 6 pages.

United States Patent and Trademark Office, "Notice of Allowance," issued in connection with U.S. Appl. No. 29/673,785, dated Nov. 16, 2020, 8 pages.

United States Patent and Trademark Office, "Requirement for Restriction," issued in connection with U.S. Appl. No. 29/673,785, dated Aug. 27, 2020, 4 pages.

United States Patent and Trademark Office, "Corrected Notice of Allowability," issued in connection with U.S. Appl. No. 17/856,587, dated Sep. 5, 2023, 2 pages.

United States Patent and Trademark Office, "Non-Final Office Action," issued in connection with U.S. Appl. No. 17/434,603, dated Sep. 7, 2023, 17 pages.

European Patent Office, "Communication pursuant to Article 94(3) EPC," issued in connection with European Patent Application No. 20197335.1, dated Oct. 5, 2023, 5 pages.

United States Patent and Trademark Office, "Non-Final Office Action," issued in connection with U.S. Appl. No. 29/771,488, dated Oct. 11, 2023, 6 pages.

United States Patent and Trademark Office, "Notice of Allowance and Fee(s) Due," issued in connection with U.S. Appl. No. 17/732,173, dated Oct. 25, 2023, 8 pages.

\* cited by examiner

METHODS AND APPARATUS TO OPERATE CLOSED-LID PORTABLE COMPUTERS

RELATED APPLICATION(S)

This patent arises from a continuation of U.S. patent application Ser. No. 17/856,587, which was filed on Jul. 1, 2022, and which was a continuation of U.S. patent application Ser. No. 16/421,217, which was filed on May 23, 2019. U.S. patent application Ser. No. 17/856,587 and U.S. patent application Ser. No. 16/421,217 are incorporated herein by reference in their entireties. Priority to U.S. patent application Ser. No. 17/856,587 and U.S. patent application Ser. No. 16/421,217 is claimed.

FIELD OF THE DISCLOSURE

This disclosure relates generally to computing, and, more particularly, to methods and apparatus to operate closed-lid portable computers.

BACKGROUND

Housings for laptop computers typically include a base portion that is rotationally coupled to a lid portion. The base portion of a laptop usually includes a keyboard that faces a display screen in the lid portion when the lid is closed against the base portion. Typically, laptop computers either shut down or go to an idle state when the lid is closed.

BRIEF DESCRIPTION OF THE DRAWINGS

The figures are not to scale. In general, the same reference numbers will be used throughout the drawing(s) and accompanying written description to refer to the same or like parts.

Figure 1:
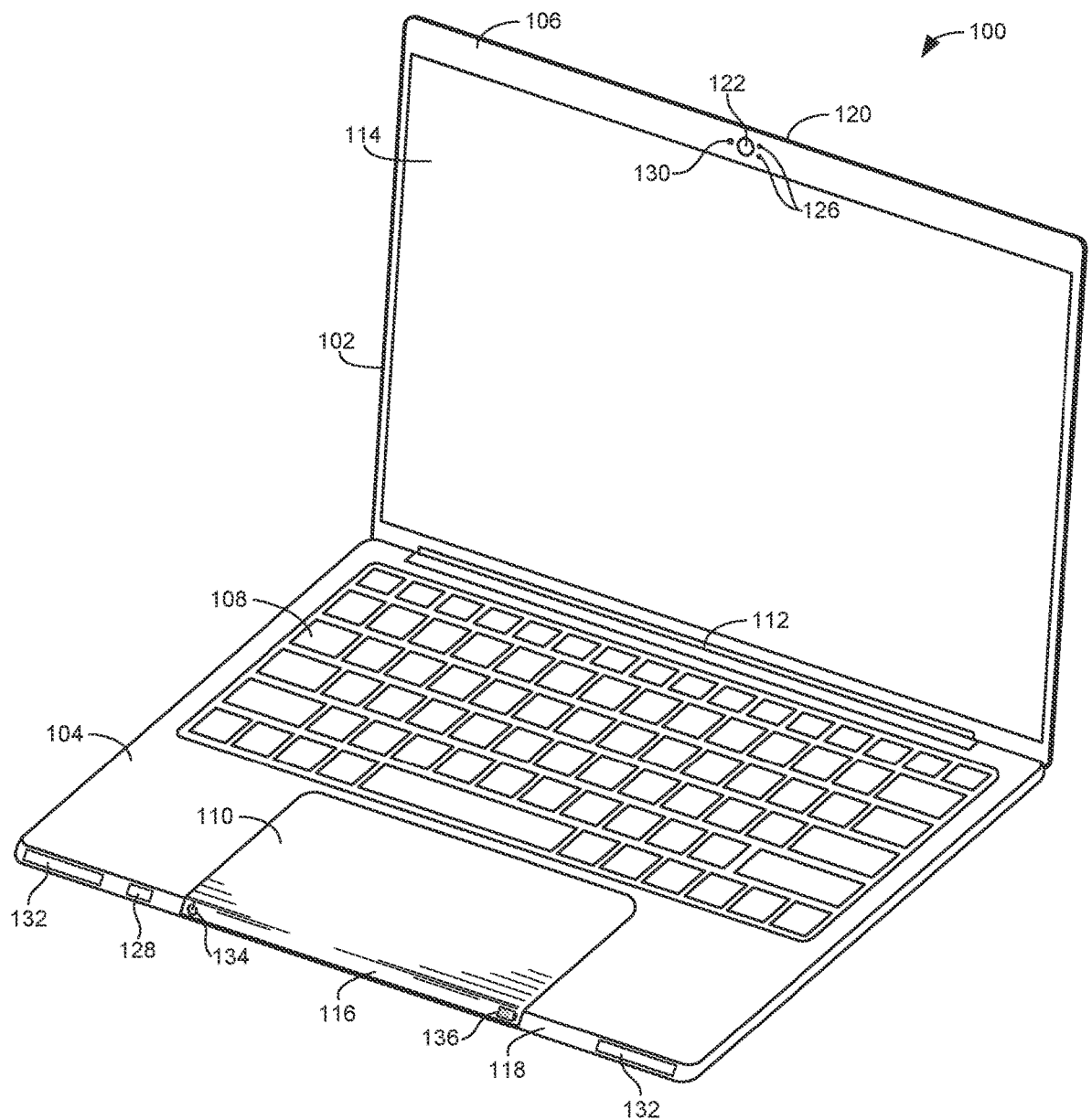
FIG. 1 illustrates an example portable computer constructed in accordance with teachings disclosed herein.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Many laptops and other similar portable computers today can provide virtually the same functionality as a desktop computer with the added feature of being easily carried by a user. The portability of a laptop and other clamshell devices is at least partially achieved in the design of the device housing that collapses on itself to reduce its size while protecting and/or concealing the display screen, keyboard, touchpad, and/or other components. More particular, the lid of such a portable computing device typically contains a display screen that folds down or closes upon a base of the housing. The base typically contains a keyboard (a physical keyboard or a virtual (e-ink or touch screen) keyboard), a touchpad, and/or the processor and/or other logic circuits to enable operation of the device. Some portable computing devices include a foldable display screen that extends across both the base and lid (with the keyboard and/or touchpad functionality integrated into the foldable display). While closing the lid of a clamshell device (e.g., a laptop) improves portability while protecting the user interface components of the device, many such devices do not provide any functionality while the lid is closed.

Example portable computers disclosed herein operate while the lid is closed to provide functionality previously only available when the computers are opened and turned on. Some examples portable computers disclosed herein operate in a low power or idle state when the lid is closed to conserve power. However, in some examples, the portable computer includes one or more sensors that remain active or turned on when the portable computer is in the lower power state with the lid closed. The sensors enable the portable computer to determine the context of the environment in which the portable computer is located to initiate appropriate actions that are responsive to the environment. For example, a human presence sensor on the portable computer may detect a person is approaching the closed computer. Upon detection of the person, the computer may initiate a user recognition process to identify or authenticate the person as an authorized user of the computer. If the person is recognized as an authorized user, the computer may wake up and automatically login the user so the user can immediately begin using the computer as soon as the lid is opened. In some examples, users may additionally or alternatively be authenticated based on voice recognition and/or in any other suitable manner. Further, in some examples, the computer may automatically open and/or initiate a particular application in response to detecting an indication of the user intended to access content associated with the particular application. Thus, examples disclosed herein enhance the user experience by enabling a portable computer to determine the context of its environment and to respond accordingly to provide a more seamless experience as a user seeks to open a closed portable computer (e.g., which may be in a sleep state) to begin using the device.

Further, in some examples, the portable computer may include a secondary display that is visible when the computer is closed (e.g., when a primary or main display is not visible). In some such examples, the secondary display may provide a graphical user interface containing user specific information that the user can access and/or interact without having to open the computer. In some examples, the active operation of the secondary display is associated with an intermediate power state that consumes more power than when the computer is in an idle or sleep state but less power than when the computer is open with full functionality provided via the primary display. In some examples, power consumption is reduced relative to the full power state by implementing operations associated with the secondary display via a secondary, low power processor that is separate from a main processor used when the computer is fully turned on. In some examples, interactions with the secondary display may trigger the operation of functionality associated with the primary display to provide users with a seamless experience as they initially interact with the computer with a closed lid (via the secondary display) and then transition to a full power state with the lid opened. Similarly, in some examples, functionally provided via the primary display may continue to be available via the secondary display event after the computer is closed so that the primary display is no longer turned on.

Figure 2:
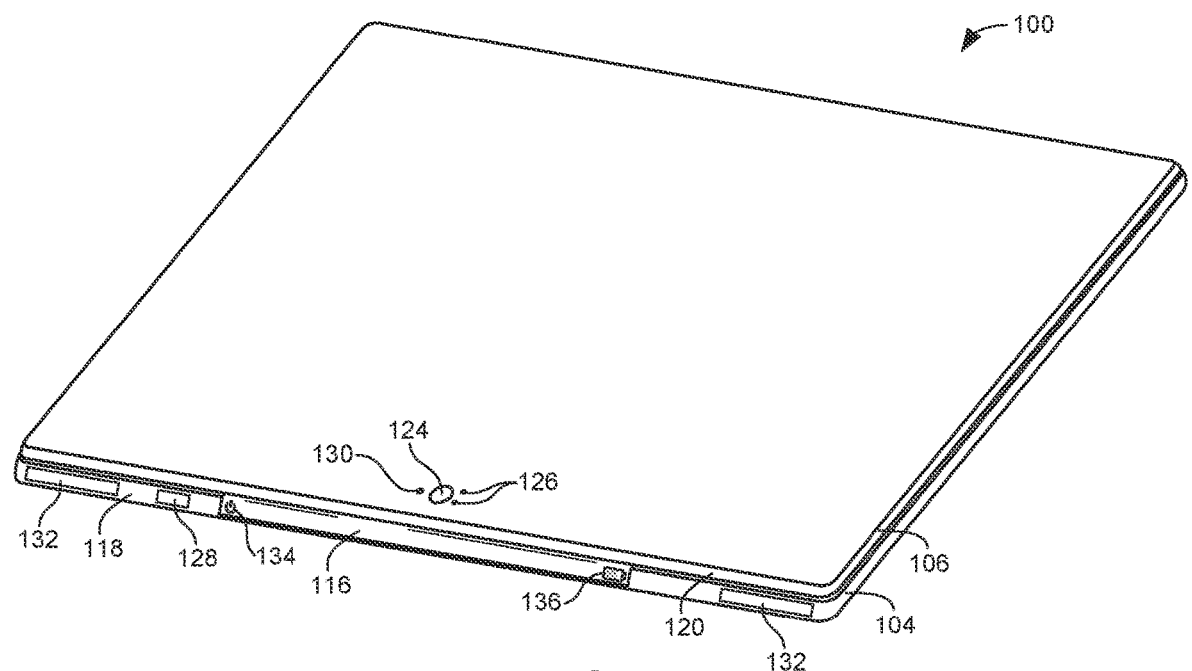
FIG. 2 illustrates the example portable computer of FIG. 1 with the lid in a closed position.

FIG. 1 illustrates an example portable computer 100 constructed in accordance with teachings disclosed herein. In this example, the portable computer 100 is a laptop. In other examples, the portable computer 100 may correspond to different types of clamshell computing devices. The example portable computer 100 includes a housing 102 that includes a base 104 and a top or lid 106. As shown in the illustrated example, the base 104 of the portable computer includes a keyboard 108 and a touchpad 110. The lid 106 includes a primary display screen 114 (or primary display for short). In the illustrated example, the base 104 and the lid 106 are connected via a hinge 112 to enable the lid 106 to rotate relative the base 104 between an open position (as shown in FIG. 1), and a closed position (as shown in FIG. 2). In some examples, the hinge 112 is constructed to open automatically without a user having to manually move the lid 106 from the closed position to the open position. Additionally or alternatively, in some examples, the hinge 112 is constructed to close automatically without a user having to manually move the lid 106 to the closed position.

For purposes of explanation, the primary display 114 in the lid 106 of the example portable computer 100 is referred to herein as a primary display to distinguish the primary display 114 from a secondary display screen 116 (or secondary display for short) that is also included on the portable computer 100. In this example, the secondary display 116 is an extension of the touchpad 110 that extends along a front edge 118 of the base 104 distal to the hinge 112. In the illustrated example, the secondary display 116 is positioned so as to be visible even when the lid 106 is closed as shown in FIG. 2. As used herein, reference to the portable computer 100 being closed and the lid 106 being closed are intended to convey the same thing, which is that the lid 106 is rotated about the hinge 112 to position a distal edge 120 of the lid 106 (top edge as viewed in FIG. 1) adjacent a distal edge of the base 104 (e.g., the front edge as viewed in FIG. 1) with the primary display 114 facing the base 104 in a generally parallel and/or face-to-face arrangement (although space between the base and the display is present in some examples). In some examples, the lid 106 is substantially parallel to the base 104 when in the closed position.

Although the secondary display 116 is shown as an extension of the touchpad 110, in other examples, the secondary display 116 may be separate from the touchpad 110. Additionally or alternatively, the secondary display may be located in a position different than what is shown in FIGS. 1 and 2. For example, the secondary display 116 may be positioned at a different location on the edge of the housing 102. In some examples, the secondary display 116 may be positioned on the lid 106 (e.g., along the distal edge 120). In some examples, the secondary display 116 is located in a position that is visible to a user facing the front of the portable computer 100 regardless of whether the portable computer 100 is opened or closed.

As shown in FIGS. 1 and 2, the example portable computer 100 includes a user facing camera 122 positioned on an inside surface of the lid 106 so as to face in a same direction as the primary display 114. Additionally, the example portable computer 100 includes a world facing camera 124 positioned on an outside surface of the lid 106 so as to face in the opposite direction to the primary display 114. In some examples, the user facing camera 122 and the world facing camera 124 are positioned at correspond locations on opposite sides of the lid 106. In some examples, the user facing camera 122 and the world facing camera 124 include panamorphic lenses to enable the capture of ultra wide-angle images (e.g., panoramic or hemispherical images). In some examples, the panamorphic lenses have a field of view of at least 180 degrees as measured within a plane extending substantially perpendicular to the lid 106 with a 360 degree rotational view as measured in a plane substantially parallel to the lid 106. As a result, when the lid 106 is open and both cameras 122, 124 are turned on, it is possible to capture a 360 degree image of the surrounding environment in all directions (e.g., on both sides of the lid 106). Further, when the portable computer 100 is resting on a substantially flat surface with the lid 106 closed, the world facing camera 124 may be able to capture a 360 degree image of the surrounding environment (at least for areas above a plane defined by the outer surface of the lid 106). Accordingly, in some examples, the world facing camera 124 is able to monitor the environment surrounding the portable computer 100 when closed to determine a context that can be used as the basis to perform particular operations. In some examples, the portable computer 100 implements facial recognition procedures to uniquely identify a person detected in the vicinity of the computer to confirm or authenticate the person as an authorized user of the computer. In some such examples, once a user is authenticated in this manner, the computer may log the user into the computer and/or perform other suitable actions based on the authentication. Thus, users may be authenticated and logged into their computers before they have lifted the lid to their portable computers to begin using the devices (i.e., they may be authenticated while the lid is closed).

In some examples, the portable computer 100 includes light indicators 126 (e.g., LEDs) that turn on to indicate when a corresponding one of the cameras 122, 124 is on and capturing image data. As shown in the illustrated example, there are two light indicators 126 adjacent each of the cameras 122, 124 to indicate the active status of both cameras 122, 124. In other examples, only a single light indicator 126 is positioned adjacent each camera 122, 124 to indicate the status of the adjacent camera. In some examples, the light indicators 126 are positioned at a different location relative to the cameras 122, 124 (e.g., on the base 104 of the portable computer 100). In some examples, the light indicators 126 are omitted.

In some examples, the portable computer includes other sensors that may be used to monitor aspects of the environment surrounding the portable computer 100 while the computer is closed (or open). For instance, in some examples, the portable computer 100 may include one or more human presence sensors 128 (e.g., a motion sensor) to detect the presence of a person in the vicinity of the portable computer 100. In some examples, activation of the world facing camera 124 when the portable computer 100 is closed is triggered by the human presence sensor 128 detecting a person (or at least some movement that may be caused by a person). Whether a person caused the movement (and whether the person is recognizable as an authorized user) can be verified based on image analysis of data captured by the camera 124). Thus, in some examples, the world facing camera 124 is not always on when the computer is in a low powered idle state unless triggered by the human presence sensor 128, thereby reducing power consumption in the low powered state. In other examples, the world facing camera 124 may always be turned on (unless configured by the user to be off). In some examples, the one or more human presence sensors 128 may be positioned to detect movement (e.g., people) in all direction. In other examples, the one or more human presence sensors 128 may be limited to monitoring an area in front of the portable computer 100 so as to avoid false positives triggering the world facing camera 124 (or other functionality) when detecting movement behind the portable computer 100.

In the illustrated example, the portable computer 100 includes one or more microphones 130 to detect sounds in the environment surrounding the portable computer 100. In some examples, different microphones 130 are located adjacent each of the cameras 122, 124 on either side of the lid to enable audio monitoring whether the lid 106 is opened or closed. Additionally or alternatively, one or more microphones 130 may be placed at different locations (e.g., the front edge 118 of the base 104) to capture sounds regardless of the position of the lid 106. In some examples, the audio data captured by the microphones may be used as a separate technique to authenticate and log a user into a portable computer 100 while the computer is closed. More particularly, in some examples, the portable computer 100 may use voice recognition procedures to recognize a particular voice command stated by a nearby user. In some examples, the microphones 130 may be triggered by the human presence sensor 128. In other examples, the microphones 130 may operate independent of the human presence sensor 128 to capture voice commands of people that are beyond the reliable range of the human presence sensor 128.

The example computer includes one or more speakers 132 to provide audible outputs to a user. In some examples, the speakers 132 are positioned on an exterior surface of the portable computer 100 (e.g., the front edge 118 of the base 104) so that sound produced by the speakers can be heard by users regardless of whether the lid 106 is opened or closed. In some examples, the portable computer 100 may include additional (e.g., larger) speakers that are covered by the lid 106 when the computer 100 is closed. Such speakers may only be operational when the portable computer 100 is open.

As mentioned above, the example portable computer 100 includes a secondary display 116 that is visible when the lid 106 is closed. In some examples, the secondary display 116 is capable of rendering graphical user interface content that changes based on the circumstances detected by the computer sensors and/or based on user inputs. For instance, the content rendered via the secondary display 116 may depend on whether a user is logged in to the portable computer 100. In some examples, the content rendered via the secondary display 116 may depend on how close the user is to the portable computer 100 and/or the position and/or orientation of the person relative to the portable computer 100. In some examples, the content rendered via the secondary display 116 may depend on the setting in which the portable computer 100 is located (e.g., at home, at work, in a public area, etc.).

In the illustrated example, the secondary display 116 includes a rendering of a power icon 134 and a battery power icon 136. In the illustrated example, the secondary display icon 116 is touch sensitive so that a user may interact with the display. In some examples, the touch sensor for the secondary display 116 is the same as the touch sensor for the touchpad 110. In other examples, user inputs detected by secondary display 116 may be accomplished independent of the sensor system of the touchpad 110.

In some examples, the icons and/or other content rendered via the secondary display 116 are associated with particular operations that are invoked when the associated icons and/or content is touched by a user. For example, a user may touch the power icon 134 to turn on or off the secondary display 116. Additionally or alternatively, touching the power icon 134 may turn off the entire portable computer 100. In some examples, interactions of a user with the icons and/or other content on the secondary display may result in different actions by the portable computer 100 depending on the context in which a user interacts with the secondary display 116. For instance, in some examples, a user selecting a particular icon rendered on the secondary display 116 may perform one function when the portable computer 100 is closed and a different function when the portable computer 100 is opened and in a full power state. In some examples, user interactions with the secondary display 116 may affect content that is rendered via the primary display 114. Similarly, user interactions with the primary display 114 (and/or the associated keyboard 108 or touchpad 110) may affect content that is (and/or will be) rendered via the secondary display 116. Further, in some examples, content rendered via either the primary display 114 and/or the secondary display 116 may be controlled using voice commands without a user physically touching the secondary display 116 or any other component of the portable computer 100.

In some examples, the content rendered via the secondary display and/or functionality associated with such content (e.g., when selected by a user) may depend on whether the user has been authenticated and/or logged into the computer. As mentioned above, in some examples, a user may be logged in automatically based on facial and/or voice recognition. In some examples, when a user has not been authenticated or logged in, the secondary display 116 renders a generic secondary user interface 300 (e.g., displaying the time, date, and power icon 134) as shown in the illustrated example of FIG. 3. By contrast, when a user has been authenticated, a personalized secondary user interface 400 (e.g., displaying a user specific message 402 and/or other personalized information including one or more other icons) may be rendered via the secondary display as shown in the illustrated example of FIG. 4. As used herein, the term "secondary user interface" refers to rendered content and associated user-interactive functionality provided via the secondary display 116 to distinguish such from a "primary user interface" that corresponds to rendered content and associated user-interactive functionality provided via the primary display 114.

Figure 3:
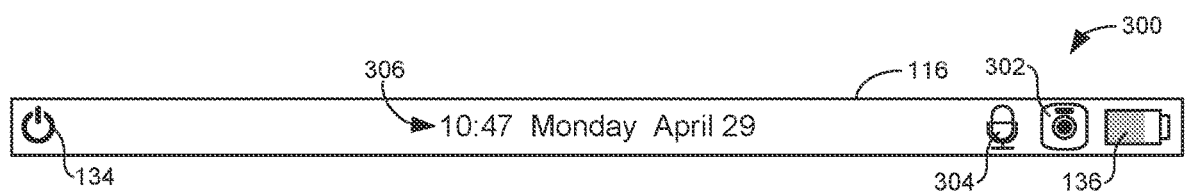
FIGS. 3 and 4 illustrate example secondary user interfaces rendered on the example secondary display of the example portable computer of FIGS. 1 and 2
Figure 4:
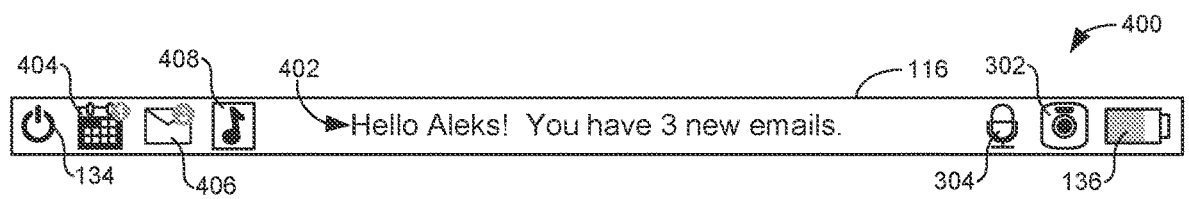

As shown in the illustrated examples of FIGS. 3 and 4, both the generic and personalized secondary user interfaces 300, 400 include the power icon 134 and the battery power icon 136. However, in some examples, only an authorized user may be able to turn off the secondary display 116 by selecting the power icon. By contrast, if an unauthorized (e.g., unauthenticated) user selects the power icon 134, the secondary display 116 may prompt the user to provide authentication information (e.g., request the user hold still while the world facing camera 124 captures an image for facial recognition purposes, request the user to repeat a statement used for voice recognition, etc.).

Both the generic and personalized secondary user interfaces 300, 400 of FIGS. 3 and 4 also include a camera icon 302 and a microphone icon 304. In some examples, the camera icon 302 indicates when the world facing camera 124 and/or the user facing camera 122 is turned on to capture image data. Similarly, the microphone icon 304 indicates whether the one or more microphones 130 are turned on to capture audio data. In some examples, a user may select the camera icon 302 and/or the microphone icon 304 to toggle the corresponding camera or microphone on or off (e.g., to mute the microphone). In some such examples, the appearance of the icons 302, 304 may change in appearance (e.g., color, brightness, etc.) to indicate when the associated microphone or camera is turned on or turned off. However, in some examples, only when the user has been authenticated and logged in is this toggling functionality enabled.

The main middle section of the secondary display 116 includes generic information 306 (e.g., time and date) when the generic secondary user interface 300 is rendered as shown in FIG. 3. By contrast, as shown in the illustrated example of FIG. 4, where a user has been authenticated and logged into the system, the personalized secondary user interface 400 includes personalized information 402 such as, for example, an identification or greeting of the user (e.g., with the user's name), and notifications about any pertinent information such as new emails, upcoming calendar appointments, etc. Further, in some examples, the secondary display 116 may render additional icons that the user can select to obtain more information and/or implement other actions. For instance, in the illustrated example of FIG. 4, the personalized secondary user interface 400 includes a calendar icon 404 to enable users to access their calendars, an email icon 406 to enable users to access their emails, and a music player icon 408 to enable users to access their music. There may be any other number of icons or other content provided to the user via the secondary display 116. In some examples, when the user selects on a particular icon associated with user-specific information, the user-specific information may be displayed via the secondary display 116. Additionally or alternatively, selecting such information (e.g., by touching the relevant content via the secondary display 116 or via a voice command) may trigger the portable computer 100 to wake up so that the user-specific information is automatically rendered via the primary display 114 once the portable computer 100 is opened. Further, in some examples, selecting such information may trigger to automatically open and begin rendering the relevant content via the primary display 114.

Figure 5:
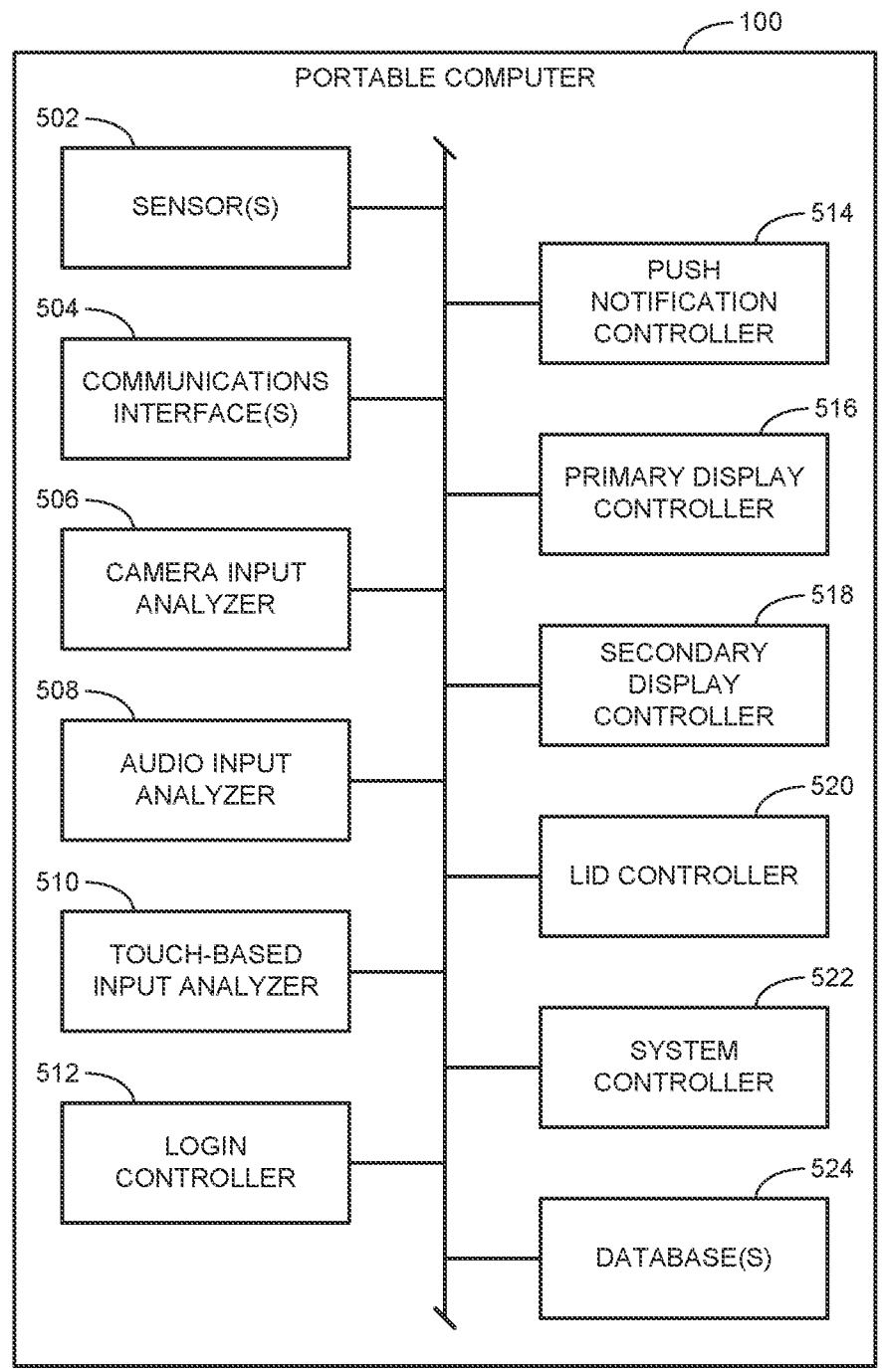
FIG. 5 is a block diagram illustrating an example implementation of the example portable computers of FIGS. 1 and 2.

FIG. 5 is a block diagram illustrating an example implementation of the portable computer 100 of FIGS. 1 and 2. In this example, the portable computer 100 includes one or more example sensor(s) 502, one or more example communications interface(s) 504, an example camera input analyzer 506, an example audio input analyzer 508, an example touch-based input analyzer 510, an example login controller 512, an example push notification controller 514, an example primary display controller 516, an example secondary display controller 518, an example lid controller 520, an example system controller 522, and one or more example database(s) 524.

The example sensor(s) 502 include any sensors that may be implemented to monitor or detect the circumstances or context of an environment surrounding the portable computer 100 and/or alternatively to detect or enable interactions with the portable computer 100 by a user. Thus, for example, the sensor(s) 502 include a touch sensor associated with the secondary display 116 (which may be the same as or different than a touch sensor associated with the touchpad 110) to detect a user's interactions with the secondary display 116. The example sensor(s) 502 include the example user facing camera 122 and the example world facing camera 124 to capture images of the user and/or the surrounding environment. The example sensor(s) 502 include the one or more example microphones 130 to capture audio (e.g., voice commands) from a user within audible range of the portable computer 100. The example sensor(s) 502 include the example human presence sensor 128 (e.g., a motion sensor) to detect motion in the vicinity of the portable computer 100 that may be indicative of a nearby person. The example sensor(s) 502 may include any other suitable sensor devices that collect relevant sensor data that may be used by the portable computer 100 to determine a current context. For example, the sensor(s) 502 may include an accelerometer, a gyroscope, and/or a magnetometer to determine motion, position, and/or orientation of the portable computer 100. As another example, the sensor(s) 502 may include a fingerprint scanner to authenticate users based on their fingerprints. In some examples, one or more of the sensor(s) 502 may be powered on to collect sensor data while the portable computer 100 is closed and/or otherwise in a low power or idle state.

The example portable computer 100 of FIG. 5 includes one or more communication interface(s) 504 to enable the computer to communicate with other devices in a wired or wireless manner. For instance, in some examples, the communication interface(s) 504 includes an Ethernet jack to enable the portable computer 100 to be physically wired to a network. Additionally or alternatively, the communications interface(s) 504 may include wireless communications circuitry to communicate with other devices wireless (e.g., via Wi-Fi, Bluetooth, and/or a mobile telephone network). In some examples, the portable computer 100 may be connected to a cloud network (e.g., the Internet) via the communications interface to transmit data to and/or retrieve data from remote servers that may be used by the portable computer 100. In some examples, the communications interface 504 may receive push notifications from remote servers and/or other devices that are subsequently processed and/or initiate particular actions. For example, push notifications may correspond to the receipt of new email messages, incoming conference calls, a request from a nearby device to connect with the computer to share a file or other document, a file or other document shared by a nearby device designated as a trusted device for file sharing purposes, etc. In some examples, one or more of the communication interface(s) 504 may be powered on to send or receive data while the portable computer 100 is closed and in a low power and/or intermediate power state that consumes less power than when the computer is opened and fully active (e.g., with the primary display 114 turned on to render content for a user).

The example camera input analyzer 506 of the illustrated example of FIG. 5 processes and/or analyzes image data captured by the user facing camera 122 and/or the world facing camera 124. In some examples, the camera input analyzer 506 is implemented to authenticate a user of the portable computer 100 based on a facial recognition analysis of an image of the user's face. In some examples, this facial recognition analysis may be performed while the portable computer 100 is closed so that a user may be authenticated and logged into the portable computer 100 before the user opens (or even touches) the portable computer 100. In some examples, the camera input analyzer 506 may transmit image data to a remote server (e.g., via the communications interface 504) to perform the facial recognition. In other examples, the facial recognition may be performed locally on the portable computer 100 by comparing image data to reference user authentication data (e.g., reference images of authorized users) stored in the database(s) 524. In some examples, the camera input analyzer 506 may implement other actions on the portable computer 100 based on an analysis of image data captured by one of the cameras 122, 124. For example, the camera input analyzer 506 may determine the context in which the computer is located (e.g., public versus private setting) to determine whether to display private information to the authenticated user. In other examples, the camera input analyzer 506 may monitor movement of the user for particular gestures (e.g., hand motions) intended to control operation of the portable computer 100.

The example audio input analyzer 508 of the illustrated example of FIG. 5 processes and/or analyzes audio data captured by the microphones 130 on the portable computer 100. In some examples, the audio input analyzer 508 is implemented to authenticate a user of the portable computer 100 based on a voice recognition analysis of captured audio corresponding to the voice of a user. In some examples, this voice recognition analysis may be performed while the portable computer 100 is closed so that a user may be authenticated and logged into the portable computer 100 before the user opens (or even touches) the portable computer 100. In some examples, the audio input analyzer 508 may transmit audio data to a remote server (e.g., via the communications interface 504) to perform the voice recognition. In other examples, the voice recognition may be performed locally on the portable computer 100 by comparing image data to reference user authentication data (e.g., reference images of authorized users) stored in the database(s) 524. In some examples, the audio input analyzer 508 may analyze audio input to detect voice commands from a user to enable the user to interact and/or control the portable computer 100 without touching the device. As with the voice recognition, such voice detection may be implemented locally on the computer or accomplished via a remote server. In some examples, the audio input analyzer 508 may determine whether a detected voice command is to be implemented based on whether or not the person providing the command is an authorized user (e.g., authenticated based on voice recognition).

The example touch-based input analyzer 510 of the illustrated example of FIG. 5 processes and/or analyzes touch-based data captured by a touch sensor associated with the touchpad 110 and/or the secondary display 116. Inasmuch as the secondary display 116 is visible and available for user interaction when the computer lid 106 is closed, the touch-based input analyzer 510 may be powered and operating while the portable computer 100 is closed. In some examples, the touch-based input analyzer 510 is always powered when the portable computer 100 is turned on, even when the computer is in a low power or sleep state. In other examples, the touch-based input analyzer 510 may be activated in response to detection of a person in the vicinity of the portable computer 100 by the human presence sensor 128. In other examples, the touch-based input analyzer 510 is activated only after a user has been authenticated (e.g., via facial recognition and/or voice recognition).

The example login controller 512 of the illustrated example of FIG. 5, determines when and whether to login or logout a user on the portable computer 100. In some examples, the login controller 512 determines to login a user after the user has been authenticated visually by the camera input analyzer 506 and/or audibly by the audio input analyzer 508. In some examples, if not of the sensor(s) 502 detect any activity for a threshold period of time, the login controller 512 may automatically logout a user current logged in to the portable computer 100. In some examples, the login controller 512 may be powered or turned on while the portable computer 100 is still closed to enable a user to login to the portable computer 100 without having to open the portable computer 100 and wait for the device to boot up.

The example push notification controller 514 of the illustrated example of FIG. 5 analyzes and/or controls responses to push notifications received from remote sources via the communications interface. For instance, in some examples, the push notification controller 514 causes an audio, visual, and/or haptic signal to be generated to alert a user of an incoming notification. In some examples, whether such a notification is generated and/or the nature of the notification (e.g., the amount of detail included with the notification) may depend on whether a user is logged in as determined by the login controller 512. Further, in some examples, the push notification controller 514 may generate and/or determine different options a user may select to respond to an incoming notification. For instance, one option may be for a user to dismiss the notification and respond later, a second option may be for a user to provide a quick reply (e.g., a short preset text message), and a third option may be for the user to provide a detailed response (e.g., immediately answer an incoming conference call, begin drafting a reply email, etc.). In some examples, the push notification controller 514 may be powered or turned on while the portable computer 100 is still closed to enable a user to respond to incoming push notifications while the computer is closed (e.g., via the secondary display 116).

In the illustrated example of FIG. 5, the primary display controller 516 serves to control the operation of the primary display 114 and to facilitate the rendering of content (e.g., primary user interfaces) via the primary display. The example secondary display controller 518 of FIG. 5 serves to control the operation of the secondary display 116 and to facilitate the rendering of content (e.g., secondary user interfaces) via the secondary display. In some examples, the primary display controller 516 and the secondary display controller 518 update the rendering of content on the respective displays 114, 116 based on outputs of one or more of the example sensor(s) 502, the example communications interface(s) 504, the example camera input analyzer 506, the example audio input analyzer 508, the example touch-based input analyzer 510, the example login controller 512, and/or the example push notification controller 514. In some examples, the nature of content rendered by the primary display controller 516 and the secondary display controller 518 depends on whether there is an authorized or authenticated user logged into the portable computer 100.

Further, in some examples, content accessed and/or interacted with by a user on one of the displays 114, 116 may affect content rendered via the other display. For instance, in some examples, when a user launches an application having a primary user interface to be rendered via the primary display 114, the secondary display controller 518 may automatically launch a corresponding secondary user interface associated with the application to be rendered via the secondary display 116. As a specific example, a user may launch a media player via the primary display 114, which may cause the secondary display controller 518 to render a secondary user interface via the secondary display 116 that contains control options (e.g., play, pause, skip, backward, forward, volume controls, etc.) that enable a user to control the playback of media (e.g., videos, music, etc.) shown in an application user interface rendered on the primary display 114.

In the above examples, user interactions with the primary display 114 (and the associated primary display controller 516) result in changes to the secondary display 116 based on operations of the secondary display controller 518. Similarly, user interactions with the secondary display 116 (and the associated secondary display controller 518) may cause the primary display controller 516 to implement operations affecting content rendered via the primary display 114. As a specific example, the secondary display controller 518 may render the email icon 406 shown in FIG. 4 when the user has new emails to read. If the user selects the email icon 406 (either by touching the icon or through a voice command), the secondary display controller 518 may render basic details about the new emails (e.g., sender name, subject line, etc.). If the user selects a particular email listed on the secondary display 116, the primary display controller 516 may initiate or render a primary user interface for an email application via the primary display 114 for the user to view the entire email and/or to reply as appropriate.

As described above, while the primary display 114 is not visible when the lid 106 of the portable computer 100 is closed, the secondary display 116 remains visible. Accordingly, in some examples, the secondary display controller 518 remains powered and/or in operation while the computer is closed. By contrast, in some examples, the primary display controller 516 is powered and/or in operation only when the lid 106 is opened. However, in some examples, the primary display controller 516 may be turned on or activated before the lid 106 is opened based on an indication of intent of the user to open the lid 106 to begin accessing content using the primary display 114. For instance, assume that the portable computer 100 is closed in the above example when the user selects a particular email via the secondary display 116 to view in further detail. In some such examples, the secondary display controller 518 may communicate the intent of the user to view the email via the primary display while the portable computer 100 is still closed, thereby causing the secondary display controller 518 to activate and turn on the primary display 114 to render the email within a primary user interface associated with a corresponding email application. Thus, although the primary display controller 516 may be turned on while the computer is closed, in some examples, activation of the primary display controller 516 corresponds with activation of the computer to a full power (awake) state.

As outlined above, operation of the primary display controller 516 is associated with the portable computer 100 being in a full power state. By contrast, the secondary display controller 518 may operate in a lower power state (e.g., idle/sleep state and/or an intermediate power state). In some examples, to improve (e.g., optimize) the power consumption of the portable computer 100 in the different power states, the primary display controller 516 and the secondary display controller 518 may be implemented on different processors including a main processor for use when the portable computer 100 is in a full power state and a second low power processor for use when the computer is in a lower power state. In some such examples, certain aspects of functionalities of the other components of the portable computer 100 shown in FIG. 5 may be implemented by the main processor while other aspects or functionalities are implemented by the low power processor.

The example lid controller 520 of the illustrated example controls and/or monitors the positional relationship of the lid 106 and the base 104 of the portable computer 100 about the hinge 112. More particularly, in some examples, the lid controller 520 determines when the portable computer 100 is closed and when the computer is closed. In some examples, opening and closing the portable computer 100 may trigger a transition of the portable computer 100 between different power states, which may affect the type of content that is rendered via the displays 114, 116 and/or what displays 114, 116 are used to display content. Further, in some examples, the lid controller 520 is able to control the hinge 112 to automatically open the lid 106 without a person manually moving the lid 106 open. Additionally or alternatively, in some examples, the lid controller 520 is able to control the hinge 112 to automatically close the lid 106 without a person manually moving the lid 106 closed. In some examples, the automatic opening and/or closing of the lid 106 is performed in response to user inputs (e.g., via a voice command, via a touch-based user selection on the secondary display 116, etc.). In some examples, the hinge 112 is associated with a spring to automatically open and/or close the lid 106 in response to the lid controller 520 releasing a latch securing the lid 106 in closed or open position. In other examples, the hinge 112 is associated with a motor to automatically open and/or close the lid 106.

The example system controller 522 of the illustrated example of FIG. 5 serves to oversee, control and/or facilitate interactions between different ones of the components of the portable computer 100 shown in FIG. 5 and/or other components of the portable computer 100 not represented in the illustrated example.

As mentioned above, the example database(s) 524 may store user authentication data to enable the camera input analyzer 506 to recognize a person captured in an image as an authorized user and/or to enable the audio input analyzer 508 to recognize a person as an authorized user based on the voice of the user. Further, in some examples, the database(s) 524 include a database of voice commands that may be identified by the audio input analyzer 508 (regardless of whether the voice is recognized as corresponding to a unique individual) to enable voice detection of commands locally on the portable computer 100 without the need for transmitting audio data to or otherwise communicating with a remote server. Further, in some examples, the database(s) 524 store user preferences pertaining to the operation of the secondary display 116 and/or the content rendered via the display 116 both when no authorized user has been recognized and when an authorized user has been recognized.

While an example manner of implementing the example portable computer 100 of FIGS. 1 and 2 is illustrated in FIG. 5, one or more of the elements, processes and/or devices illustrated in FIG. 5 may be combined, divided, re-arranged, omitted, eliminated and/or implemented in any other way. Further, the example sensor(s) 502, the example communications interface(s) 504, the example camera input analyzer 506, the example audio input analyzer 508, the example touch-based input analyzer 510, the example login controller 512, the example push notification controller 514, the example primary display controller 516, the example secondary display controller 518, the example lid controller 520, the example system controller 522, the example database(s) 524 and/or, more generally, the example portable computer 100 of FIG. 5 may be implemented by hardware, software, firmware and/or any combination of hardware, software and/or firmware. Thus, for example, any of the example sensor(s) 502, the example communications interface(s) 504, the example camera input analyzer 506, the example audio input analyzer 508, the example touch-based input analyzer 510, the example login controller 512, the example push notification controller 514, the example primary display controller 516, the example secondary display controller 518, the example lid controller 520, the example system controller 522, the example database(s) 524 and/or, more generally, the example portable computer 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor(s) 502, the example communications interface(s) 504, the example camera input analyzer 506, the example audio input analyzer 508, the example touch-based input analyzer 510, the example login controller 512, the example push notification controller 514, the example primary display controller 516, the example secondary display controller 518, the example lid controller 520, the example system controller 522, and/or the example database(s) 524 is/are hereby expressly defined to include a non-transitory computer readable storage device or storage disk such as a memory, a digital versatile disk (DVD), a compact disk (CD), a Blu-ray disk, etc. including the software and/or firmware. Further still, the example portable computer 100 of FIGS. 1 and 2 may include one or more elements, processes and/or devices in addition to, or instead of, those illustrated in FIG. 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
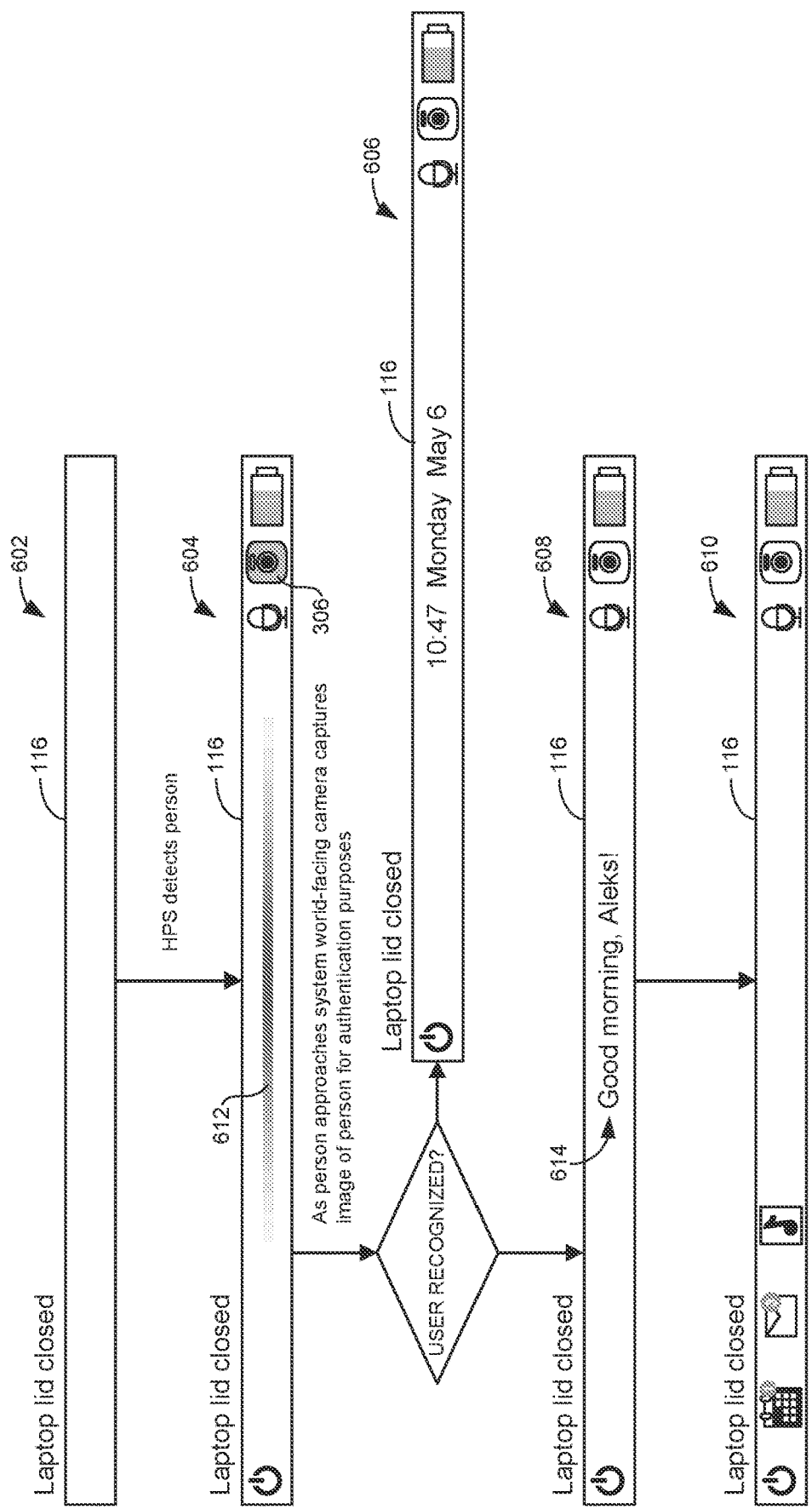
FIGS. 6-11 illustrate example secondary user interfaces that may be rendered on the example secondary display as a user interacts with the example portable computer of FIGS. 1, 2, and/or 5.

FIGS. 6-11 illustrate example secondary user interfaces rendered on the secondary display 116 as a user interacts with the example portable computer 100 in different ways. In particular, FIG. 6 illustrates different secondary user interfaces rendered via the secondary display 116 at different stages 602, 604, 606, 608, 610 in time during a wakeup sequence for the secondary display 116. In the illustrated example, the portable computer 100 begins in a lower power idle state with the lid 106 closed and the secondary display 116 in an idle or sleep state. As such, at the initial stage 602 in the sequence, the secondary display 116 does not include any content rendered thereon. In this low power idle state of the portable computer 100, the human presence sensor 128 is monitoring for people in the vicinity of the portable computer 100. Once the human presence sensor 128 detects a person, the sequence advances to the second stage 604 where the secondary display 116 is activated. Further, in this example, the world facing camera 124 is activated to capture an image of the detected person for authentication purposes (e.g., based on facial recognition). In some examples, the secondary display 116 displays an indication that the camera 124 is capturing an image and/or analyzing the captured image. In some examples, the indication may correspond to changing an appearance of the camera icon 302 and/or including an additional icon and/or animation 612 in the central region of the secondary display 116. The icon and/or animation 612 may convey to a user the time period during which the user may choose to hold still facing the camera to facilitate the user recognition. The camera input analyzer 506 then determines whether the detected person can be recognized as an authorized user. If not, the process moves to the third stage 606 where a generic secondary user interface is provided (e.g., similar to the secondary user interface 300 discussed above in connection with FIG. 3). If the person is recognized, the process advances to the fourth stage 608 where the secondary display controller 518 causes the secondary display 116 to render an acknowledgement (e.g., a greeting 614 identifying the user by name) that the user was recognized. In some examples, the system controller 522 may additionally cause speakers 132 to provide an audible greeting and/or other audible notification indicating the user has been recognized and logged into the portable computer 100 as an authorized user. Thereafter, at the fifth stage 610, the secondary display 116 renders a personalized home screen containing personalized information and/or icons that enable the user to access personalized information. In some examples, the personalized home screen may be similar to the secondary user interface 400 discussed above in connection with FIG. 4.

Figure 7:
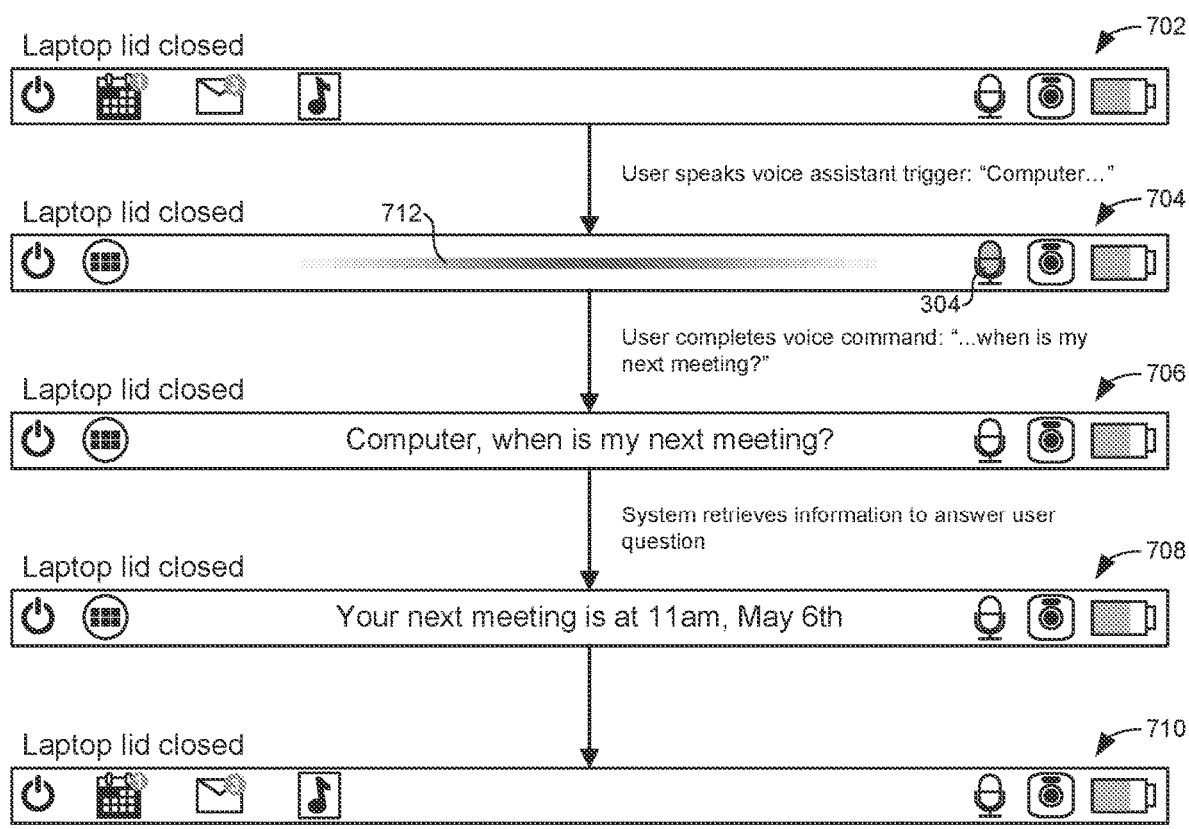

FIG. 7 illustrates different secondary user interfaces rendered via the secondary display 116 at different stages 702, 704, 706, 708, 710 in time associated with responding to a voice command from a user. As with FIG. 6, all of the stages 702, 704, 706, 708, 710 in FIG. 7 occur with the lid 106 of the portable computer 100 closed. Further, all of the stages 702, 704, 706, 708, 710 in FIG. 7 may be performed while the portable computer 100 is in a lower power state (e.g., less than in a full power state). In this example, the first stage 702 corresponds to the secondary display 116 rendering the personalized home screen indicating that a user has already been recognized and logged into the system. In some examples, a voice command may be used to authenticate a user in a similar manner to the process flow for capturing and analyzing image data discussed above in connection with FIG. 6. In this example, the microphone 130 is monitoring for a voice assistant trigger word, which, in this example is "computer." Thus, as the user speaks the trigger word, a voice assistant (e.g., associated with the audio input analyzer 508) is activated to monitor and detect the rest of the user's voice command. In some examples, the secondary display 116 displays an indication that the voice assistant (audio input analyzer 508) is listening for a voice command and/or analyzing audio associated with the command. In some examples, the indication may correspond to changing an appearance of the microphone icon 304 and/or including an additional icon and/or animation 712 in the central region of the secondary display 116. In some examples, the icon and/or animation 712 of FIG. 7 may be the same as the icon and/or animation 612 associated with the camera input analyzer 506 capturing and/or analyzing image data as discussed above in FIG. 6.

In this example, the voice command is "Computer, when is my next meeting?" In some examples, the audio input analyzer 508 may perform voice recognition on the voice command to confirm that the voice comes from the authorized user before proceeding. In other examples, the process may proceed without user authentication inasmuch as the user has already been authenticated and logged into the portable computer 100. Assuming the user was recognized and/or the recognition was not performed, the process advances to the third stage 706 where the secondary display 116 provides confirmation that the voice command was detected by, for example, showing the voice command as text on the display. Additionally or alternatively, the voice command may be repeated back to the user via the speakers 132. The audio input analyzer 508 in conjunction with the system controller 522 may determine the intent of the voice command and retrieve the relevant information from the user's calendar that is responsive to the user's request. The relevant information is then provided via the secondary display 116 (and/or via the speakers 132) at the fourth stage 708. After a threshold period of time, the secondary user interface rendered on the secondary display 116 may revert to the previous view prior to detecting the voice command at the fifth stage 710. In this example, the previous view corresponds to the personalized home screen shown at the first stage 702 in the process.

Figure 8:
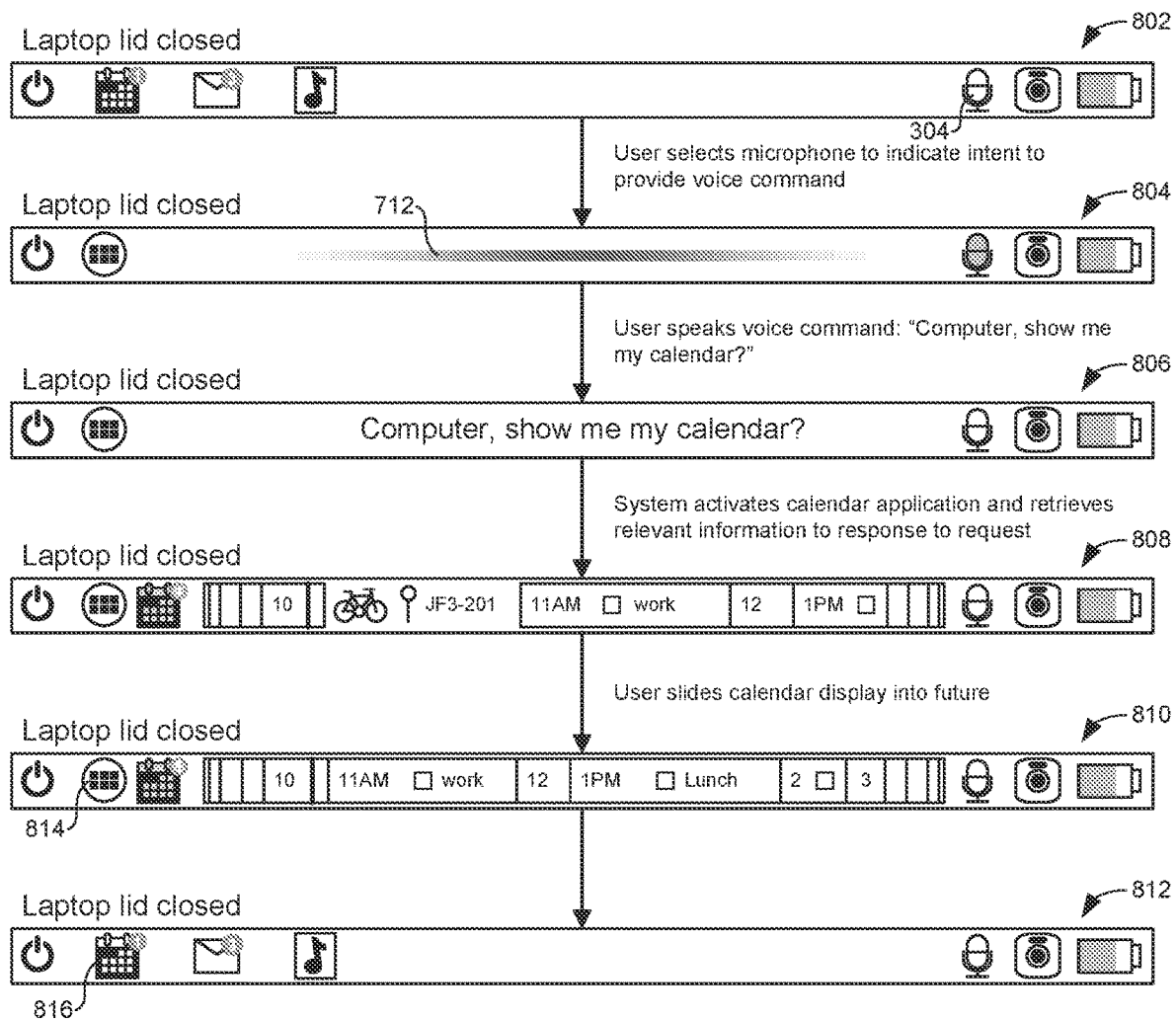

FIG. 8 illustrates different secondary user interfaces rendered via the secondary display 116 at different stages 802, 804, 806, 808, 810, 812 in time associated with responding to a voice command from a user. As with FIGS. 6 and 7, all of the stages 802, 804, 806, 808, 810, 812 in FIG. 8 occur with the lid 106 of the portable computer 100 closed. Further, all of the stages 802, 804, 806, 808, 810, 812 in FIG. 8 may be performed while the portable computer 100 is in a lower power state (e.g., less than in a full power state). In some examples, rather than the audio input analyzer 508 always monitoring for a voice assistant trigger word, a user may provide a touch-based input to activate or trigger the voice assistant system associated with the audio input analyzer 508 as demonstrated in the illustrated example of FIG. 8. Specifically, the first stage 802 corresponds to the secondary display 116 rendering the personalized home screen. While at this stage, the user may select (e.g., by touching) the microphone icon 304 on the secondary display to indicate the intent to provide a voice command to the system. By touching the microphone icon 304, the user activates the voice assistant such that, at the second stage 804, the secondary display 116 displays an indication that the voice assistant (audio input analyzer 508) is listening for a voice command and/or analyzing audio associated with the command as discussed above in connection with the second stage 704 of FIG. 7. With the indication on the secondary display 116, the user knows to proceed to speaking a voice command, which, in this example, is "Computer, show me my calendar?" At the third stage 806, the secondary display 116 renders an acknowledgement that the voice command was detected. Thereafter, at a fourth stage 808, the secondary display 116 is updated to render a secondary user interface associated with the calendar application on the portable computer 100. In some examples, the user may interact with the calendar by touching the secondary display 116. Thus, for example, the user may slide the calendar display into the future to see future appointments as shown at the fifth stage 810 in the illustrated example. Either after a threshold period of time without user activity or in response to a user request (e.g., selecting the home screen icon 814), the secondary display 116 may again revert to the home screen at the sixth stage 812. Although the procedures of FIGS. 6 and 7 are described in the context of user interactions based on voice commands, in other examples, the user may control the secondary user interface exclusively through touch. For example, rather than requesting to view the calendar using speech, a user may simply select the calendar icon 816 on the home screen to bring up the secondary user interface associated with the calendar.

Figure 9:
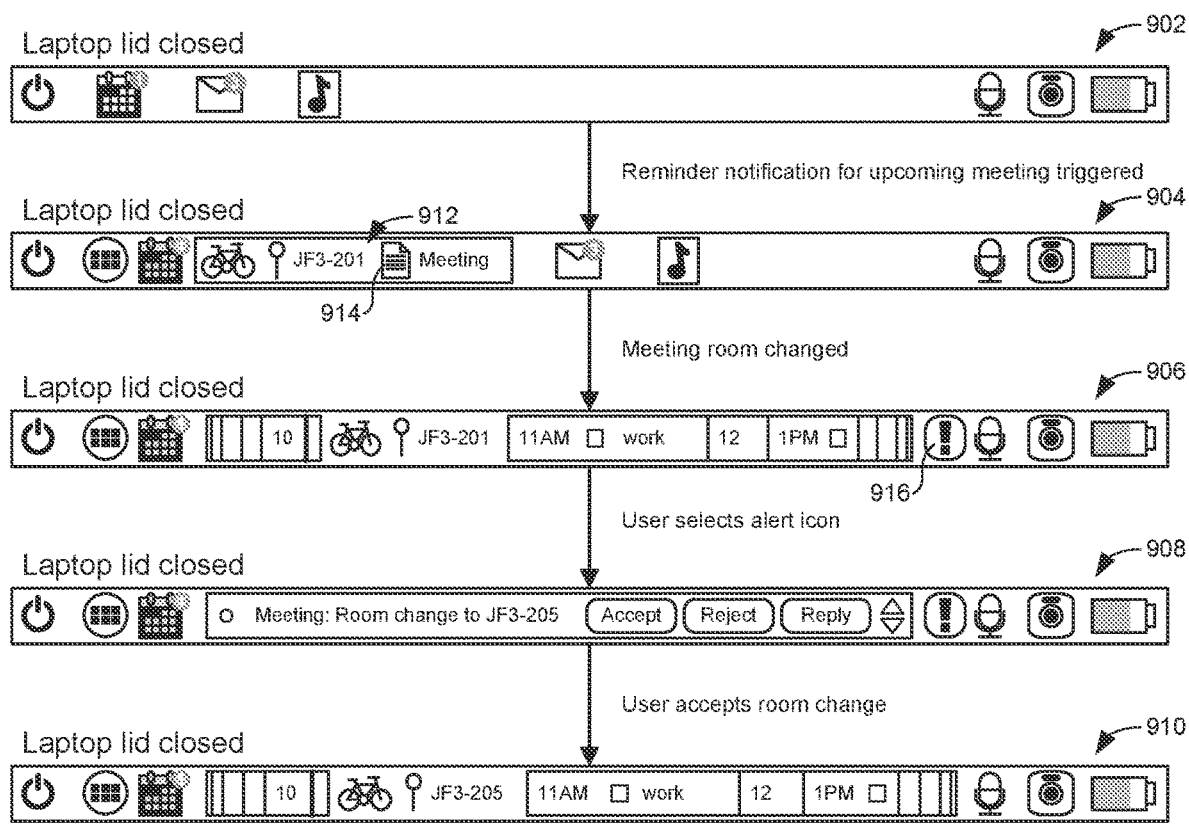

FIG. 9 illustrates different secondary user interfaces rendered via the secondary display 116 at different stages 902, 904, 906, 908, 910 in time associated with providing a push notification to an authorized user of the portable computer 100. As with FIGS. 6-8, all of the stages 902, 904, 906, 908, 910 in FIG. 9 occur with the lid 106 of the portable computer 100 closed. Further, all of the stages 902, 904, 906, 908, 910 in FIG. 9 may be performed while the portable computer 100 is in a lower power state (e.g., less than in a full power state). In this example, the first stage 902 corresponds to the secondary display 116 rendering the personalized home screen indicating that a user has already been recognized and logged into the system. Thereafter, the calendar application running on the portable computer 100 may generate a push notification to provide a reminder that it is almost time for an upcoming meeting or other scheduled appointment. Accordingly, at the second stage 904, the secondary display 116 is automatically updated with a reminder notification 912. In this example, the reminder notification 912 includes an indication of the location (e.g., room JF3-201) and a document icon 914 indicating there is a document associated with the meeting. In some examples, the system controller 522 may generate an audible and/or haptic signal to alert the user of the reminder.

Continuing in time in the illustrated example, the calendar app may receive a push notification from the organizer of the meeting that there has been a room change. Accordingly, at the third stage 906 of the illustrated example, the secondary display includes an alert icon 916. In this example, when the user selects the alert icon 916, details of the room change are rendered via the secondary display 116 at the fourth stage 908. In some examples, the secondary user interface at the fourth stage includes response options associated with the push notifications. In this example, the options include the user accepting or acknowledging the room change, rejecting or dismissing the room change, or replying to the room change (e.g., to propose an alternate room). In this example, the user accepts the room change such that, at the fifth stage 910, the calendar is updated with the new room number. In some examples, the calendar may be automatically updated with the new room number without the user having to accept the change.

Figure 10:
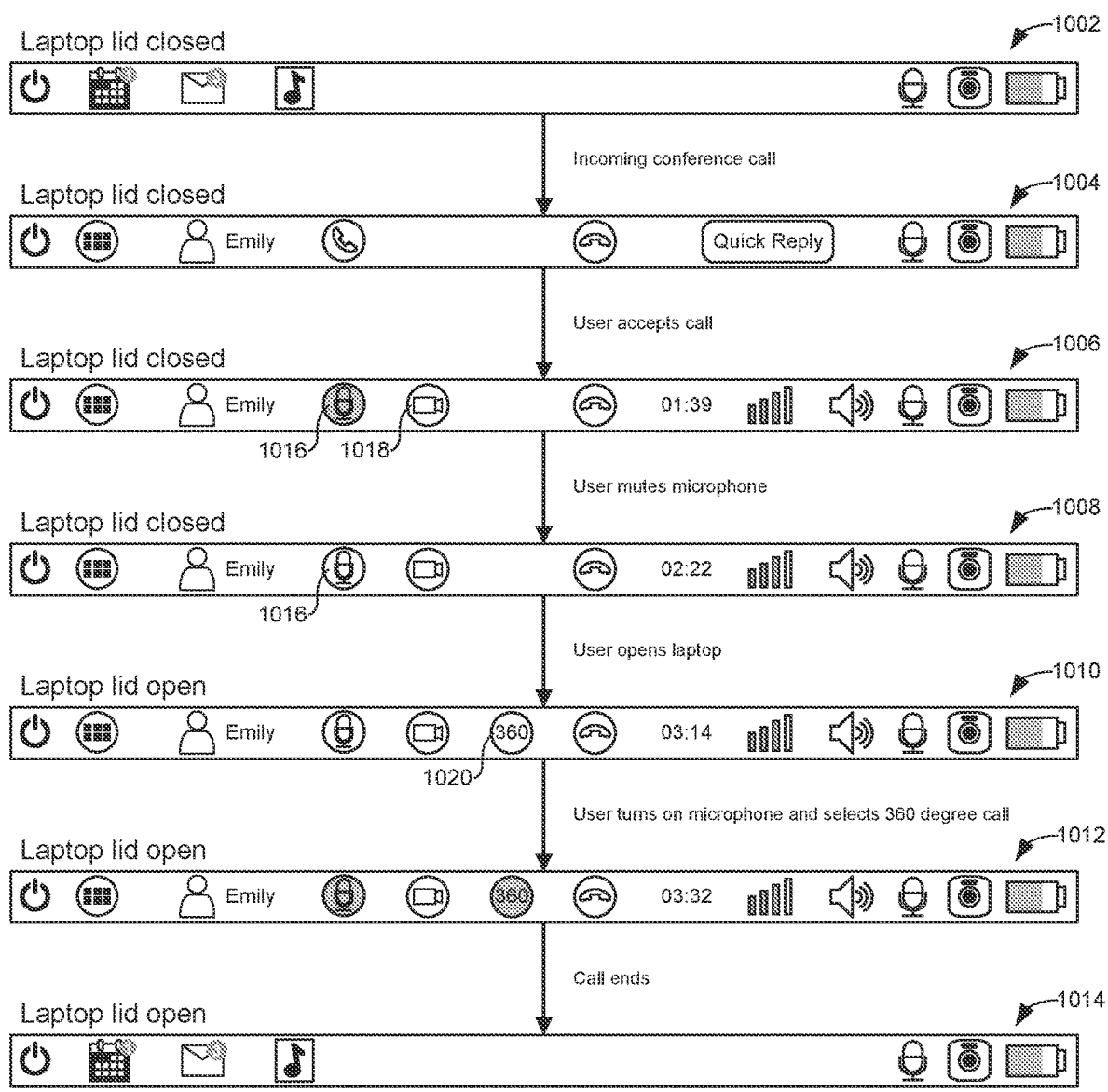

FIG. 10 illustrates different secondary user interfaces rendered via the secondary display 116 at different stages 1002, 1004, 1006, 1008, 1010, 1012, 1014 in time associated with providing and responding to a push notification corresponding to an incoming conference call. In this example, the first stage 1002 corresponds to the secondary display 116 rendering the personalized home screen while the lid 106 of the portable computer 100 is closed. When an incoming call is received, a secondary user interface associated with the conference calling application on the portable computer 100 is rendered via the secondary display 116 at the second stage 1004. In some examples, an audible alert may be generated via the speakers 132. As shown in the illustrated example, the secondary user interface rendered at the second stage 1004 includes an identification of the caller and different response options for the user that include accepting or answering the call, dismissing or hanging up the call, or providing a quick reply. In some examples, the quick reply may be short text message to the caller selected from a list of preconfigured text replies. In this example, the user accepts the call and the secondary user interface is updated to provide control options and/or additional detail about the ongoing call as shown at the third stage 1006 of the illustrated example. In some examples, the call automatically activates the microphone so that the user can speak on the call, which is indicated by a microphone icon 1016 within the control options for the ongoing conference call. In some examples, if the user selects the microphone icon 1016, the user mutes the microphone. Muting the microphone may be indicated by a change in the microphone icon 1016 as shown at the fourth stage 1008 in FIG. 10.

In some examples, the control options may also include a video icon 1018 that may be selected by the user to activate the world facing camera 124 to transmit video on the call. In some examples, the video icon may be provided as an option only when the portable computer 100 is open. In the illustrated example, the user opens the portable computer 100 between the fourth and fifth stages 1008, 1010. Once the portable computer 100 is opened, a 360 degree video icon 1020 may be provided via the secondary user interface. In some examples, the 360 degree video icon may be included alongside the standard video icon 1018 or in place of it. In some examples, the standard video icon 1018 activates the camera that is facing the user. That is, if the portable computer 100 is closed, selecting the standard video icon 1018 may activate the world facing camera 124. However, when the portable computer 100 is open, selecting the standard video camera 1018 may activate the user facing camera 122. By contrast, selecting the 360 degree video icon 1020 activates both the user facing camera 122 and the world facing camera 124 to capture a 360 degree view of the area surrounding the portable computer 100. The sixth stage 1012 in the illustrated occurs after the user has unmuted the microphone and selected the 360 degree video icon 1020. In some examples, a primary user interface associated with the conference calling application is rendered via the primary display 114 in response to the user selecting the video option so that the user is able to view the video stream on the primary display 114. In some examples, the primary user interface may be rendered automatically on the primary display 114 in response to the lid 106 of the portable computer 100 being opened regardless of whether the user selects one of the video options. In some examples, one or both of the video options may be provided on the secondary display 116 while the computer is closed and, if selected, cause the primary display to turn on to render the primary user interface associated with the conference calling application even before the display is open. In this manner, the video conference call will be ready and going as soon as the user opens the portable computer 100.

Figure 11:
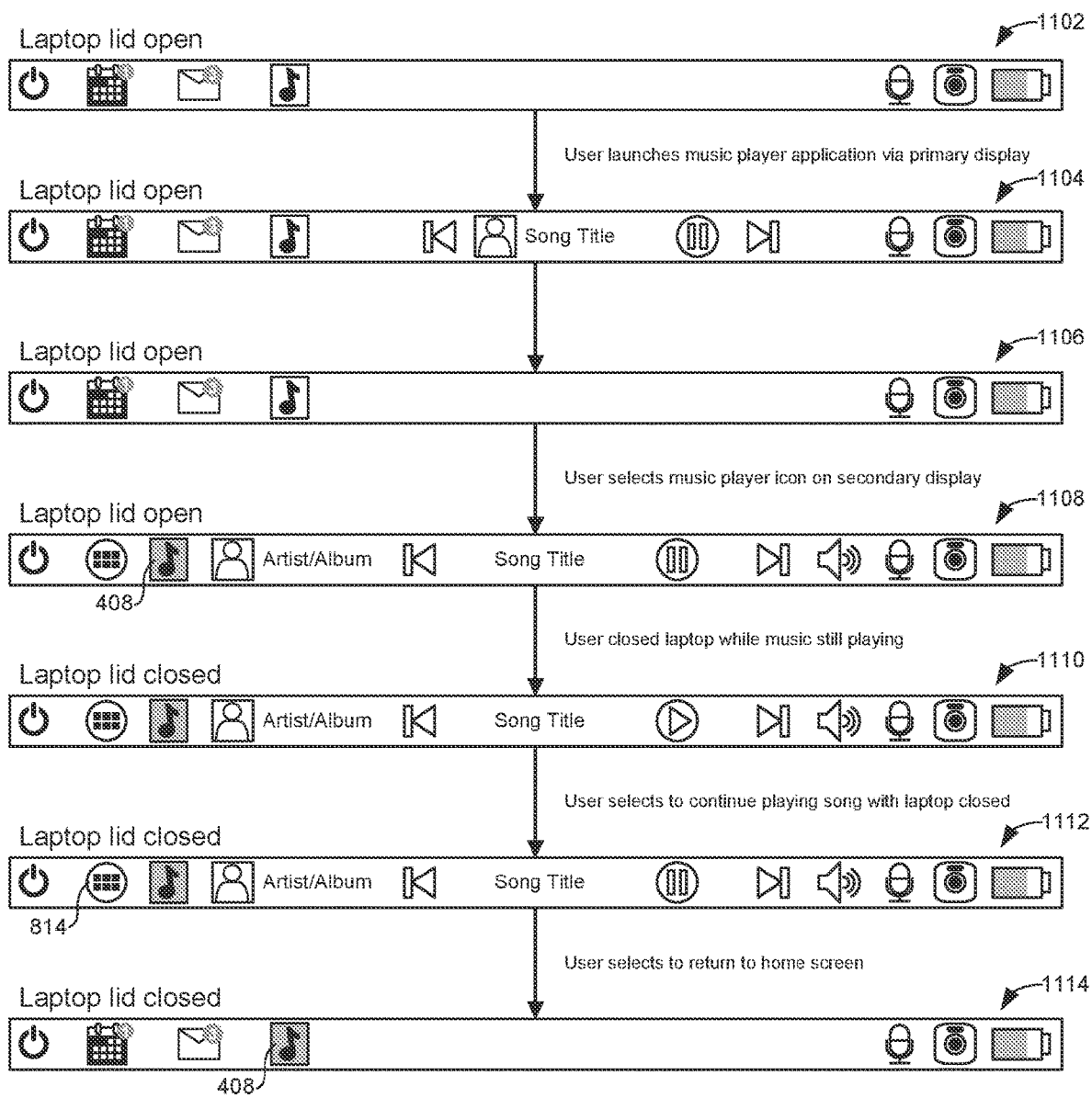

The seventh stage 1014 in the illustrated example corresponds to after the conference all has ended. In this example, although the portable computer 100 is now opened, the secondary display still reverts to the view prior to the conference call. In this example, the previous view corresponds to the personalized home screen of the user as in the first stage 1002, FIG. 11 illustrates different secondary user interfaces rendered via the secondary display 116 at different stages 1102, 1104, 1106, 1108, 1110, 1112, 1114 in time associated with user interactions between both the primary and secondary displays 114, 116. In this example, the first stage 1102 corresponds to the secondary display 116 rendering the personalized home screen while the lid 106 of the portable computer 100 is opened so that the user may be interacting with the primary display 114. More particular, the example proceeds with the user launching a music player application via the primary display to begin playing music. At the second stage 1104, the secondary display 116 is updated to identify the song that is playing and to provide control options for the user to control the music via the secondary display. In some examples, if the user does not interact with the secondary display within a threshold period of time, the secondary display will revert to the personalized home screen as shown at the third stage 1106. The user may still activate the music player controls on the secondary display 116 by selecting the music player icon 408. Once the icon 408 is selected, a full secondary user interface associated with the music player may be rendered via the secondary display 116 as shown at the fourth stage 1108 in the illustrated example. In some examples, the full secondary user interface for the music player application may automatically be launched on the secondary display 116 in response to the user launching the application via the primary display 114. In some examples, that the music player application is active on the secondary display 116 is indicated by a change to the music player icon 408 as shown in the illustrated example.

While the music is still playing, the user may close the portable computer 100. In some examples, the music player application may continue to be executed in connection with the secondary display 116. In some examples, closing the computer lid 106 may cause the current song being played to pause. However, the secondary display may provide an option in the controls to enable the user to have the song continue playing where it was paused as shown at the fifth stage 1110 in FIG. 11. The playback of the song when the lid 106 is closed may be from the speakers 132 on the front of the portable computer 100 if the user was using speakers before closing the portable computer 100. If the user was playing the music via headphones (e.g., via a Bluetooth or wired connection), the song would continue to play the music via the headphones after the lid 106 is closed and the user selects the option to continue playing the song. In some examples, the song may automatically continue to play after the user closes the computer lid 106 without waiting for the user to indicate the song should continue to be played. The sixth stage 1112 in the illustrated example represents the song being played (with the option to again pause the song) while the portable computer 100 is closed. The user may desire to access other information and/or functionality on the computer via the secondary display while the music continues to play. To do so, the user may select the home screen icon 814 on the secondary display to return to the personalized home screen as shown in the seventh stage 1114 of FIG. 11. In this example, even though the secondary user interface associated with the music player is no longer being rendered via the secondary display 116, the music continues to play. In some examples, the active music player continues to be indicated on the secondary display 116 based on the changed appearance of the music player icon 408. If the user wishes to change songs or otherwise again control the music, the user may again select the music player icon 408 to reopen the associated secondary user interface.

Flowcharts representative of example hardware logic, machine readable instructions, hardware implemented state machines, and/or any combination thereof for implementing the portable computer 100 of FIGS. 1 and 2 is shown in FIGS. 12A, 12B, and 13-18. The machine readable instructions may be one or more executable programs or portion(s) of an executable program for execution by a computer processor such as the processors 1910, 1912 shown in the example processor platform 1900 discussed below in connection with FIG. 19. The program may be embodied in software stored on a non-transitory computer readable storage medium such as a CD-ROM, a floppy disk, a hard drive, a DVD, a Blu-ray disk, or a memory associated with the processors 1910, 1912, but the entire program and/or parts thereof could alternatively be executed by a device other than the processors 1910, 1912 and/or embodied in firmware or dedicated hardware. Further, although the example program is described with reference to the flowcharts illustrated in FIGS. 12A, 12B, and 13-18, many other methods of implementing the example portable computer 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 12A, 12B, and 13-18 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 12A:
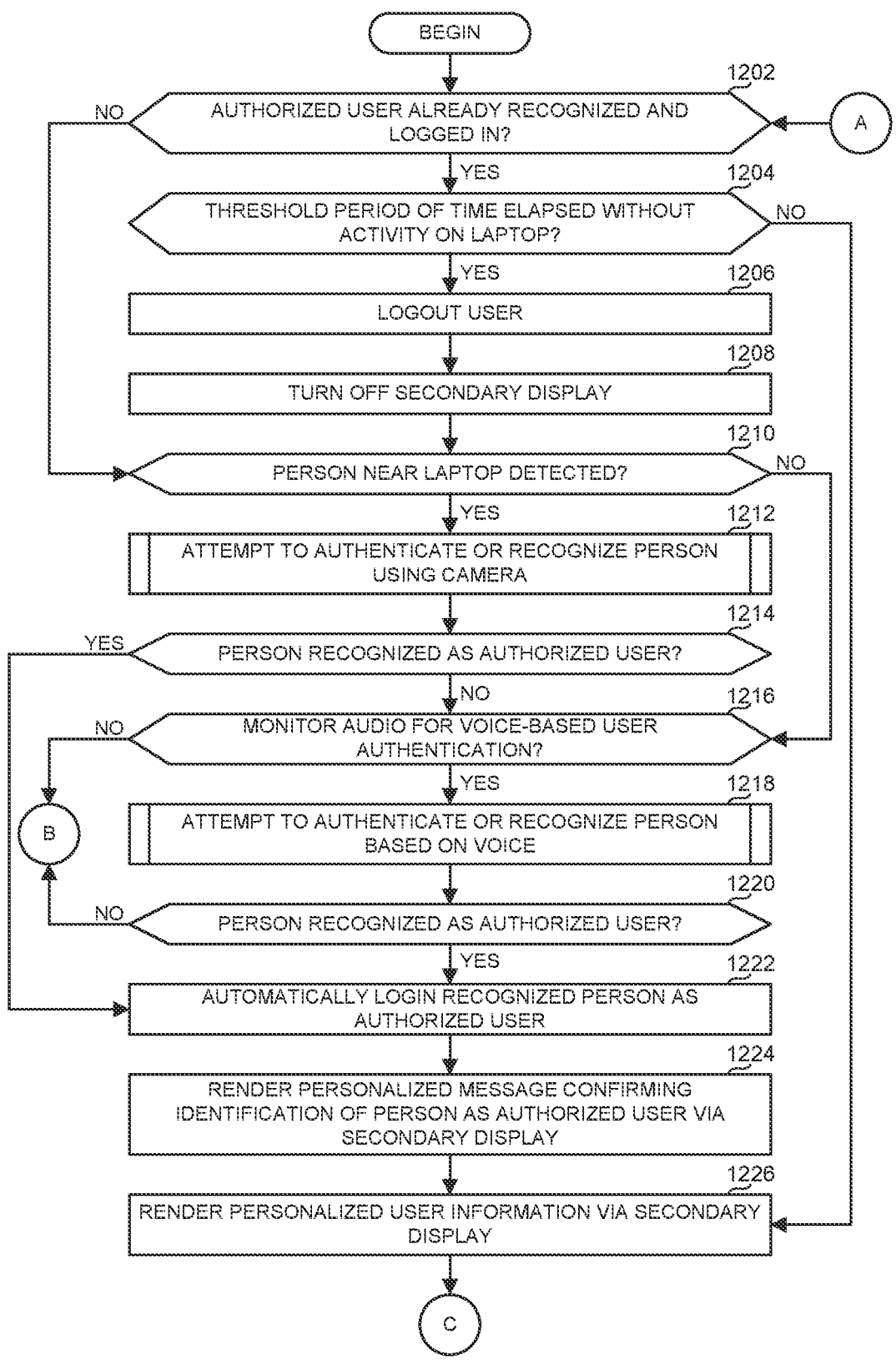
FIGS. 12A, 12B, and 13-18 are flowcharts representative of example machine readable instructions which may be executed to implement the example portable computer of FIGS. 1, 2, and/or 5.
Figure 12B:
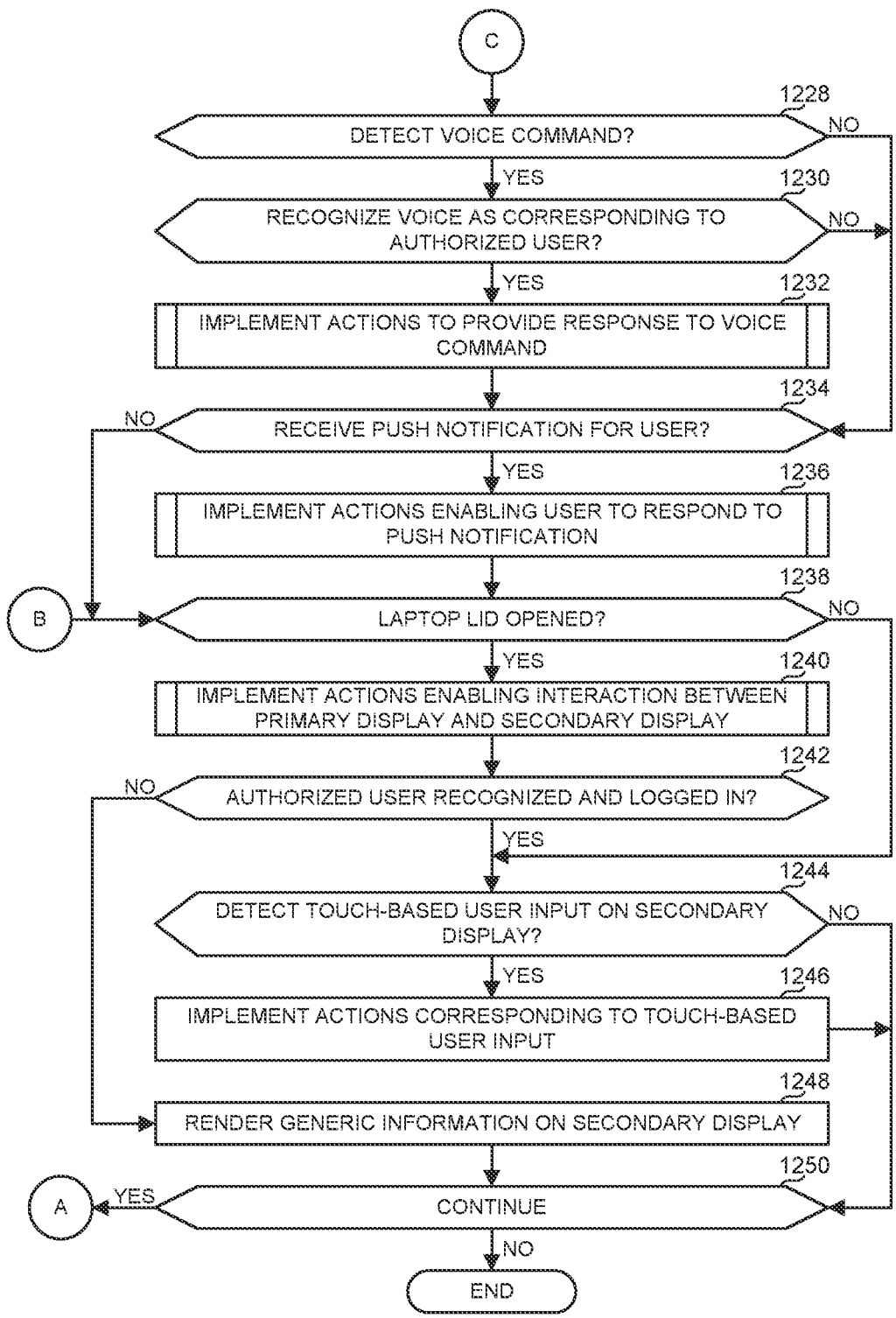

The program of FIGS. 12A and 12B begins at block 1202, the example login controller 512 determines whether an authorized user has already been recognized and logged into the portable computer 100. If so, control advances to block 1204 where the example login controller 512 determines whether a threshold period of time has elapsed without activity on the portable computer 100. If so, control advances to block 1206 where the example login controller 512 logs out the user. At block 1208, the example secondary display controller 518 turns off the secondary display 116. That is, the portable computer 100 is placed in a low power sleep mode. In some such examples, nearly all functionality of the computer is put to sleep except for the human presence sensor 128, which may continue to monitor for the presence of a person (e.g., the user approaching the portable computer 100). Additionally or alternatively, in some examples, the microphone 130 and the example audio input analyzer 508 may continue to monitor for a voice assistant trigger that may cause the portable computer 100 to again wake up into a higher power state. After turning off the secondary display 116 at block 1208, control advances to block 1210. Returning to block 1202, if the example login controller 512 determines that an authorized user has not been recognized and logged in (e.g., since being logged out at block 1206 in a previous iteration of the process), control advances directly to block 1210.

At block 1210, the human presence sensor 128 determines whether a person near the portable computer 100 has been detected. If so, control advances to block 1212 to attempt to authenticate or recognize the person using a camera (e.g., either the world facing camera 124 if the portable computer 100 is closed or the user facing camera 122 if the portable computer 100 is open). Further detail regarding the implementation of block 1212 is provided below in connection with FIG. 13. Thereafter, at block 1214, the example login controller 512 determines whether the person was recognized as an authorized user. If so, control advances to block 1222. If not, control advances to block 1216. Returning to block 1210, if the human presence sensor 128 does not detect a person near the portable computer 100, control advances directly to block 1216.

At block 1216, the example system controller 522 determines whether to monitor audio for voice-based user authentication. In some examples, the monitoring of audio is done in parallel with the human presence detection of blocks 1210 and 1212 rather than occur after no person has been recognized as represented in the flowchart of FIG. 12A. If the example system controller 522 determines to monitor audio for voice-based user authentication, control advances to block 1218 to attempt to authenticate or recognize a person based on their voice. Further detail regarding the implementation of block 1218 is provided below in connection with FIG. 14. Thereafter, control advances to block 1220 where the example login controller 512 determines whether the person was recognized as an authorized user. If so, control advances to block 1222. If it is determined that a person was not recognized at block 1220 (and that no person was recognized at block 1212), then there is no person recognized as an authorized user. In such situations control advances to block 1238 on FIG. 12B. Likewise, if the example system controller 522 determines at block 1216 not to monitor audio for voice-based user authentication, control advances directly to block 1238.

At block 1222, the example login controller 512 automatically logs in the person recognized at block 1214 or block 1218 as an authorized user. Thereafter, at block 1224, the example secondary display controller 518 renders a personalized message confirming the identification of the person as an authorized user via the secondary display 116. In some examples, the message may include a greeting that uses the name of the person. In some examples, the greeting may be audible in addition to what is rendered via the secondary display 116. At block 1226, the example secondary display controller 518 renders personalized user information via the secondary display 116. In some examples, the personalized user information may be represented in a personalized home screen (e.g., the personalized secondary user interface 400 of FIG. 4). In examples, where the user was previously logged in and has already interacted with the secondary display 116, the personalized information may correspond to a secondary user interface associated with a particular application running on the portable computer 100 (e.g., any of the various personalized secondary user interfaces described in connection with FIGS. 6-11). In some examples, a user may be previously logged in if control came from block 1204. That is, returning to block 1204, if the example login controller 512 determines that a threshold period of time has not elapsed without activity on the portable computer 100 (after an authorized user has already been recognized and logged in), control advances directly to block 1226.

At block 1228 (top of FIG. 12B), the example audio input analyzer 508 determines whether to detect a voice command. In some examples, this determination is made based on the audio input analyzer 508 detecting a voice assistant trigger word spoken by a person within audible range of the microphones 130 of the portable computer 100. In some examples, this trigger word may be the same voice command associated with the initial voice recognition performed at block 1218. In other examples, this voice command may occur after the user has already been recognized and logged in. If the example audio input analyzer 508 determines to detect a voice command, control advances to block 1230 where the example audio input analyzer 508 determines whether the detected voice is recognized as corresponding to an authorized user. If so, control advances to block 1232 to implement actions to provide a response to the voice command. Further detail regarding the implementation of block 1232 is provided below in connection with FIG. 15. Thereafter, control advances to block 1234. In some examples, block 1230 may be omitted with control advances directly to block 1232 where the voice is automatically assumed to correspond to the authorized user based on the user having already been recognized and logged into the portable computer 100. Additionally or alternatively, in some examples block 1230 may be omitted with control advancing directly to block 1232 when the voice command does not involve the access or retrieval of personal information associated with the user (e.g., a voice command stating, "Computer, what is the weather today?"). Returning to block 1228, if the example audio input analyzer 508 determines not to detect a voice command (e.g., no voice assistant trigger word has been detected), control advances directly to block 1234.

At block 1234, the example communications interface(s) 504 determine whether a push notification has been received. In some examples, push notifications are received in connection with applications running on the computer. Additionally or alternatively, push notifications may be received from separate devices communicatively coupled to the computer (e.g., a remote server connected via the Internet or a local trusted device connected via Bluetooth or Wi-Fi). For example, a push notification may include a reminder regarding an upcoming appointment and/or a change in the appointment details associated with a calendar application of the user (as discussed in connection with FIG. 9), an incoming call on a conference calling application (as discussed in connection with FIG. 10), or any other type of push notification (e.g., a new email message, new posts on social media, etc.). If the example communications interface(s) 504 determine that push notification has been received at block 1234, control advances to block 1236 to implement actions enabling the user to respond to the push notification. Further detail regarding the implementation of block 1236 is provided below in connection with FIG. 16. Thereafter, control advances to block 1238. Returning to block 1234, if the example communications interface(s) 504 determine that no push notification has been received, control advances directly to block 1238.

At block 1238, the example lid controller 520 determines whether the computer lid has been opened. If so, control advances to block 1240 to implement actions enabling interaction between the primary display 114 and the secondary display 116. Further detail regarding the implementation of block 1240 is provided below in connection with FIG. 17. Thereafter, control advances to block 1242, where the example login controller 512 determines whether the authorized user is recognized and logged in. If so, control advances to block 1244. Returning to block 1238, if the example lid controller 520 determines that the computer lid has not been opened, control advances directly to block 1244.

At block 1244, the example touch-based input analyzer 510 determines whether a touch-based user input on the secondary display 116 has been detected. If so, control advances to block 1246 where the example touch-based input analyzer 510 implements actions corresponding to the touch-based user input. Touch-based user inputs may occur at any point during the process of FIGS. 12A and 12B. Thus, the touch-based inputs may be associated with a user providing a voice command and/or the user responding to feedback provided in response to a voice command. Similarly, touch-based user inputs may be implemented in connection with a user responding to push notifications. Touch-based user inputs on the secondary display 116 may also be used to control applications rendered on the primary display (e.g., when the lid 106 of the portable computer 100 is open). Further, touch-based user inputs on the secondary display 116 may be used at other times whenever the user desires to access and/or interact with information and/or other content directly via the secondary display 116. As a specific example, the touch-based inputs may enable a user to perform the reverse operations to receiving push notifications. That is, rather than answer a conference call, in some examples, a user may be able to initiate a conference call with someone else based on user interactions with the secondary display 116. As another example, a user may be able to use touch-based inputs on the secondary display 116 to locate and identify a particular document or file stored on the portable computer 100 to share with a separate device. In some examples, after selecting the particular document or file, the user may request (via the secondary display 116) the portable computer 100 to identify any nearby devices (e.g., within wireless communication range) to which the document or file may be sent. In some such examples, the user may select (via the secondary display 116) one or more of the identified device and cause the portable computer 100 share the file with such devices. In some such examples, the portable computer 100 may first transmit a request to the devices and wait for an acknowledgement before establishing a connecting and transferring the data. In some examples, any operations capable using touch-based inputs may also be performed using corresponding voice commands. After implementing actions corresponding to the touch-based user input at block 1246, control advances to block 1250. Returning to block 1244, if the example touch-based input analyzer 510 has not detected a touch-based user input, control advances directly to block 1250.

Returning to block 1242, if no authorized user has been recognized and logged in, control advances to block 1248 where the example secondary display controller 518 renders generic information via the secondary display. In some examples, the generic information corresponds to the generic secondary user interface described above in connection with FIG. 3. Thereafter, control advances to block 1250 to determine whether to continue the process. If so, control returns to block 1202. Otherwise, the example process of FIGS. 12A and 12B ends.

Figure 13:
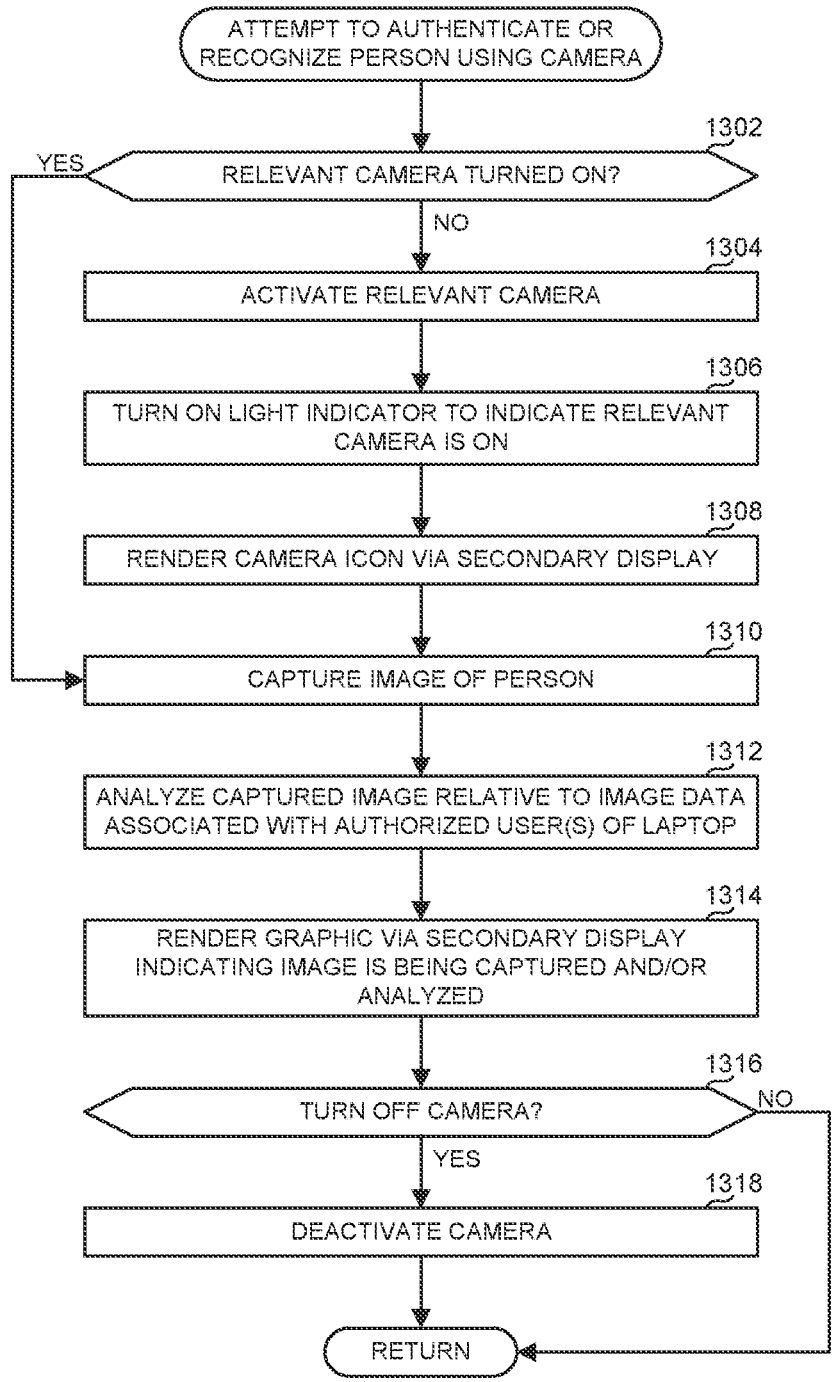

FIG. 13 provides further detail regarding the implementation of block 1212 of FIG. 12A to attempt to authenticate or recognize a person using a camera. The example process of FIG. 13 begins at block 1302 where the example camera input analyzer 506 determines whether the relevant camera is turned on. In some examples, which camera is the relevant camera depends on whether the portable computer 100 is opened or closed (as determined by the example lid controller 520). If the portable computer 100 is closed, the relevant camera corresponds to the world facing camera 124. If the portable computer 100 is open, the relevant camera corresponds to the user facing camera 122. In some examples, both cameras 122, 124 may be considered when the portable computer 100 is open. If the example camera input analyzer 506 determines that the relevant camera is not turned on, control advances to block 1304 where the example system controller 522 activates the relevant camera. At block 1306, the example system controller 522 turns on the light indicator 126 to indicate relevant camera is on. At block 1308, the example secondary display controller 518 renders the camera icon 302 via the secondary display 116. Thereafter, control advances to block 1310. Returning to block 1302, if the example camera input analyzer 506 determines the relevant camera is already turned on, control advances directly to block 1310.

At block 1310, the relevant camera captures an image of the person. At block 1312, the example camera input analyzer 506 analyzes the captured image relative to image data associated with authorized user(s) of the portable computer 100. At block 1314, the example secondary display controller 518 renders a graphic (e.g., the icon and/or animation 612 shown in FIG. 6) via the secondary display indicating the image is being captured and/or analyzed. At block 1316, the example camera input analyzer 506 determines whether to turn off the camera. If so, control advances to block 1318 where the example system controller 522 deactivates the camera. Thereafter, the process of FIG. 13 ends and returns to complete the process of FIGS. 12A and 12B. If the example camera input analyzer 506 determines not to turn off the camera, the example process immediately ends and returns to complete the process of FIGS. 12A and 12B.

Figure 14:
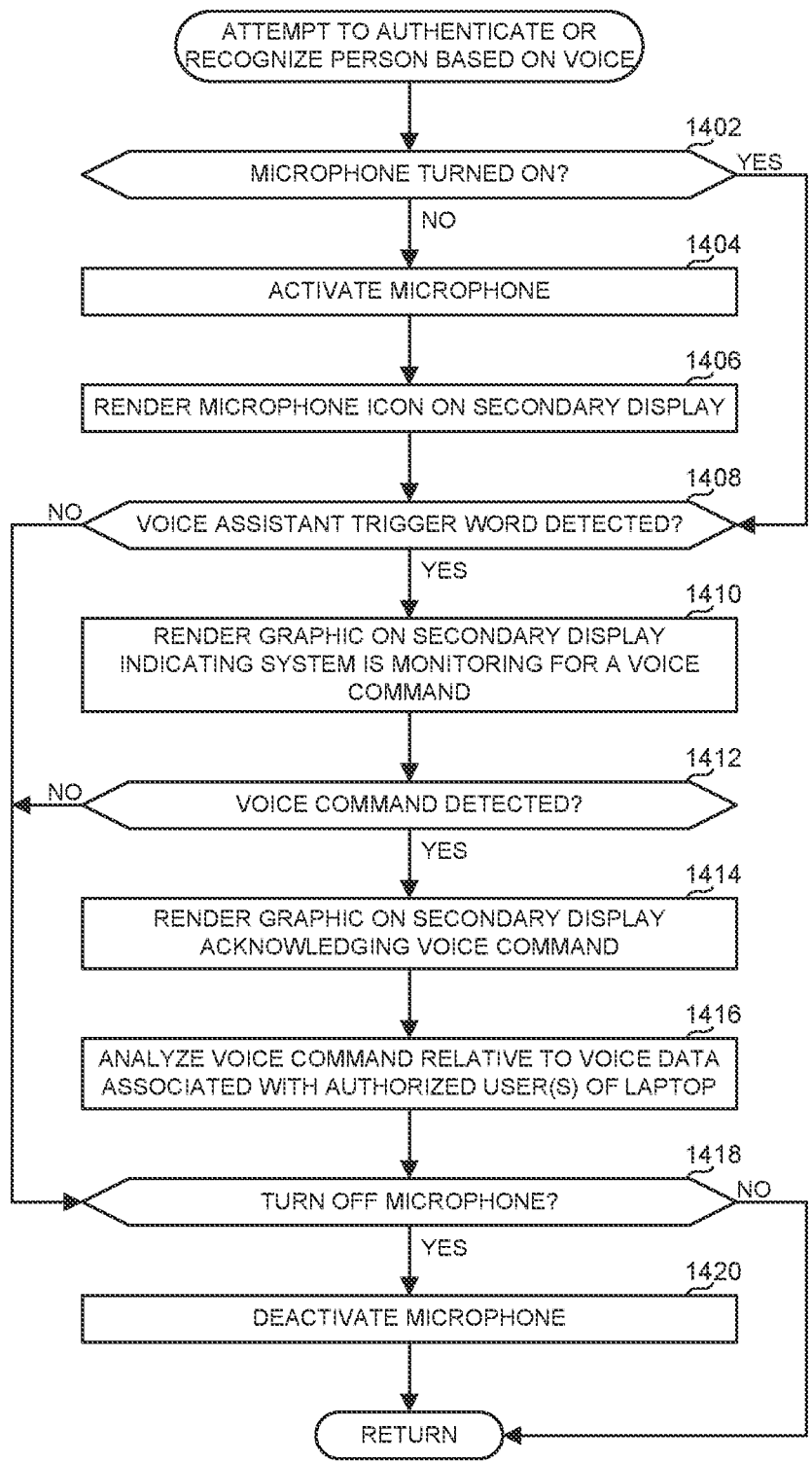

FIG. 14 provides further detail regarding the implementation of block 1218 of FIG. 12A to attempt to authenticate or recognize a person using their voice. The example process of FIG. 14 begins at block 1402 where the example audio input analyzer 508 determines whether the microphone 130 is turned on. If not, control advances to block 1404 where the example system controller 522 activates the microphone 130. At block 1406, the example secondary display controller 518 renders the microphone icon 304 via the secondary display 116. Thereafter, control advances to block 1408. Returning to block 1402, if the example audio input analyzer 508 determines the microphone 130 is already turned on, control advances directly to block 1408.

At block 1408, the example audio input analyzer 508 determines whether a voice assistant trigger word has been detected. If so, control advances to block 1410 where the example secondary display controller 518 renders a graphic (e.g., the icon and/or animation 712 of FIG. 7) via the secondary display 116 indicating the system is monitoring for a voice command. At block 1412, the example audio input analyzer 508 determines whether a voice command has been detected. If so, control advances to block 1414 where the example secondary display controller 518 renders a graphic on the secondary display acknowledging the voice command. In some examples, the acknowledgement graphic is a text-based reproduction of the voice command as described in the connection with the illustrated examples of FIGS. 7 and 8. At block 1416, the example audio input analyzer 508 analyzes the voice command relative to voice data associated with authorized user(s) of the portable computer 100. Thereafter, control advances to block 1418. If no voice assistant word was detected (block 1408) or no voice command was detected (block 1412), control advances directly to block 1418.

At block 1418, the example audio input analyzer 508 determines whether to turn off the microphone 130. If so, control advances to block 1420 where the example system controller 522 deactivates the microphone 130. Thereafter, the process of FIG. 14 ends and returns to continue the process of FIGS. 12A and 12B. If the example audio input analyzer 508 determines not to turn off the microphone 130, the example process immediately ends and returns to continue the process of FIGS. 12A and 12B.

Figure 15:
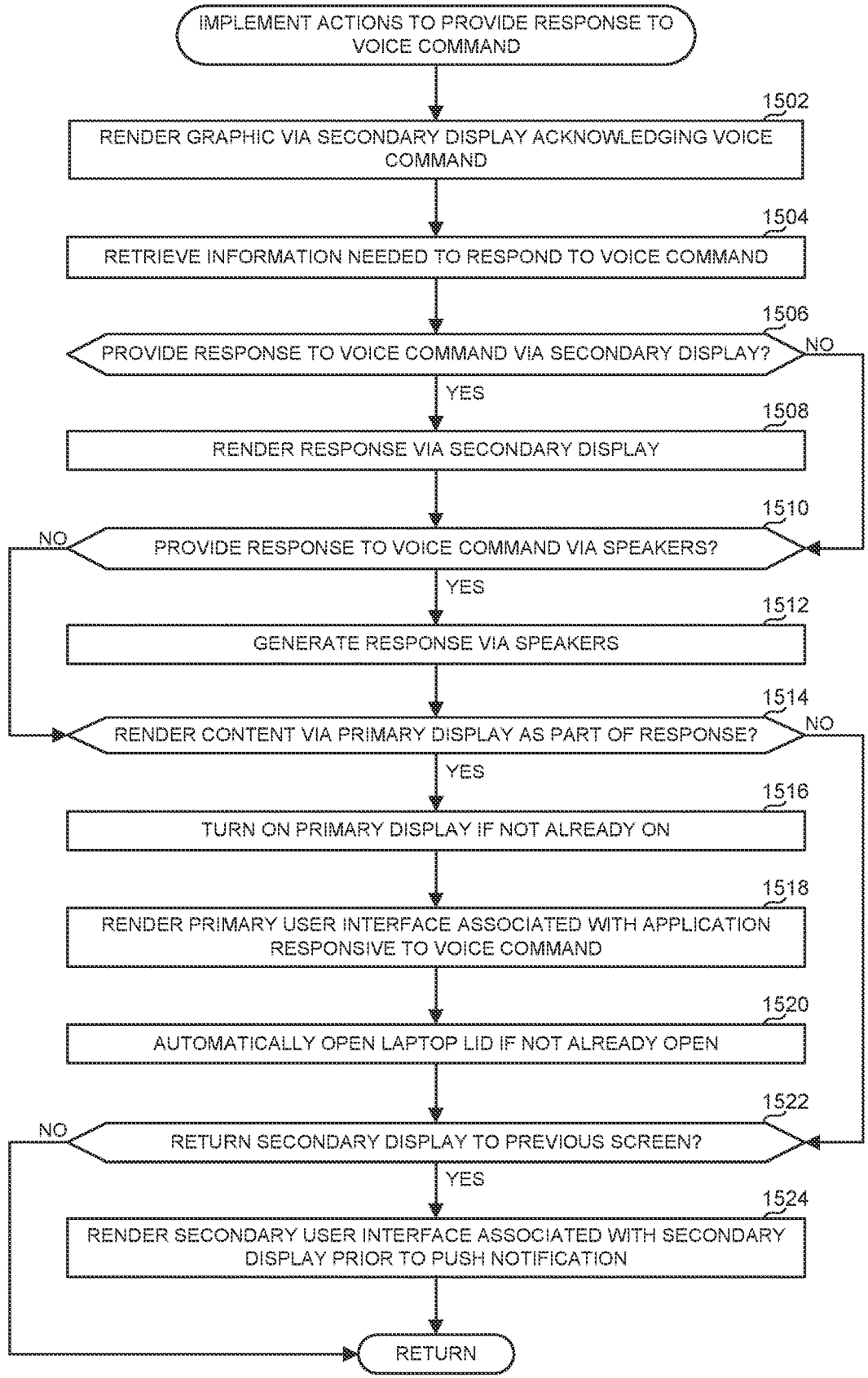

FIG. 15 provides further detail regarding the implementation of block 1232 of FIG. 12B to implement actions to provide a response to the voice command. As described above in connection with FIG. 12B, this process begins after a voice command has already been detected (block 1228 of FIG. 12B). Accordingly, the example process of FIG. 15 begins at block 1502 where the example secondary display controller 518 renders a graphic via the secondary display acknowledging the voice command. In some examples, the acknowledgement graphic is a text-based reproduction of the voice command as described in the connection with the illustrated examples of FIGS. 7 and 8. At block 1504, the example system controller 522 retrieves information needed to respond to the voice command. In some examples, the information may be retrieved from the example database(s) 524. In some examples, the information is retrieved from an application running on the portable computer 100. In some examples, the information may be retrieved from a remote server via the communications interface(s) 504.

At block 1506, the example secondary display controller 518 determines whether to render a response to voice command via the secondary display 116. If so, control advances to block 1508 where the example secondary display controller 518 renders the response via the secondary display 116. In some examples, the response may be rendered as text on the secondary display 116 (e.g., as described in the illustrated example of FIG. 7). In some examples, the response may include rendering a secondary user interface associated with an application running on the computer (e.g., the calendar application as described in the illustrated example of FIG. 8). Thereafter, control advances to block 1510. Returning to block 1506, if the example secondary display controller 518 determines not to render a response to voice command via the secondary display 116, control advances directly to block 1510.

At block 1510, the example system controller 522 determines whether to provide a response to the voice command via the speakers 132. If so, control advances to block 1512 where the example system controller 522 generates a response via the speakers. Thereafter, control advances to block 1514. Returning to block 1510, if the example system controller 522 determines not to provide a response to the voice command via the speakers 132, control advances directly to block 1514.

At block 1514, the example system controller 522 determines whether to render content via the primary display 114 as part of the response. If so, control advances to block 1516 where the example primary display controller 516 turns on the primary display 114 if it is not already on. The primary display 114 may not be on if the lid 106 of the portable computer 100 is closed at the time the voice command is detected. At block 1518, the example primary display controller 516 renders a primary user interface associated with an application responsive to the voice command. As a specific example, if the user provides a voice command to initiate a 360 degree video conference call, the example primary display controller 516 may render a primary user interface associated with the conference calling application via the primary display 114, where the user interface includes a 360 video stream of the surrounding environment of the portable computer 100 as captured by the world and user facing cameras 122, 124. At block 1520, the example lid controller 520 automatically opens the computer lid if not already open. In some examples, the hinge 112 may not be constructed to automatically open the lid 106 of the portable computer 100. In such examples, block 1520 may be omitted. In some such examples, the secondary display 116 may provide a prompt directing the user to open the lid 106 to be able to see the content rendered via the primary display 114. Thereafter, control advances to block 1522. Returning to block 1514, if the example system controller 522 determines not to render content via the primary display 114 as part of the response, control advances directly to block 1522.

At block 1522, the example secondary display controller 518 determines whether to return the secondary display 116 to a previous screen. In some examples, the example secondary display controller 518 may determine to do so based on a threshold period of time elapsing without the user taking any action following the rendering of the response to the voice command. In other examples, the determination may be made based on the user providing input that the response to the voice command is no longer needed. If the example secondary display controller 518 determines to return the secondary display 116 to a previous screen, control advances to block 1524 where the example secondary display controller 518 renders the primary user interface previously rendered on the secondary display prior to the voice command. Thereafter, the example process ends and returns to continue the process of FIGS. 12A and 12B. If the example secondary display controller 518 determines not to return the secondary display 116 to a previous screen, the example process of FIG. 15 immediately ends and returns to continue the process of FIGS. 12A and 12B.

Figure 16:
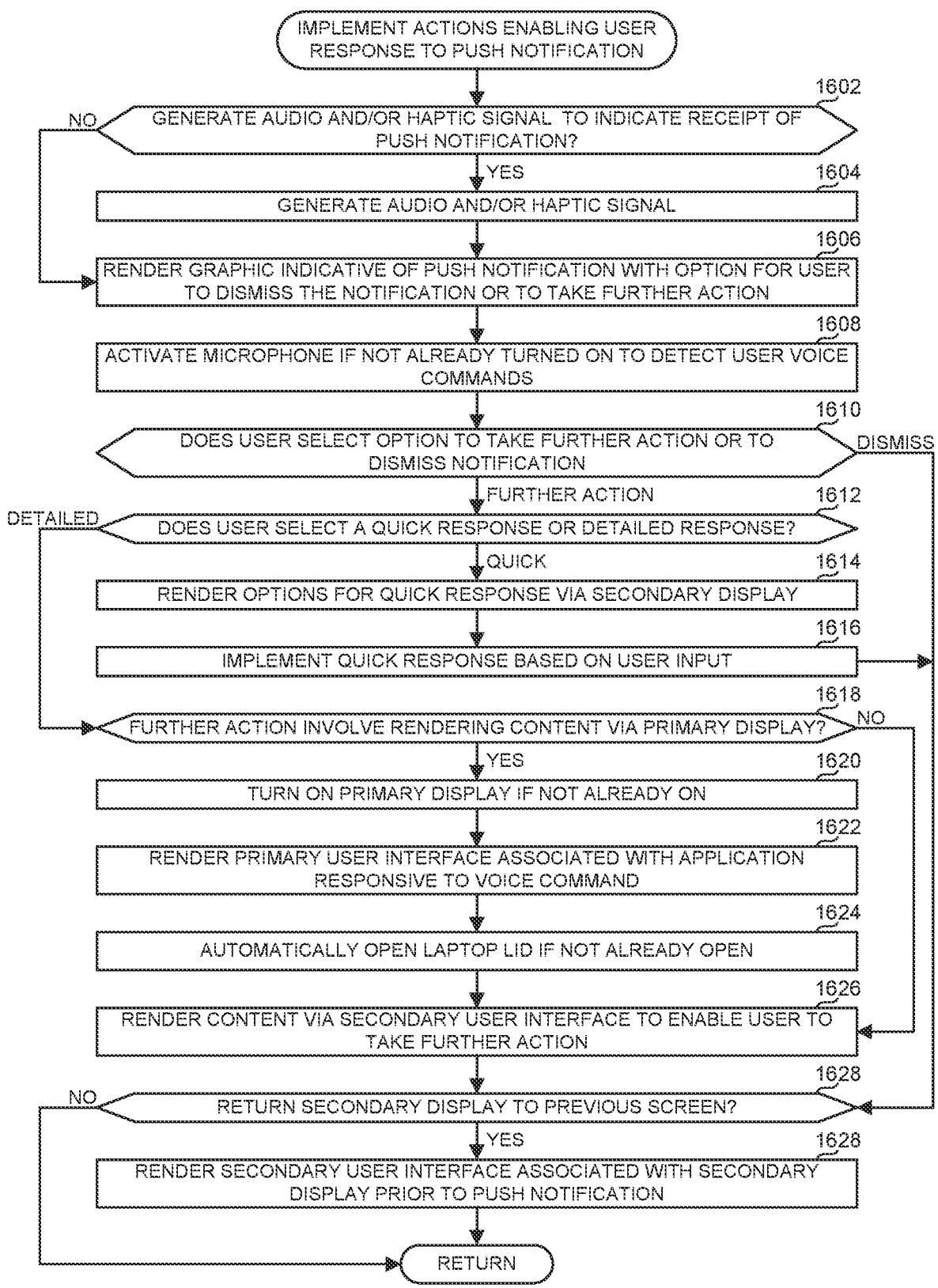

FIG. 16 provides further detail regarding the implementation of block 1236 of FIG. 12B to implement actions enabling the user to respond to a push notification. As described above in connection with FIG. 12B, this process begins after having received a push notification (as determined at block 1234 of FIG. 12B). Accordingly, the example process of FIG. 16 begins at block 1602 where the example push notification controller 514 determines whether to generate an audio and/or haptic signal to indicate the receipt of the push notification. If so, control advances to block 1604 where the example system controller 522 generates the audio and/or haptic signal. Thereafter, control advances to block 1606. If the example push notification controller 514 determines not to generate an audio and/or haptic signal, control advances directly to block 1606.

At block 1606, the example secondary display controller 518 renders a graphic indicative of the push notification with an option for the user to dismiss the notification or to take further action. The nature of the further action and/or the associated graphic may depend on the nature of the push notification. In some examples, the further action may involve reviewing more detailed information about the notification. In some examples, the further action may involve the user responding to the notification either by acknowledging and/or accepting the notification or providing a more detailed response. In some examples, the option to dismiss the notification may be presented as an explicit option (e.g., as a button or icon) the user is to select. In other examples, the user may dismiss the notification by not taking any further action regarding the notification within a threshold period of time. As a specific example, a push notification may correspond to an incoming conference call. The options for further action to be taken by the user may include accepting or answering, dismissing the call (e.g., by selecting the hang up icon or by not answering within a threshold period of time), or sending a quick reply (e.g., a text message stating the user cannot take the call at the moment).

At block 1608, the example system controller 522 activates the microphone 130 if not already turned on to detect user voice commands. In this manner, the user may specify the further action the user intends to take using a voice command without having to physically touch the secondary display 116. At block 1610, the example push notification controller 514 determines whether the user selects an option to take further action or to dismiss the notification. If the example push notification controller 514 determines that further action was taken, control advances to block 1612 where the example push notification controller 514 determines whether the user selected a quick response or a detailed response. In the context of an incoming conference call, a quick response may include a text message to the caller whereas a more detailed response includes answering the call. In other contexts, for example, a push notification indicating a new email message has been received, a quick reply may be to acknowledge receipt of the email whereas a more detailed response includes drafting a reply email. If the user selected a quick response, control advances to block 1614, where the example secondary display controller 518 renders options for the quick response via the secondary display 116. That is, in some examples, after the user has indicated an intent to provide a quick response there may be multiple options for the quick response. As a specific example, if the user cannot answer an incoming conference call, the user may select an option to send a quick text message. Upon selecting this option, multiple preset text messages may be provided to the user to select to send to the caller. In some examples, there may not be multiple options for the quick response such that block 1614 may be omitted. For instance, in some examples, the push notification may be a request from a separate device to share a document or other file with the portable computer 100. In other examples, where the separate device is a trusted device, the push notification may indicate the separate device is transmitting the file or document to the portable computer 100. In such examples, the only option for response by the user may be either to dismiss or deny the request/transmission or to select a quick reply corresponding to accepting the request.

At block 1616, the example system controller 522 implements the quick response based on the user input. How the system controller 522 implements the quick response may depend on the nature of the notification and the quick response selected by the user. For example, in the context of a quick text-message reply to an incoming conference call, the system controller 522 may transmit the selected text message (e.g., via the communications interface(s) 504) to the caller. In examples where the push notification indicates a trusted device is transmitting a document or other file, the quick response involves the portable computer 100 storing the shared document. In some examples, where the separate device has been previously established as a trusted device, the portable computer 100 may automatically receive and store the shared document and the quick response is merely to acknowledge receipt of the document. Where the push notification corresponds to a request to share the document or file, the system controller 522 may establish a connection with the separate device to then receive the document or file following the user's quick response to accept the request. After implementing the quick response at block 1616, control advances to block 1628. Returning to block 1612, if the example push notification controller 514 determines the user selected a detailed response, control advances to block 1618. In some examples, a quick response may not be an option such that control automatically advances from block 1610 to block 1618 when the user takes further action.

At block 1618, the example system controller 522 determines whether the further action involves rendering content via the primary display 114 as part of the response. If so, control advances to block 1620 where the example primary display controller 516 turns on the primary display 114 if it is not already on. The primary display 114 may not be on if the lid 106 of the portable computer 100 is closed at the time the push notification is received. At block 1622, the example primary display controller 516 renders a primary user interface associated with an application that enables the further action of the user. As a specific example, if the user indicates the intent to response to an incoming call with a 360 degree video, the example primary display controller 516 may render a primary user interface associated with the conference calling application via the primary display 114, where the user interface includes a 360 video stream of the surrounding environment of the portable computer 100 as captured by the world and user facing cameras 122, 124. As another example, if the push notification corresponds to a new email and the user indicates the intent to draft a reply email, the example primary display controller 516 may render a primary user interface associated with an email application via the primary display 114. At block 1624, the example lid controller 520 automatically opens the computer lid if not already open. In some examples, the hinge 112 may not be constructed to automatically open the lid 106 of the portable computer 100. In such examples, block 1624 may be omitted. In some such examples, the secondary display 116 may provide a prompt directing the user to open the lid 106 to be able to see the content rendered via the primary display 114. Thereafter, control advances to block 1626. Returning to block 1618, if the example system controller 522 determines the further action does not to rendering content via the primary display 114, control advances directly to block 1626.

At block 1626, the example secondary display controller 518 renders a secondary user interface via the secondary display to enable the user to take the further action. In some examples, the content rendered via the secondary display 116 may be done in conjunction with what is rendered via the primary display 114. For instance, in some examples, while a video stream for a video conference call may be rendered via the primary display 114, controls for the call may be rendered via the secondary display 116. In some examples, when the primary display 114 is used by the user in taking further action to respond to the push notification, no content relevant to the push notification is rendered via the secondary display 116 such that block 1626 may be omitted. Thereafter, control advances to block 1628. Returning to block 1610, if the example push notification controller 514 determines that the user selects to dismiss the notification, control advances directly to block 1628.

At block 1622, the example secondary display controller 518 determines whether to return the secondary display 116 to a previous screen. If so, control advances to block 1628 where the example secondary display controller 518 renders the secondary user interface previously rendered on the secondary display prior to the voice command. Thereafter, the example process ends and returns to continue the process of FIGS. 12A and 12B. If the example secondary display controller 518 determines not to return the secondary display 116 to a previous screen, the example process of FIG. 16 immediately ends and returns to continue the process of FIGS. 12A and 12B.

Figure 17:
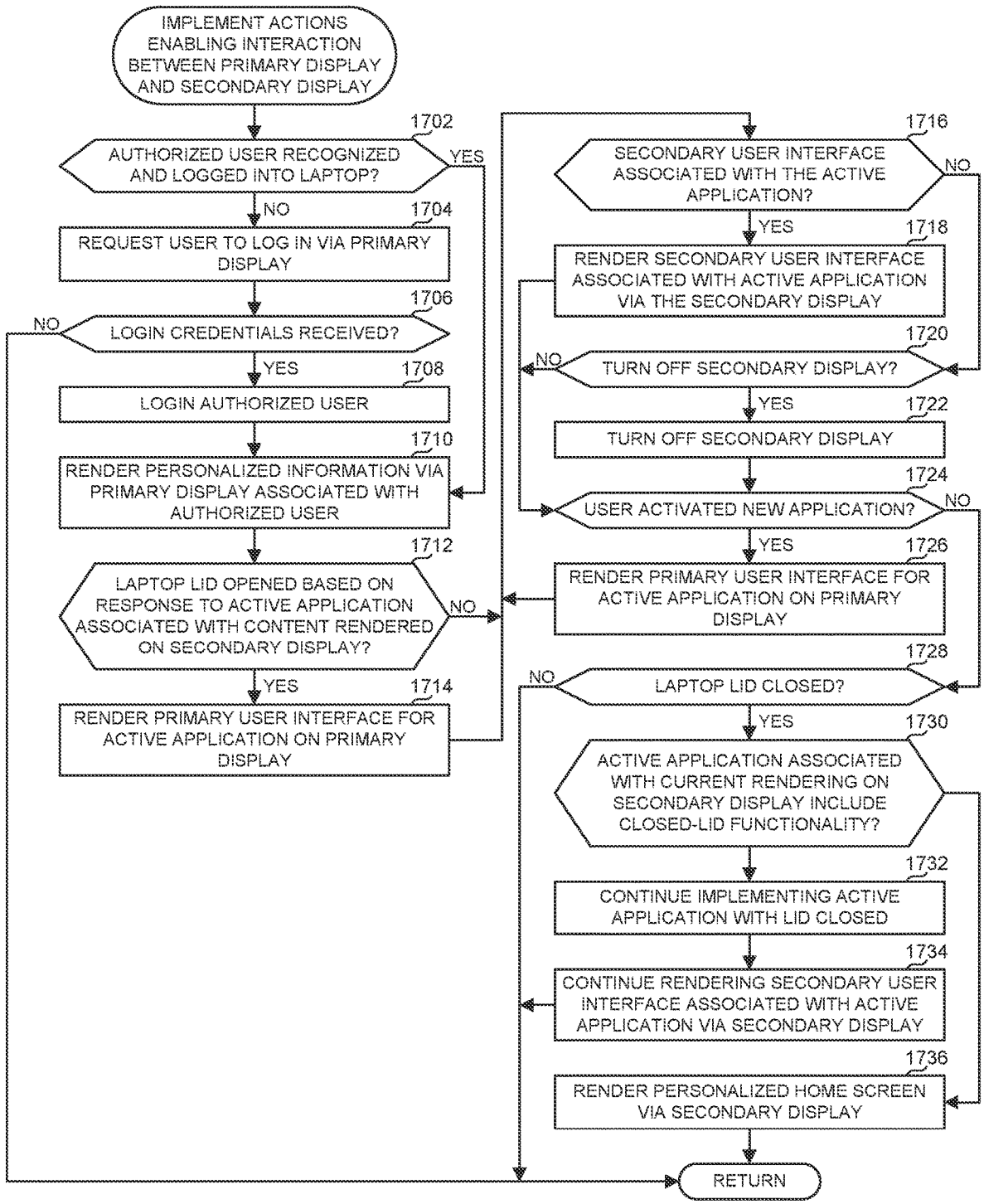

FIG. 17 provides further detail regarding the implementation of block 1240 of FIG. 12B to implement actions enabling interaction between the primary display 114 and the secondary display 116. As described above in connection with FIG. 12B, this process begins after having determined that this computer lid 106 is opened. Further, as described above, block 1240 may be implemented in the context of an authorized user being logged into the portable computer 100 (e.g., when control comes from block 1234 or block 1236) or in the context of no authorized user being logged into the portable computer 100 (e.g., when control comes from block 1216 or block 1220). Accordingly, the example process of FIG. 17 begins at block 1702 where the example login controller 512 determines whether an authorized user has been recognized and logged into the portable computer 100. If so, control advances to block 1710. Otherwise, control advances to block 1704 where the example login controller 512 (in conjunction with the primary display controller 516) request the user to log in via the primary display 114. At block 1706, the example login controller 512 determines whether the login credentials are received. If not, the example process of FIG. 17 ends and returns to continue the process of FIGS. 12A and 12B. If so, control advances to block 1708 where the example login controller 512 logs in the authorized user.

At block 1710, the example primary display controller 516 renders personalized content via the primary display 114 associated with the authorized user. At block 1712, the example lid controller 520 determines whether the computer lid 106 was opened based on a response to an active application associated with content rendered via the secondary display 116. As an example, a user may have indicated an intent via the secondary display 116 to initiate a 360 degree video conference call (that involves use of the primary display 114) before opening the lid 106 of the portable computer 100 as discussed in the illustrated example of FIG. 10. As another example, the user may have indicated an intent via the secondary display 116 to draft a reply (on the primary display 114) to a new email message before opening the lid 106. If the example lid controller 520 determines that the computer lid 106 was opened based on a response to an active application associated with content rendered via the secondary display 116, controls advances to block 1714 where the example primary display controller 516 renders a primary user interface for the active application on the primary display 114. Thereafter, control advances to block 1716. Returning to block 1712, if the example lid controller 520 determines that the computer lid 106 was not opened based on a response to an active application associated with content rendered via the secondary display 116, controls advances directly to block 1716.

At block 1716, the example system controller 522 determines whether there is a secondary user interface associated with the active application. If so, control advances to block 1718 where the example secondary display controller 518 renders the secondary user interface associated with the active application via the secondary display 116. Thereafter, control advances to block 1724. If the example system controller 522 determines there is not a secondary user interface associated with the active application (or there is currently no active application), control advances to block 1720 where the example secondary display controller 518 determines whether to turn off the secondary display 116. If so, control advances to block 1722 where the example secondary display controller 518 turns off the secondary display 116. Thereafter, control advances to block 1724. If the example secondary display controller 518 determines not to turn off the secondary display 116 at block 1720, control advances directly to block 1724.

At block 1724, the example system controller 522 determines whether the user has activated a new application. In some examples, the new application may be launched or activated by the user interacting with either the primary display 114 or the secondary display 116. If a new application was activated, control advances to block 1726 where the example primary display controller 516 renders a primary user interface for the active application on the primary display 114. If, at block 1724, the example system controller 522 determines the user has not activated a new application control advances to block 1728 where the example lid controller 520 determines whether the computer lid has been closed. If the lid has not closed, the example process of FIG. 17 ends and returns to continue the process of FIGS. 12A and 12B. If the lid has closed, control advances to block 1730.

At block 1730, the example system controller 522 determines whether the active application associated with the current rendering on the secondary display 116 includes closed-lid functionality. Example applications associated with closed-lid functionality include the conference calling application described above in connection with FIG. 10 and the music player application described above in connection with FIG. 11. If the active application is associated with closed-lid functionality, control advances to block 1732 where the example system controller 522 continues implementing the active application with the lid 106 closed. At block 1734, the example secondary display controller 518 continues to render the secondary user interface associated with the active application via the secondary display 116. Thereafter, the example process of FIG. 17 ends and returns to continue the process of FIGS. 12A and 12B. Returning to block 1730, if the example system controller 522 determines that the active application associated with the current rendering on the secondary display 116 does not include closed-lid functionality, control advances to block 1736 where the example primary display controller 516 renders a personalized home screen via the secondary display 116. Thereafter, the example process of FIG. 17 ends and returns to continue the process of FIGS. 12A and 12B.

As mentioned above, in some examples, the portable computer 100 includes a hinge 112 that enables the lid 106 to be automatically opened and/or closed without a user manually moving the lid 106. In some examples, the computer lid 106 may automatically open in response to user interactions with the secondary display 116 (either through a voice command or a physical touch). There may be other circumstances in which a user may indicate an intent to access content via the primary display 114 while the portable computer 100 is closed to trigger the portable computer 100 to automatically open. In one example, the user may tap on the portable computer 100 while closed with a unique tapping sequence corresponding to an accelerometer-based password that causes the user the be authenticated and logged in to the portable computer 100 and further caused the lid 106 to automatically open. Additionally or alternatively, the lid 106 may automatically open in response to the camera input analyzer 506 recognizing the user.

In other examples, triggering the portable computer 100 to automatically open from a closed position may and render relevant content via the primary display 114 may be based on interactions associated with a separate device. For example, the user may be viewing content via a portable device (e.g., a smartphone) and then tap the closed portable computer 100 with the portable device to cause the portable computer 100 to open and begin rendering the content rendered via the portable device. As another example, a user may virtually (e.g., through a physical gesture of the user's hand) pick up an object (e.g., a document, an image, etc.) rendered on a portable device and virtually drop it on to a closed portable computer 100 to cause the portable computer 100 to open up and provide the moved object via the primary display 114. In such examples, the physical gesture of the user's hand may be detected by analyzing images captured by the world facing camera 124 on the portable computer 100. In some examples, the separate portable device, which may already be communicatively coupled to the portable computer 100 (e.g., via a Bluetooth pairing) may transmit a signal to the portable computer 100 to cause the world facing camera 124 to turn on to detect the gesture based on the portable device first detecting the user's gesture to virtually pick up the object. In some examples, the gesture, tapping of devices, and or other actions by the user may trigger the portable device and the portable computer 100 to communicatively connect so that the content from the portable device may be shared with the portable computer 100 for rendering via the primary display 114 once the lid 106 is opened.

In some examples, the lid 106 may begin to open when the user did not intend to open the portable computer 100. In some examples, the user may provide an additional command (via voice, touch, or gesture) to reverse the operation. In some such examples, the lid 106 may automatically reverse its direction and return to the closed position.

Figure 18:
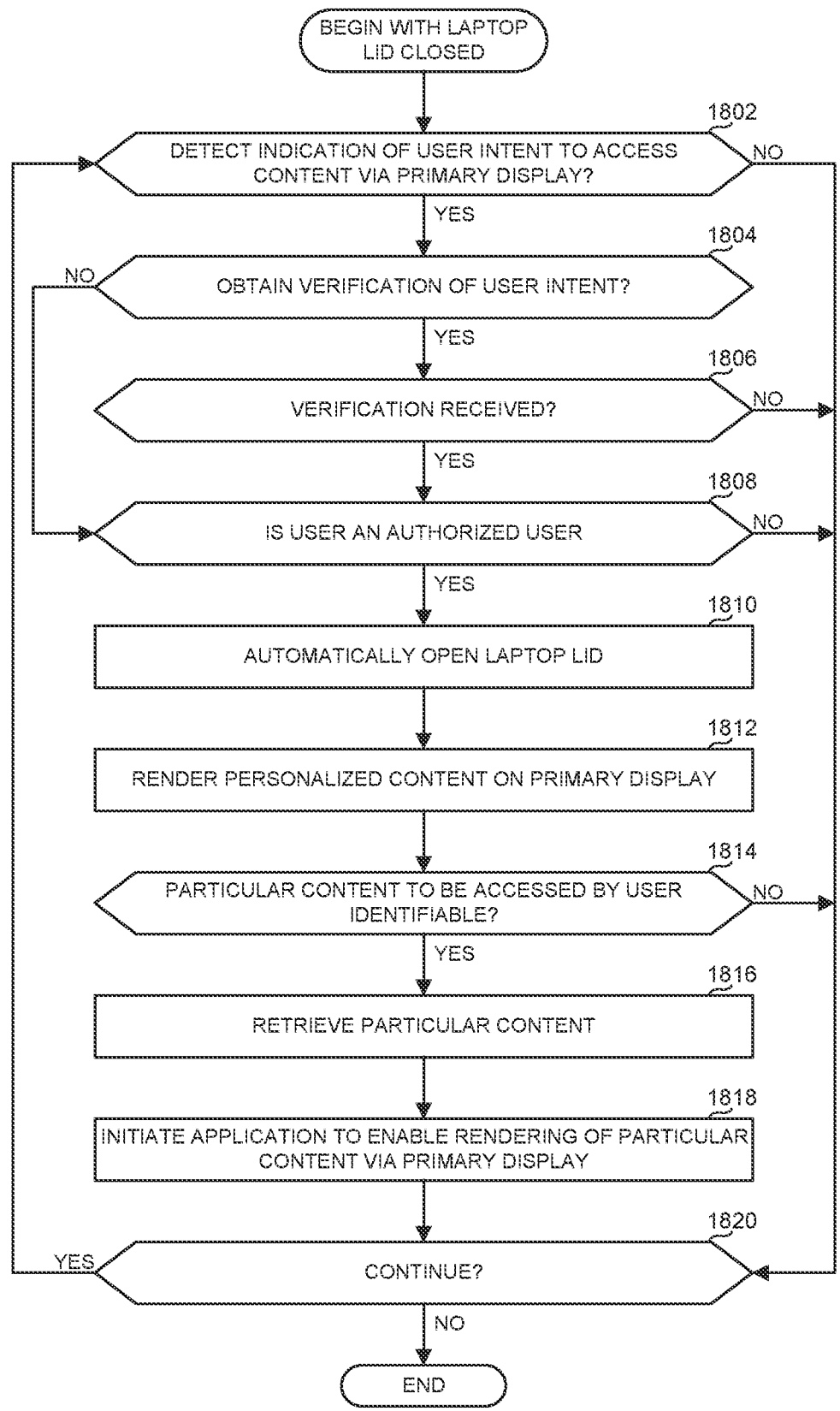

FIG. 18 illustrates an example process flow to automatically open the lid 106 of the portable computer 100 based on an indication of intent of an authenticated user to access content via the primary display 114. The example process begins with the computer lid 106 closed. At block 1802, one or more of the example camera input analyzer 506, the example audio input analyzer 508, the touch-based input analyzer detects an indication of user intent to access content via the primary display 114. At block 1804, the example system controller 522 determines whether to obtain verification of the user intent. In some examples, verification may be obtained to avoid false positives in detecting an intent to open the lid based on a single sensor or single associated user input. If the example system controller 522 determines to obtain verification, control advances to block 1806 where the example system controller 522 determines whether verification was received? If so, control advances to block 1808 where the example login controller 512 determines whether the user is an authorized user. If so, control advances to block 1810, where the example lid controller 520 automatically opens the computer lid 106. At block 1812, the example primary display controller 516 renders personalized content (e.g., a home screen) on the primary display 114.

At block 1814, the example system controller 522 determines whether particular content to be accessed by the user is identifiable. Particular content may be identifiable if the content is being shared from a separate electronic device (e.g., a smartphone in communication with the portable computer 100) or identified based on user interactions with the secondary display 116. Particular content may not be identified where the user had merely indicated an intent to open the portable computer 100 without reference to how the user intends to use the portable computer 100 thereafter. If particular content to be accessed by the user is identifiable, control advances to block 1816 where the example system controller 522 retrieves the particular content. The way in which the content is retrieved may depend on the nature of the content and the way in which the user indicated an intent to access the content. For instance, in some examples, the content may be stored on the portable computer 100 and is identified by the user based on a touch-based selection of the content via the secondary display 116. In such examples, the example system controller 522 may retrieve the content from the memory of the portable computer 100. In another example, the particular content may be transferred (e.g., retrieved) from a separate device (e.g., the user's smartphone) that is local to and communicatively coupled to the portable computer 100. In other examples, the desired content may be requested based on a voice command that involve the portable computer 100 launching a web browser that retrieves the particular content by accessing a remote server. At block 1818, the example system controller 522 initiates an application to enable the rendering of the particular content via the primary display 114.

Thereafter, control advances to block 1820. If no indication of user intent is detected at block 1802, no verification is received at block 1806, the user is not authorized at block 1808, or there is no particular content that is identifiable at block 1814, control advances directly to block 1820. At block 1820, the example system controller 522 determines whether to continue the process. If so, control returns to block 1802. Otherwise, the example process of FIG. 18 ends.

Figure 19:
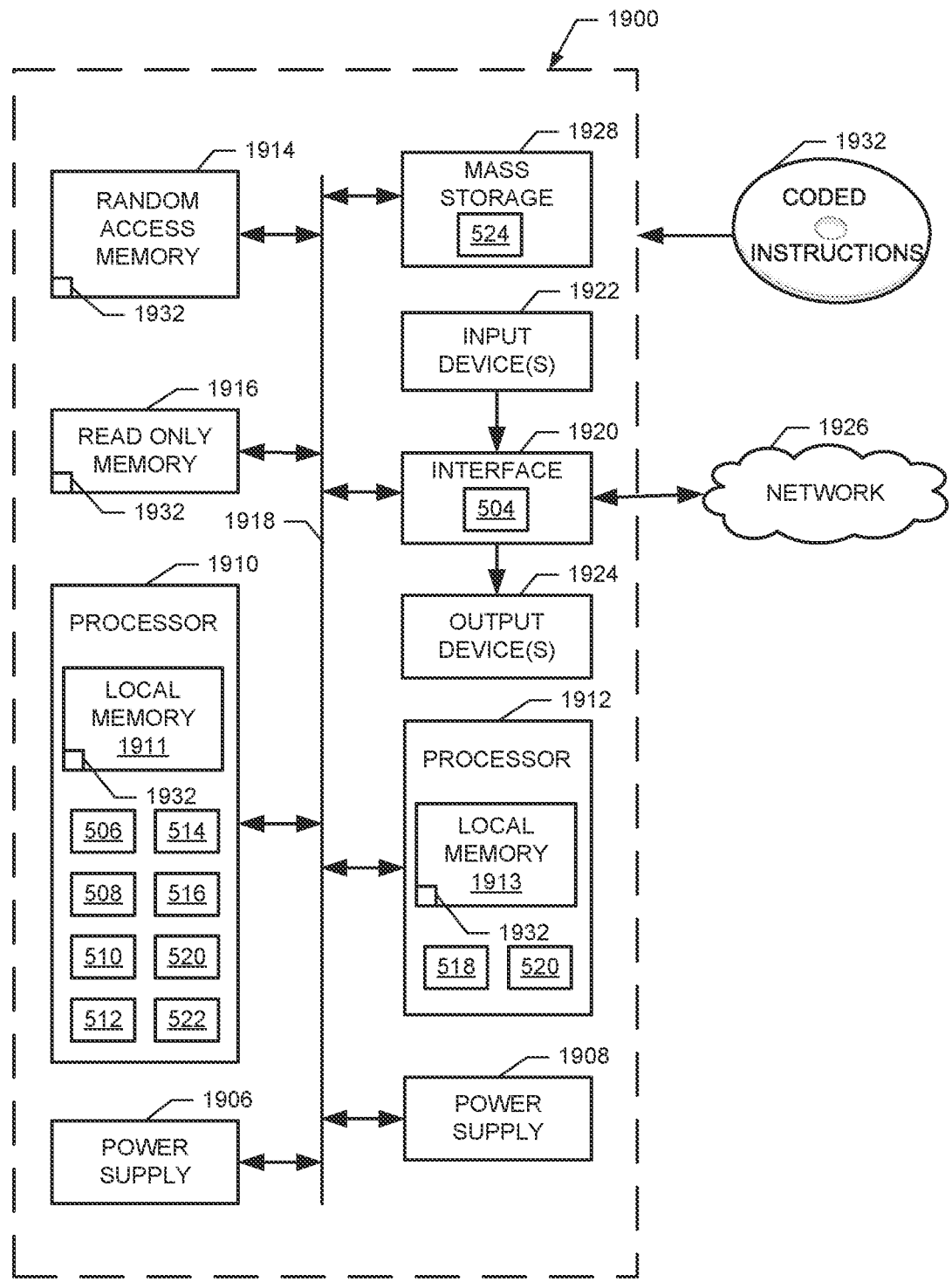
FIG. 19 is a block diagram of an example processing platform structured to execute the instructions of FIGS. 12A, 12B, and 13-18 to implement example portable computer of FIGS. 1, 2, and/or 5.

FIG. 19 is a block diagram of an example processor platform 1900 structured to execute the instructions of FIGS. 12A, 12B, and 13-18 to implement the example portable computer 100 of FIGS. 1, 2, and/or 5. The processor platform 1900 of the illustrated example includes a first processor 1910 and a second processor 1912. The processors 1910, 1912 of the illustrated example are hardware. For example, the processors 1910, 1912 can be implemented by one or more integrated circuits, logic circuits, microprocessors, GPUs, DSPs, or controllers from any desired family or manufacturer. The hardware processors may be a semiconductor based (e.g., silicon based) device. The separate processors enable the functions of the portable computer 100 to be performed when the lid 106 is closed with less power (e.g., using the second processor 1912) than when the portable computer 100 is opened and operating in a full power mode (e.g., using the first processor 1910). In some such examples, the processor platform 1900 includes a first power supply 1906 to provide power to the first processor 1910 and other components when the system is operating in a full power mode and a second power supply 1908 to provide power to the second processor 1912 and other components when the system is operating in a low power mode. In the illustrated example of FIG. 19, the first processor 1910 implements the example camera input analyzer 506, the example audio input analyzer 508, the example touch-based input analyzer 510, the example login controller 512, the example push notification controller 514, the example primary display controller 516, the example lid controller 520, and the example system controller 522. Further, in the illustrated example, the second processor 1912 implements the example secondary display controller 518, and the example system controller 522. The example system controller 522 is described as being implemented by both processors 1910 because the functionality of the system controller 522 is shared across both processors. In some examples, different functions of the system controller 522 may be implement exclusive on one of the processors 1910, 1912. In other examples, functionality of the system controller 522 may be redundantly implemented on both processors 1910, 1912. Although not represented in the illustrated example, one or more of the example camera input analyzer 506, the example audio input analyzer 508, the example touch-based input analyzer 510, the example login controller 512, the example push notification controller 514, the example primary display controller 516, and/or the example lid controller 520 may be implemented in whole or in part by the second processor 1912 instead of or in addition to the first processor 1910. In some examples, the second processor 1912 may be omitted and the first processor 1910 may implement each of the example camera input analyzer 506, the example audio input analyzer 508, the example touch-based input analyzer 510, the example login controller 512, the example push notification controller 514, the example primary display controller 516, the example secondary display controller 518, the example lid controller 520, and the example system controller 522.

The processor 1910 of the illustrated example includes a local memory 1911 (e.g., a cache) and the processor 1912 of the illustrated example includes a local memory 1913 (e.g., a cache). The processors 1910, 1912 of the illustrated example are in communication with a main memory including a volatile memory 1914 and a non-volatile memory 1916 via a bus 1918. The volatile memory 1914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1916 may be implemented by flash memory and/or any other desired type of memory device. Access to the main memory 1914, 1916 is controlled by a memory controller.

The processor platform 1900 of the illustrated example also includes an interface circuit 1920. The interface circuit 1920 may be implemented by any type of interface standard, such as an Ethernet interface, a universal serial bus (USB), a Bluetooth® interface, a near field communication (NFC) interface, and/or a PCI express interface. In this example, the interface circuit 1920 implements the example communication interface(s) 504.

In the illustrated example, one or more input devices 1922 are connected to the interface circuit 1920. The input device(s) 1922 permit(s) a user to enter data and/or commands into the processor 1910. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1924 are also connected to the interface circuit 1920 of the illustrated example. The output devices 1924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1920 of the illustrated example, thus, typically includes a graphics driver card, a graphics driver chip and/or a graphics driver processor.

The interface circuit 1920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1900 of the illustrated example also includes one or more mass storage devices 1928 for storing software and/or data. Examples of such mass storage devices 1928 include floppy disk drives, hard drive disks, compact disk drives, Blu-ray disk drives, redundant array of independent disks (RAID) systems, and digital versatile disk (DVD) drives. In this example, the mass storage devices 1928 includes the example database(s) 524.

The machine executable instructions 1932 of FIGS. 12A, 12B, and 13-18 may be stored in the mass storage device 1928, in the volatile memory 1914, in the non-volatile memory 1916, and/or on a removable non-transitory computer readable storage medium such as a CD or DVD.

From the foregoing, it will be appreciated that example methods, apparatus and articles of manufacture have been disclosed that enable a user to interact with and/or operate a portable computer while the lid is closed and the computer is in a lower power state than when the computer is opened and operating in a full power mode. This is achieved in part by a low power secondary display that is visible to the user when the computer lid is closed. Examples disclosed herein enable a user to be recognized and/or authenticated to be logged into the computer before the user has opened the lid to provide a more seamless user experience with the computer. Further, in some examples, the computer may automatically open from a closed position without the user having to manually lift the lid to further assist a user in being able to quickly open and access content via a primary display. Disclosed methods, apparatus and articles of manufacture are accordingly directed to one or more improvement(s) in the functioning of a computer.

Example methods, apparatus, systems, and articles of manufacture to operate closed-lid portable computers are disclosed herein. Further examples and combinations thereof include the following:

Example 1 includes an apparatus, comprising a camera input analyzer to analyze image data captured by a world facing camera on a portable computer when a lid of the portable computer is in a closed position, the world facing camera on a first side of the lid, the portable computer including a primary display on a second side of the lid opposite the first side, and a secondary display controller to render content via a secondary display of the portable computer in response to the analysis of the image data, the secondary display controller to render the content on the secondary display while the lid of the portable computer is in the closed position and the primary display is turned off.

Example 2 includes the apparatus of example 1, wherein the secondary display is disposed in a base of the portable computer, the lid rotatable relative to the base about a hinge connecting the lid to the base.

Example 3 includes the apparatus of example 2, wherein the hinge is to automatically open the lid in response to the analysis of the image data authenticating a user.

Example 4 includes the apparatus of any one of examples 1-3, wherein the camera input analyzer is to perform facial recognition analysis on the image data to identify a person captured by the world facing camera, and further including a login controller to login the person in response to the camera input analyzer recognizing the person as an authorized user of the portable computer, the login controller to login the person before the lid is moved from the closed position.

Example 5 includes the apparatus of example 4, wherein the content rendered via the secondary display includes personalized information corresponding to the authorized user.

Example 6 includes the apparatus of example 4, wherein the content rendered via the secondary display includes generic information when the camera input analyzer is unable to recognize the person.

Example 7 includes the apparatus of any one of examples 1-6, further including a human presence sensor to detect a presence of a person nearby the portable computer, the human presence sensor to trigger activation of the world facing camera.

Example 8 includes the apparatus of any one of examples 1-7, wherein the content is first content, and further including an audio input analyzer to analyze a voice command spoken when the lid is in the closed position, a microphone on the portable computer to capture the voice command when the lid is in the closed position and the voice command is spoken by a person within audible range of the microphone, the secondary display controller to render second content via the secondary display in response to the analysis of the voice command.

Example 9 includes the apparatus of example 8, wherein the audio input analyzer is to perform voice recognition analysis of the voice command without communicating with a remote server.

Example 10 includes the apparatus of example 9, wherein the second content rendered via the secondary display includes personalized information corresponding to the person when the audio input analyzer recognizes the voice command as corresponding to a voice of an authorized user of the portable computer.

Example 11 includes the apparatus of any one of examples 8-10, further including a system controller to determine whether third content is to be rendered via the primary display as part of a response to the voice command, and a primary display controller to activate the primary display while the lid is still closed and render the third content via the primary display.

Example 12 includes the apparatus of example 11, further including a lid controller to automatically move the lid to an open position in response to the voice command.

Example 13 includes the apparatus of any one of examples 1-12, wherein the world facing camera has a field of view of at least 180 degrees.

Example 14 includes the apparatus of example 13, wherein the image data is first image data, the camera input analyzer to combine the first image data with second image data to form a 360 degree image of an environment surrounding the portable computer, the second image data captured by a user facing camera on the portable computer, the user facing camera on the second side of the lid, the user facing camera having a field of view of at least 180 degrees.

Example 15 includes the apparatus of any one of examples 1-14, further including a communications interface to receive a push notification from a device separate from the portable computer while the lid is in the closed position, the secondary display to render a graphic while the lid is in the closed position, the graphic including an option for a user to respond to the push notification.

Example 16 includes the apparatus of example 15, wherein the push notification corresponds to the device sharing data with the portable computer.

Example 17 includes the apparatus of any one of examples 1-16, further including a touch-based input analyzer to analyze user interactions with the secondary display detected by a touch sensor associated with the secondary display.

Example 18 includes the apparatus of example 17, wherein the touch sensor is associated with a touchpad disposed on a base of the portable computer, the secondary display corresponding to an extension of the touchpad, the secondary display to extend along a front edge of the base to be visible when the lid is in the closed position.

Example 19 includes the apparatus of any one of examples 1-18, further including a primary display controller to render a primary user interface via the primary display when the lid is open and the primary display is powered, the primary user interface associated with an application running on the portable computer, the secondary display to render a secondary user interface associated with the application via the secondary display.

Example 20 includes the apparatus of example 19, wherein the secondary user interface includes controls to enable a user to operate the application, the primary display controller to update the primary user interface based on user interactions with the controls in the secondary user interface.

Example 21 includes the apparatus of example 20, wherein the secondary display controller is to continue to render the secondary user interface via the secondary display after the lid is returned to the closed position and the primary display is turned off, the controls in the secondary user interface to enable the user to continue to operate the application when the lid is in the closed position.

Example 22 includes the apparatus of any one of examples 19-21, wherein the primary display controller is implemented with a first processor and the secondary display controller is implemented with a second processor.

Example 23 includes the apparatus of example 22, wherein the second processor consumes less power than the first processor.

Example 24 includes a non-transitory computer readable medium comprising instructions that, when executed, cause a portable computer to at least analyze image data captured by a world facing camera on the portable computer when a lid of the portable computer is in a closed position, the world facing camera on a first side of the lid, the portable computer including a primary display on a second side of the lid opposite the first side, and render content via a secondary display of the portable computer in response to the analysis of the image data, the portable computer to render the content on the secondary display while the lid of the portable computer is in the closed position and the primary display is turned off.

Example 25 includes the non-transitory computer readable medium of example 24, wherein the instructions further cause the portable computer to perform facial recognition analysis on the image data to identify a person captured by the world facing camera, and login the person in response to recognition of the person as an authorized user of the portable computer before the lid is moved from the closed position.

Example 26 includes the non-transitory computer readable medium of example 25, wherein the content rendered via the secondary display includes personalized information corresponding to the authorized user.

Example 27 includes the non-transitory computer readable medium of example 25, wherein the content rendered via the secondary display includes generic information when the person is not recognized.

Example 28 includes the non-transitory computer readable medium of any one of examples 24-27, wherein the instructions further cause the portable computer to detect a presence of a person nearby the portable computer, and trigger activation of the world facing camera.

Example 29 includes the non-transitory computer readable medium of any one of examples 24-28, wherein the content is first content, the instructions to further cause the portable computer to analyze a voice command when the lid is in the closed position, a microphone on the portable computer to capture the voice command when the lid is in the closed position and the voice command is spoken by a person within audible range of the microphone on the portable computer, and render second content via the secondary display in response to the analysis of the voice command.

Example 30 includes the non-transitory computer readable medium of example 29, wherein the instructions further cause the portable computer to perform voice recognition analysis of the voice command without communicating with a remote server.

Example 31 includes the non-transitory computer readable medium of example 30, wherein the second content rendered via the secondary display includes personalized information corresponding to the person when the voice command is recognized as corresponding to a voice of an authorized user of the portable computer.

Example 32 includes the non-transitory computer readable medium of any one of examples 29-31, wherein the instructions further cause the portable computer to determine whether third content is to be rendered via the primary display as part of a response to the voice command, activate the primary display while the lid is still closed, and render the third content via the primary display.

Example 33 includes the non-transitory computer readable medium of example 32, wherein the instructions further cause the portable computer to automatically move the lid to an open position in response to the voice command.

Example 34 includes the non-transitory computer readable medium of any one of examples 24-33, wherein the image data is first image data, the instructions to further cause the portable computer to combine the first image data with second image data to form a 360 degree image of an environment surrounding the portable computer, the second image data captured by a user facing camera on the portable computer, the user facing camera on the second side of the lid, each of the world facing camera and the user facing camera having a field of view of at least 180 degrees respectively.

Example 35 includes the non-transitory computer readable medium of any one of examples 24-34, wherein the instructions further cause the portable computer to render a graphic while the lid is in the closed position in response to receipt of a push notification from a device separate from the portable computer, the graphic including an option for a user to respond to the push notification.

Example 36 includes the non-transitory computer readable medium of example 35, wherein the push notification corresponds to the device sharing data with the portable computer.

Example 37 includes the non-transitory computer readable medium of any one of examples 24-36, wherein the instructions further cause the portable computer to analyze user interactions with the secondary display detected by a touch sensor associated with the secondary display.

Example 38 includes the non-transitory computer readable medium of any one of examples 24-37, wherein the instructions further cause the portable computer to render a primary user interface via the primary display when the lid is open and the primary display is powered, the primary user interface associated with an application running on the portable computer, and render a secondary user interface associated with the application via the secondary display.

Example 39 includes the non-transitory computer readable medium of example 38, wherein the secondary user interface includes controls to enable a user to operate the application, the instructions to further cause the portable computer to update the primary user interface based on user interactions with the controls in the secondary user interface.

Example 40 includes the non-transitory computer readable medium of example 39, wherein the instructions further cause the portable computer to continue to render the secondary user interface via the secondary display after the lid is returned to the closed position and the primary display is turned off, the controls in the secondary user interface to enable the user to continue to operate the application when the lid is in the closed position.

Example 41 includes a method comprising analyzing, by executed an instruction with at least one processor, image data captured by a world facing camera on a portable computer when a lid of the portable computer is in a closed position, the world facing camera on a first side of the lid, the portable computer including a primary display on a second side of the lid opposite the first side, and rendering, by executed an instruction with the at least one processor, content via a secondary display of the portable computer in response to the analysis of the image data, the portable computer to render the content on the secondary display while the lid of the portable computer is in the closed position and the primary display is turned off.

Example 42 includes the method of example 41, further including performing facial recognition analysis on the image data to identify a person captured by the world facing camera, and logging in the person in response to recognition of the person as an authorized user of the portable computer before the lid is moved from the closed position.

Example 43 includes the method of example 42, further including rendering the content via the secondary display to include personalized information corresponding to the authorized user.

Example 44 includes the method of example 42, further including rendering the content via the secondary display to include generic information when the person is not recognized.

Example 45 includes the method of any one of examples 41-44, further including detecting a presence of a person nearby the portable computer, and triggering activation of the world facing camera.

Example 46 includes the method of any one of examples 41-45, wherein the content is first content, the method further including analyzing a voice command when the lid is in the closed position, a microphone on the portable computer to capture the voice command when the lid is in the closed position and the voice command spoken by a person within audible range of the microphone on the portable computer, and rendering second content via the secondary display in response to the analysis of the voice command.

Example 47 includes the method of example 46, further including performing voice recognition analysis of the voice command without communicating with a remote server, the second content rendered via the secondary display includes personalized information corresponding to the person when the voice command is recognized as corresponding to a voice of an authorized user of the portable computer.

Example 48 includes the method of any one of examples 46 or 47, further including determining whether third content is to be rendered via the primary display as part of a response to the voice command, activating the primary display while the lid is still closed, and rendering the third content via the primary display.

Example 49 includes the method of example 48, further including automatically moving the lid to an open position in response to the voice command.

Example 50 includes the method of any one of examples 41-49, wherein the image data is first image data, the method further including combining the first image data with second image data to form a 360 degree image of an environment surrounding the portable computer, the second image data captured by a user facing camera on the portable computer, the user facing camera on the second side of the lid, the world facing camera having a field of view of at least 180 degrees and the user facing camera having a field of view of at least 180 degrees.

Example 51 includes the method of any one of examples 41-50, further including rendering a graphic while the lid is in the closed position in response to receipt of a push notification from a device separate from the portable computer, the graphic including an option for a user to respond to the push notification.

Example 52 includes the method of example 51, wherein the push notification corresponds to the device sharing data with the portable computer.

Example 53 includes the method of any one of examples 41-52, further including analyzing user interactions with the secondary display detected by a touch sensor associated with the secondary display.

Example 54 includes the method of any one of examples 41-53, further including rendering a primary user interface via the primary display when the lid is open and the primary display is powered, the primary user interface associated with an application running on the portable computer, and rendering a secondary user interface associated with the application via the secondary display.

Example 55 includes the method of example 54, wherein the secondary user interface includes controls to enable a user to operate the application, the method further including updating the primary user interface based on user interactions with the controls in the secondary user interface.

Example 56 includes the method of example 55, further including continuing to render the secondary user interface via the secondary display after the lid is returned to the closed position and the primary display is turned off, the controls in the secondary user interface to enable the user to continue to operate the application when the lid is in the closed position.

Example 57 includes the method of any one of examples 54-56, wherein the at least one processor includes a first processor to control rendering of content via the primary display and a second processor to control rendering of content via the secondary display.

Example 58 includes the method of example 57, wherein the second processor consumes less power than the first processor.

Example 59 includes a portable computer, comprising a base, a lid, a hinge to rotatably couple the lid to the base to enable movement of the lid between a closed position and an open position, a primary display on a first side of the lid, a world facing camera on a second side of the lid opposite the first side, the world facing camera to capture image data at least when the lid is in the closed position, and at least one processor to initiate an operation on the portable computer in response to analysis of the image data, the at least one processor to initiate the operation while the lid is closed.

Example 60 includes the portable computer of example 59, wherein the operation includes logging the user into the portable computer when the analysis of the image data results in recognition of a user.

Example 61 includes the portable computer of example 59, wherein the operation includes automatically moving the lid to the open position when the analysis of the image data results in recognition of a user.

Example 62 includes the portable computer of any one of examples 59-61, further including a human presence sensor to trigger activation of the world facing camera in response to detecting a presence of a user.

Example 63 includes the portable computer of any one of examples 59-62, wherein the world facing camera is a panamorphic camera having a field of view of at least 180 degrees.

Example 64 includes the portable computer of example 63, further including a user facing camera on the first side of the lid, the user facing camera being a second panamorphic to enable the capture of a 360 degree field of view when using both the world facing camera and the user facing camera.

Example 65 includes the portable computer of any one of examples 59-64, further including a microphone to capture audio data corresponding to a voice command of a user, the at least one processor to recognize the user based on the voice command without communicating with a remote server.

Example 66 includes the portable computer of example 65, further including at least one of a spring or a motor associated with the hinge to automatically move the lid to the open position in response to the voice command.

Example 67 includes the portable computer of any one of examples 59-66, further including a secondary display on the base, the secondary display visible to a user when the lid is in the closed position, the secondary display including a touch sensitive surface to enable user interactions with the secondary display via touch.

Example 68 includes the portable computer of example 67, wherein the operation includes rendering content via the secondary display on the portable computer.

Example 69 includes the portable computer of example 68, wherein the content rendered via the secondary display includes user specific information associated with the user.

Example 70 includes the portable computer of example 68, wherein the at least one processor is to render generic information via the secondary display when the at least one processor does not recognize the user.

Example 71 includes the portable computer of any one of examples 67-70, further including a touchpad disposed on the base to face the primary display when the lid is in the closed position, the secondary display corresponding to an extension of the touchpad extending along a front edge of the base.

Example 72 includes the portable computer of any one of examples 67-71, wherein the secondary display is to render content associated with an application running on the portable computer while the primary display is turned off.

Example 73 includes the portable computer of any one of examples 67-72, wherein the at least one processor is to activate the primary display in response to user interactions with the secondary display while the lid is in the closed position.

Example 74 includes the portable computer of any one of examples 67-73, wherein the at least one processor is to render a primary user interface via the primary display when the lid is open, the primary user interface associated with an application executed by the at least one processor, the secondary display to render a secondary user interface associated with the application via the secondary display.

Example 75 includes the portable computer of example 74, wherein the secondary user interface includes user controls for the application.

Example 76 includes the portable computer of example 75, wherein the at least one processor is to continue to render the secondary user interface via the secondary display after the lid is returned to the closed position and the primary display is turned off, the user controls in the secondary user interface to enable the user to continue to control the application when the lid is in the closed position.

Example 77 includes the portable computer of any one of examples 74-76, wherein the at least one processor includes a first processor to control rendering of content via the primary display and a second processor to control rendering of content via the secondary display.

Example 78 includes the portable computer of any one of examples 74-77, further including a communications interface to enable wireless communications with a separate device in communication range of the portable computer, the secondary display to render a graphic while the lid is in the closed position, the graphic indicating an option to transfer data between the portable computer and the separate device, the communications interface to transfer the data between the portable computer and the separate device in response to the user selecting the graphic on the secondary display while the lid is in the closed position.

Example 79 includes an apparatus, comprising an audio input analyzer to analyze a voice command captured by a microphone on a portable computer, the voice command spoken by a person within audible range of the microphone when a lid of the portable computer is in a closed position, the portable computer including a primary display that is concealed when the lid is in the closed position, and a secondary display controller to render content via a secondary display of the portable computer in response to the analysis of the voice command, the secondary display controller to render the content on the secondary display while the lid of the portable computer is in the closed position and the primary display is turned off.

Example 80 includes the apparatus of example 79, wherein the secondary display is disposed in a base of the portable computer, the lid rotatable relative to the base about a hinge connecting the lid to the base.

Example 81 includes the apparatus of example 80, further including a lid controller to automatically open the lid in response to the analysis of the voice command recognizing the person as an authorized user of the portable computer.

Example 82 includes the apparatus of any one of examples 79-81, wherein the audio input analyzer is to perform voice recognition analysis of the voice command without communicating with a remote server.

Example 83 includes the apparatus of example 82, wherein the content rendered via the secondary display includes personalized information corresponding to the person when the audio input analyzer recognizes the voice command as corresponding to a voice of an authorized user of the portable computer.

Example 84 includes the apparatus of any one of examples 79-83, further including a login controller to login the person in response to the audio input analyzer recognizing the person as an authorized user of the portable computer, the login controller to login the person before the lid is moved from the closed position.

Example 85 includes the apparatus of any one of examples 79-84, further including a camera input analyzer to analyze image data captured by a world facing camera on the portable computer when the lid is in the closed position, the world facing camera on a first side of the lid, the primary display on a second side of the lid opposite the first side.

Example 86 includes the apparatus of example 85, further including a human presence sensor to detect a presence of a person nearby the portable computer, the human presence sensor to trigger activation of the world facing camera.

Example 87 includes the apparatus of any one of examples 79-86, wherein the content is first content, and further including a system controller to determine whether second content is to be rendered via the primary display as part of a response to the voice command, and a primary display controller to activate the primary display while the lid is still closed and render the second content via the primary display.

Example 88 includes the apparatus of example 87, further including a lid controller to automatically move the lid to an open position in response to the voice command.

Example 89 includes the apparatus of any one of examples 79-88, further including a communications interface to receive a push notification from a device separate from the portable computer while the lid is in the closed position, the secondary display controller to render a graphic on the secondary display while the lid is in the closed position, the graphic including an option for a user to respond to the push notification.

Example 90 includes the apparatus of example 89, wherein the push notification corresponds to the device sharing data with the portable computer.

Example 91 includes the apparatus of any one of examples 79-90, further including a touch-based input analyzer to analyze user interactions with the secondary display detected by a touch sensor associated with the secondary display.

Example 92 includes the apparatus of example 91, wherein the touch sensor is associated with a touchpad disposed on a base of the portable computer, the secondary display corresponding to an extension of the touchpad, the secondary display to extend along a front edge of the base to be visible when the lid is in the closed position.

Example 93 includes the apparatus of any one of examples 79-92, further including a primary display controller to render a primary user interface via the primary display when the lid is open and the primary display is powered, the primary user interface associated with an application running on the portable computer, the secondary display to render a secondary user interface associated with the application via the secondary display.

Example 94 includes the apparatus of example 93, wherein the secondary user interface includes controls to enable a user to operate the application, the primary display controller to update the primary user interface based on user interactions with the controls in the secondary user interface.

Example 95 includes the apparatus of example 94, wherein the secondary display controller is to continue to render the secondary user interface via the secondary display after the lid is returned to the closed position and the primary display is turned off, the controls in the secondary user interface to enable the user to continue to operate the application when the lid is in the closed position.

Example 96 includes the apparatus of any one of examples 93-95, wherein the primary display controller is implemented with a first processor and the secondary display controller is implemented with a second processor.

Example 97 includes the apparatus of example 96, wherein the second processor consumes less power than the first processor.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A portable device comprising:
   a housing including a first portion and a second portion;
   a hinge to couple the first portion of the housing to the second portion of the housing, the first portion including a first proximal edge adjacent the hinge and a first distal edge opposite the first proximal edge, the second portion including a second proximal edge adjacent the hinge and a second distal edge opposite the second proximal edge, the hinge to enable the housing to be folded into a closed position in which the first and second distal edges are adjacent one another and to enable the housing to be opened to an open position in which the first and second distal edges are spaced apart;
   a microphone;
   a speaker;
   a first camera on a first side of the housing to face a first direction;
   a second camera on a second side of the housing to face a second direction, the second side of the housing opposite the first side of the housing, the second direction opposite the first direction;
   communications circuitry;
   memory;
   processor circuitry;
   a first display carried by the housing; and
   a second display distinct from the first display, the second display carried by the second portion of the housing, the second display is touch sensitive, the second display visible when the housing is in the closed position, the second display defined by a top edge, a bottom edge, and two lateral edges, the top and bottom edges longer than the two lateral edges, both the top and bottom edges of the second display closer to the second distal edge of the second portion than the top and bottom edges are to the second proximal edge of the second portion, the second camera adjacent the second display when the housing is in the closed position, and the second camera closer to the second distal edge of the second portion than the second camera is to the second proximal edge of the second portion when the housing is in the closed position.

2. The portable device of claim 1, wherein the first display is between the first and second portions of the housing when the housing is in the closed position.

3. The portable device of claim 1, further including instructions, the processor circuitry to execute the instructions to cause display of information on the second display when the housing is in the closed position, the information to indicate at least one of a time of day or a date.

4. The portable device of claim 3, wherein the information is first information, and the processor circuitry is to cause display of second information on the second display when the housing is in the closed position, the second information different than the first information.

5. The portable device of claim 4, wherein the second information indicates a battery level associated with the portable device.

6. The portable device of claim 4, wherein the second information indicates an incoming call.

7. The portable device of claim 4, wherein the communications circuitry is to receive a push notification from a second device while the housing is in the closed position, the second device separate from the portable device, the processor circuitry to cause the display of the second information in response to the receipt of the push notification, the second information to indicate the receipt of the push notification.

8. The portable device of claim 7, wherein the communications circuitry is to transmit a preset message in reply to the push notification while the housing is in the closed position.

9. The portable device of claim 4, wherein the second information is associated with a user calendar.

10. The portable device of claim 4, wherein the second information is associated with music controls.

11. An apparatus comprising:
    a housing including a first portion and a second portion;
    a hinge to couple the first portion of the housing to the second portion of the housing, the first portion including a first proximal edge adjacent the hinge and a first distal edge opposite the first proximal edge, the second portion including a second proximal edge adjacent the hinge and a second distal edge opposite the second proximal edge, the hinge to enable the housing to be folded into a closed position in which the first and second distal edges are adjacent one another and to enable the housing to be opened to an open position in which the first and second distal edges are spaced apart;
    a microphone;
    a speaker;
    a first camera on a first side of the housing to face a first direction;
    a second camera on a second side of the housing to face a second direction, the second side of the housing opposite the first side of the housing, the second direction opposite the first direction;
    communications circuitry;
    memory;
    processor circuitry;
    a first display carried by the housing, the first display between the first and second portions of the housing when the housing is in the closed position; and
    a second display distinct from the first display, the second display carried by the second portion of the housing, the second display is touch sensitive, the second display visible when the housing is in the closed position, the second display defined by a first edge, a second edge, a third edge, and a fourth edge, the first and second edges extending in a same direction as an axis of rotation of the hinge, the third and fourth edges extending transverse to the axis of rotation of the hinge, the first and second edges longer than the third and fourth edges, both the first and second edges of the second display closer to the second distal edge of the second portion than the first and second edges are to the second proximal edge of the second portion.

12. The apparatus of claim 11, further including instructions, the processor circuitry to execute the instructions to cause display of information on the second display when the housing is in the closed position, the information to indicate at least one of a time of day or a date.

13. The apparatus of claim 12, wherein the information is first information, and the processor circuitry is to cause display of second information on the second display when the housing is in the closed position, the second information different than the first information.

14. The apparatus of claim 13, wherein the second information indicates a battery level associated with the apparatus.

15. The apparatus of claim 13, wherein the second information indicates an incoming call.

16. The apparatus of claim 13, wherein the communications circuitry is to receive a push notification from a second device while the housing is in the closed position, the second device separate from the apparatus, the processor circuitry to cause the display of the second information in response to the receipt of the push notification, the second information to indicate the receipt of the push notification.

17. The apparatus of claim 16, wherein the communications circuitry is to transmit a preset message in reply to the push notification while the housing is in the closed position.

18. The apparatus of claim 13, wherein the second information is associated with a user calendar.

19. The apparatus of claim 13, wherein the second information is associated with music controls.

20. A foldable device comprising:
a housing including a first portion and a second portion;
means for rotatably coupling the first portion of the housing to the second portion of the housing, the first portion including a first proximal edge adjacent the coupling means and a first distal edge opposite the first proximal edge, the second portion including a second proximal edge adjacent the coupling means and a second distal edge opposite the second proximal edge, the coupling means to enable the housing to be folded into a closed position in which the first and second distal edges are adjacent one another and to enable the housing to be opened to an open position in which the first and second distal edges are spaced apart;
means for sensing audio;
means for generating audio;
first means for capturing an image, the first image capturing means to face toward a space between the first and second portions of the housing when the housing is in the closed position;
second means for capturing an image;
means for storing data;
means for processing;
first means for displaying information, the first displaying means to face toward the space between the first and second portions of the housing when the housing is in the closed position; and
second means for displaying information distinct from the first displaying means, the second displaying means supported by the second portion of the housing, the second displaying means is touch sensitive, the second displaying means visible when the housing is in the closed position, the second displaying means defined by a top edge, a bottom edge, and two lateral edges extending between the top and bottom edges, the top and bottom edges longer than the two lateral edges, both the top and bottom edges of the second displaying means closer to the second distal edge of the second portion than the top and bottom edges are to the second proximal edge of the second portion.

21. The foldable device of claim 20, further including instructions, the processing means to execute the instructions to cause display of information on the second displaying means when the housing is in the closed position, the information to indicate at least one of a time of day or a date.

22. The foldable device of claim 21, wherein the information is first information, and the processing means is to cause display of second information on the second displaying means when the housing is in the closed position, the second information different than the first information.

23. The foldable device of claim 22, wherein the second information indicates a battery level associated with the foldable device.

24. The foldable device of claim 22, wherein the second information indicates an incoming call.

25. The foldable device of claim 22, wherein the communicating means is to receive a push notification from a remote device while the housing is in the closed position, the remote device separate from the foldable device, the processing means to cause the display of the second information in response to the receipt of the push notification, the second information to indicate the receipt of the push notification.

26. The foldable device of claim 25, wherein the communicating means is to transmit a preset message in reply to the push notification while the housing is in the closed position.

27. The foldable device of claim 22, wherein the second information is associated with a user calendar.

28. The foldable device of claim 22, wherein the second information is associated with music controls.

* * * * *